(12) United States Patent
Matsusaka

(10) Patent No.: US 7,450,837 B2
(45) Date of Patent: Nov. 11, 2008

(54) ZOOM OPTICAL SYSTEM, IMAGING LENS DEVICE, AND DIGITAL APPARATUS

(75) Inventor: Keiji Matsusaka, Osaka (JP)

(73) Assignee: Konica Monolta Opto, Inc., Hachioji-Shi (JP)

( * ) Notice: Subject to any disclaimer, the term of this patent is extended or adjusted under 35 U.S.C. 154(b) by 402 days.

(21) Appl. No.: 11/244,458

(22) Filed: Oct. 6, 2005

(65) Prior Publication Data
US 2006/0083504 A1    Apr. 20, 2006

(30) Foreign Application Priority Data
Oct. 15, 2004    (JP) .............................. 2004-302121

(51) Int. Cl.
*G03B 17/00*    (2006.01)
*G02B 15/14*    (2006.01)

(52) U.S. Cl. .................. 396/79; 359/680; 359/684; 359/686; 359/689

(58) Field of Classification Search ............. 396/72, 396/79; 359/644, 650, 660, 671, 686, 695, 359/771, 781, 782; 348/684, 689
See application file for complete search history.

(56) References Cited

U.S. PATENT DOCUMENTS

| | | | |
|---|---|---|---|
| 6,646,815 B2 | 11/2003 | Nobe | 359/689 |
| 6,888,683 B2 | 5/2005 | Itoh | 359/686 |
| 2003/0210471 A1 | 11/2003 | Mihara et al. | 359/691 |
| 2005/0057816 A1* | 3/2005 | Sato | 359/676 |

FOREIGN PATENT DOCUMENTS

| | | |
|---|---|---|
| JP | 10-039214 A | 2/1998 |
| JP | 2002-196240 A | 7/2002 |
| JP | 2002-365543 A | 12/2002 |
| JP | 2003-177314 A | 6/2003 |
| JP | 2004-102211 A | 4/2004 |

* cited by examiner

*Primary Examiner*—W. B. Perkey
(74) *Attorney, Agent, or Firm*—Sidley Austin LLP

(57) ABSTRACT

A zoom optical system has lens groups, and performs zooming by varying distances between the respective lens groups in an optical axis direction thereof. The zoom optical system has two or more lens groups having a negative optical power and a positive optical power in this order from an object side. The first lens group (Gr1) and the second lens group (Gr2) each have three or less lens elements. The second lens group (Gr2) includes a positive lens element having a refractive index of 1.7 or more. The positive lens element has at least one aspherical surface. With this arrangement, provided are a compact and superfine zoom optical system with a zoom ratio of about two to three times, an imaging lens device incorporated with the zoom optical system, and a digital apparatus loaded with the imaging lens device.

10 Claims, 24 Drawing Sheets

LONGITUDINAL SPHERICAL ABERRATION
(W)

ASTIGMATISM

DISTORTION (M)

(T)

LONGITUDINAL SPHERICAL ABERRATION
(W)

ASTIGMATISM

DISTORTION (M)

(T)

LONGITUDINAL SPHERICAL ABERRATION
(W)

ASTIGMATISM
IMAGE HEIGHT(mm)

DISTORTION
IMAGE HEIGHT(mm)

(M)

(T)

LONGITUDINAL SPHERICAL ABERRATION
(W)

ASTIGMATISM
IMAGE HEIGHT(mm)

DISTORTION
IMAGE HEIGHT(mm)

(M)

(T)

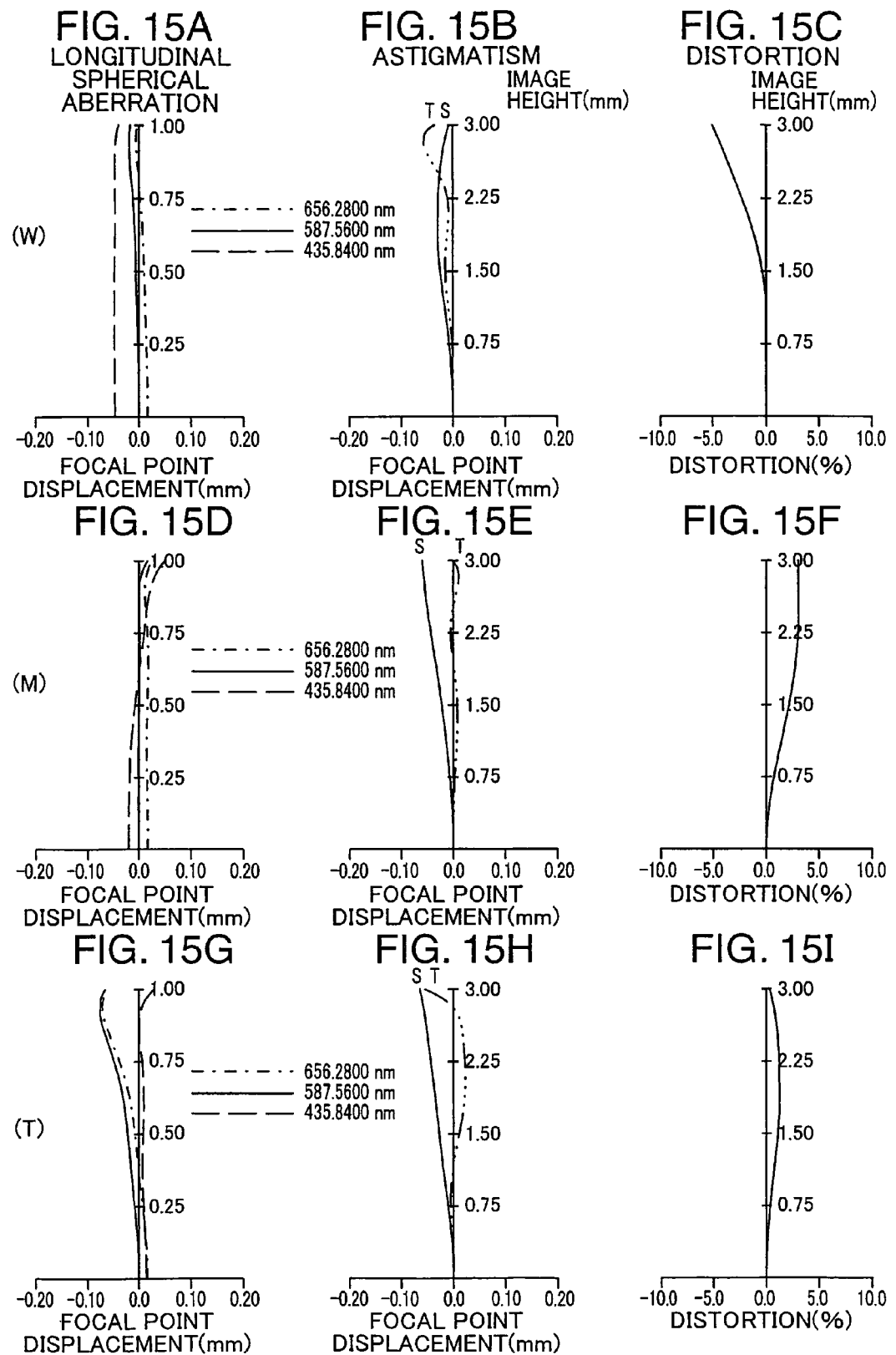

FIG. 16A
LONGITUDINAL SPHERICAL ABERRATION
FIG. 16B
ASTIGMATISM
FIG. 16C
DISTORTION
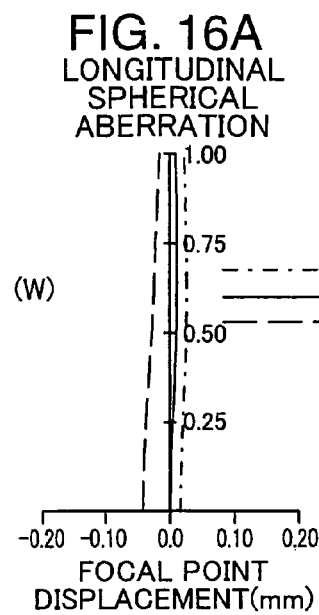
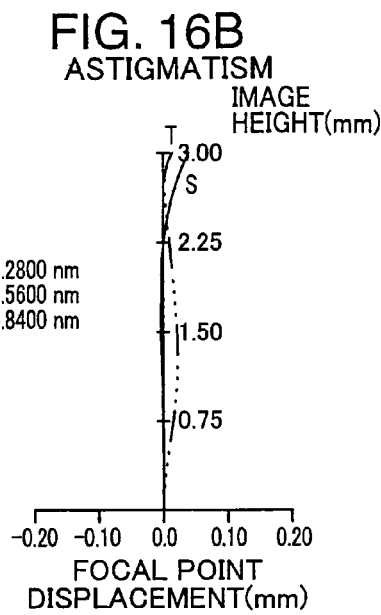
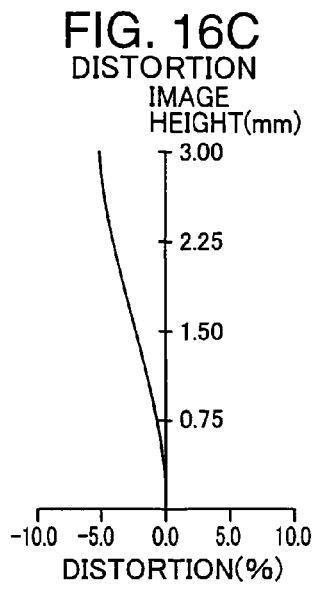
FIG. 16D
FIG. 16E
FIG. 16F
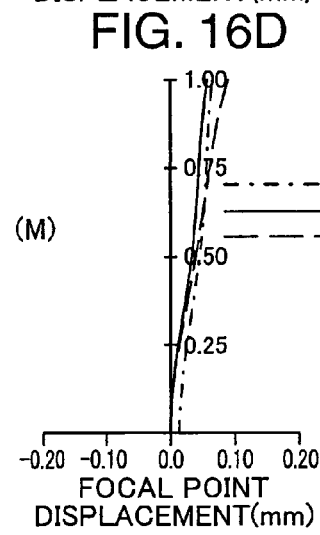
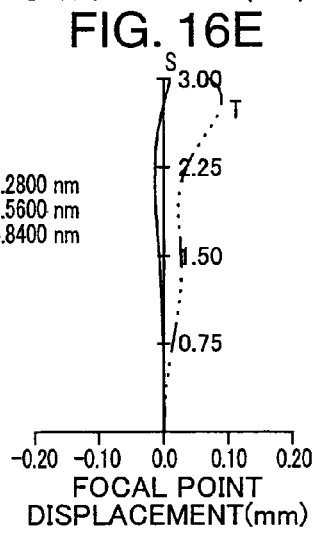
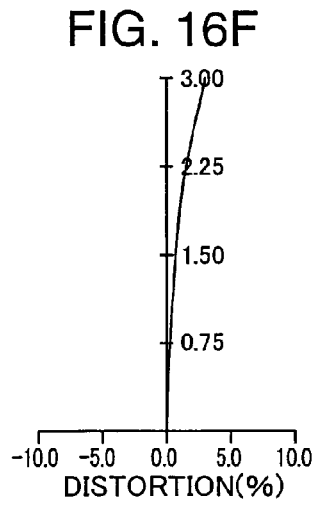
FIG. 16G
FIG. 16H
FIG. 16I
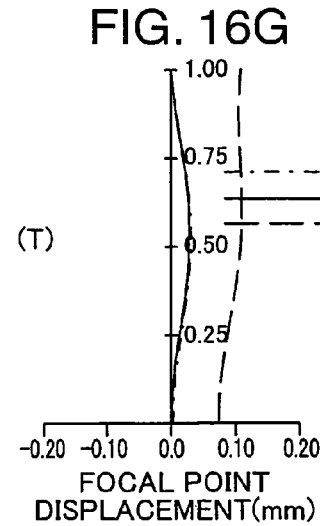
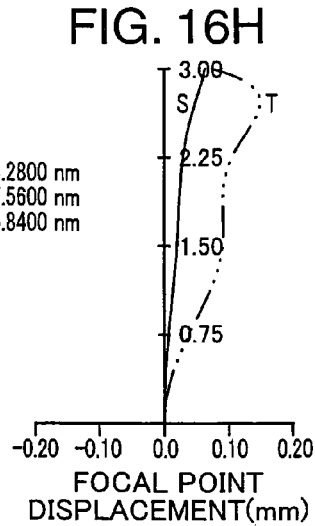
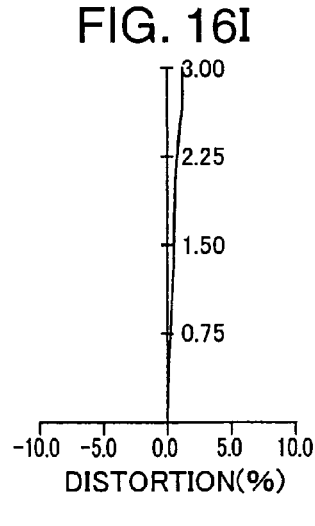

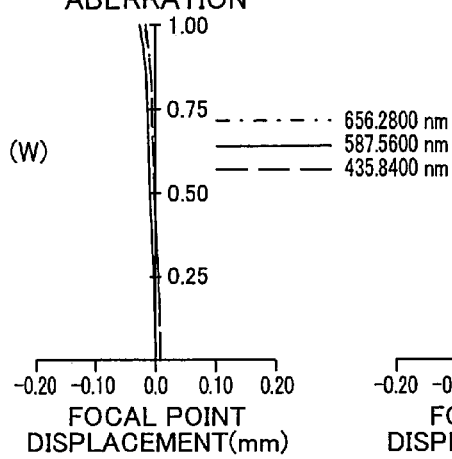
FIG. 17A
LONGITUDINAL SPHERICAL ABERRATION
(W)
FIG. 17B
ASTIGMATISM
IMAGE HEIGHT(mm)
FIG. 17C
DISTORTION
IMAGE HEIGHT(mm)
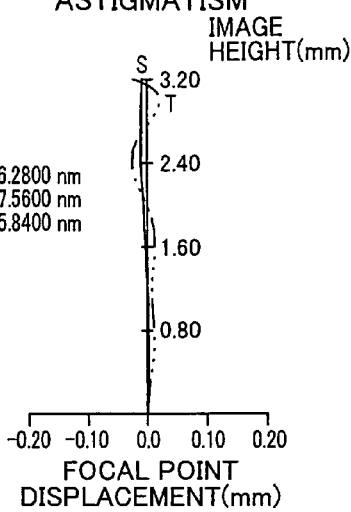
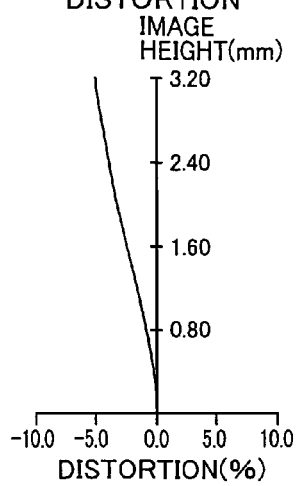
FIG. 17D
(M)
FIG. 17E
FIG. 17F
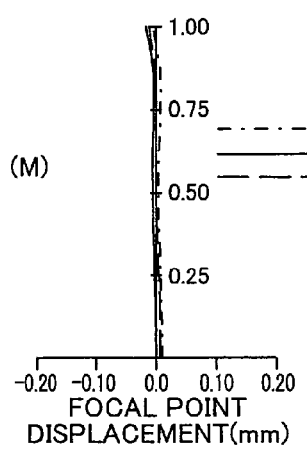
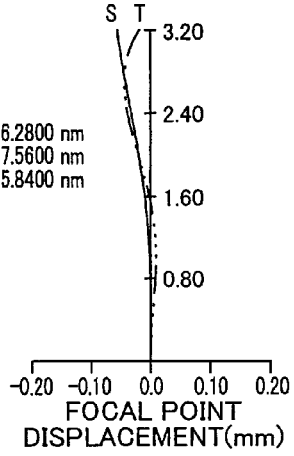
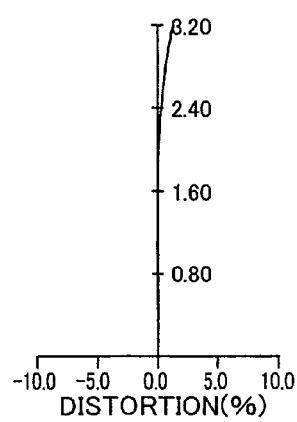
FIG. 17G
(T)
FIG. 17H
FIG. 17I
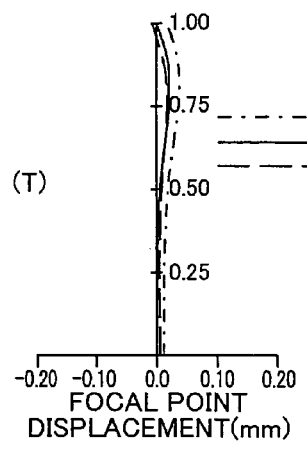
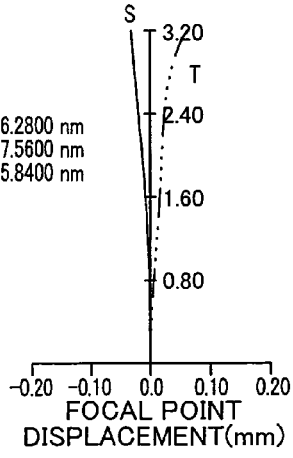
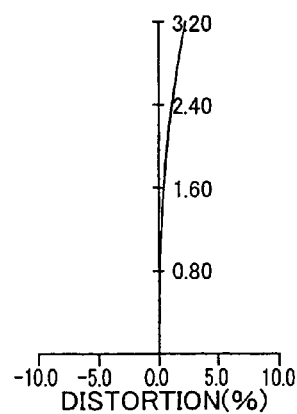

LONGITUDINAL SPHERICAL ABERRATION

ASTIGMATISM

DISTORTION

LONGITUDINAL SPHERICAL ABERRATION (W)

ASTIGMATISM

DISTORTION (M)

(T)

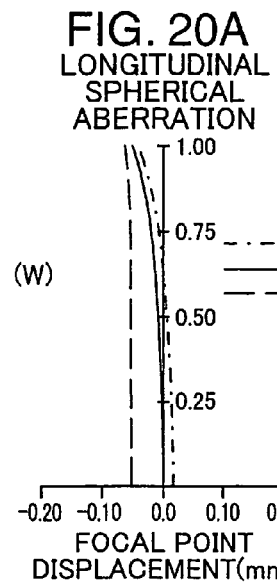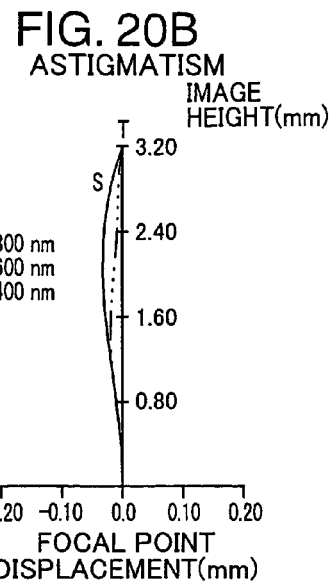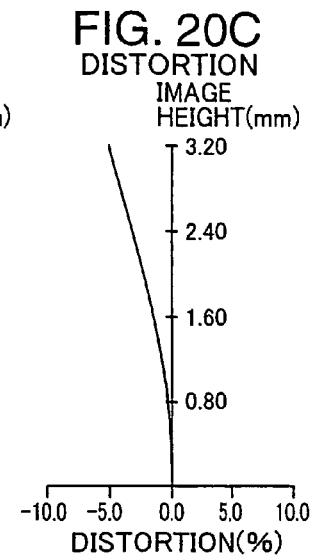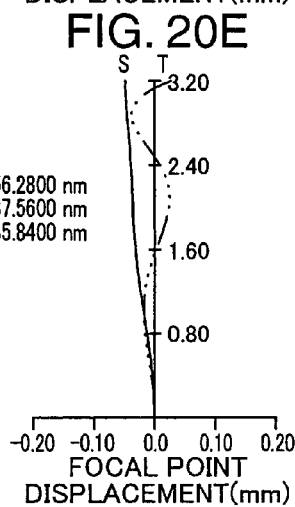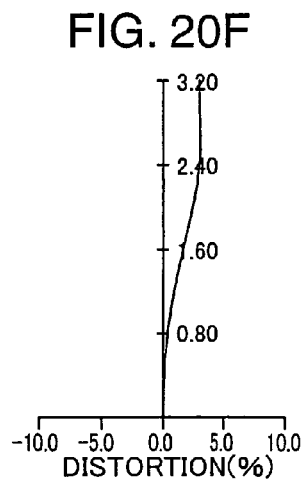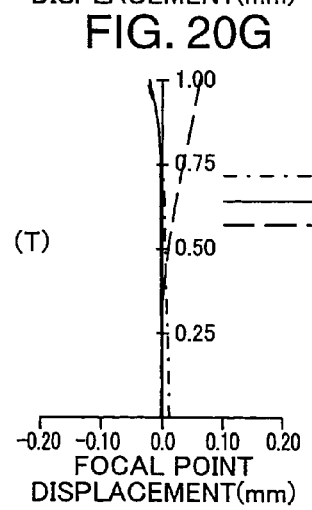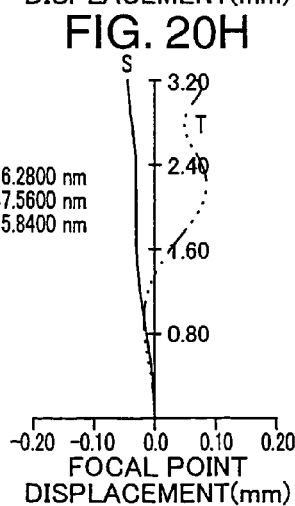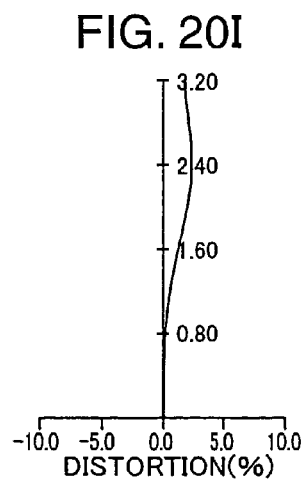

WHOLE LENGTH TO WIDE ANGLE LIMIT> WHOLE LENGTH TO TELEPHOTO LIMIT

WHOLE LENGTH TO TELEPHOTO LIMIT> WHOLE LENGTH TO WIDE ANGLE LIMIT

WHOLE LENGTH TO WIDE ANGLE LIMIT> WHOLE LENGTH TO TELEPHOTO LIMIT

ZOOM OPTICAL SYSTEM, IMAGING LENS DEVICE, AND DIGITAL APPARATUS

This application is based on Japanese Patent Application No. 2004-302121 filed on Oct. 15, 2004, the contents of which are hereby incorporated by reference.

BACKGROUND OF THE INVENTION

1. Field of the Invention

The present invention relates to a zoom optical system composed of plural lens groups and adapted for performing zooming by varying the distances between the respective lens groups in an optical axis direction, as well as to an imaging lens device with the zoom optical system, and a digital apparatus loaded with the imaging lens device.

2. Description of the Related Art

In recent years, with an explosive spread of a mobile phone and a personal digital assistant (PDA), compact digital still camera units or digital video units have been built in most of these apparatuses. In the apparatuses incorporated with the digital still camera units or the digital video units, a compact image sensor with a small number of pixels, as compared with an image sensor equipped in a digital still camera dedicatedly used for photographing, and an imaging lens device equipped with a mono-focal optical system constituted of one to three plastic lens elements are generally used, considering severe constraints in size and cost required in such apparatuses.

Since the magnification of the mono-focal optical system is substantially in the same level as a human eye, an object to be photographed is required to be set as close as possible to the photographer. In current days when use of an image sensor with a large number of pixels and high performance has been progressed drastically, there is a demand for a compact zoom optical system that is compatible with an image sensor with a large number of pixels, enables a photographer to photograph an object sufficiently away therefrom, and is loadable in a mobile phone or a like apparatus.

As an example of a compact zoom optical system, Japanese Unexamined Patent Publication No. 2002-196240 (counterpart U.S. Pat. No. 6,646,815B2 hereinafter, called as "D1") proposes a zoom optical system of a so-called negative-positive-positive three-unit type comprising a first lens group having a negative optical power, a second lens group having a positive optical power, and a third lens group having a positive optical power in this order from the object side. In the technique disclosed in D1, miniaturization of the optical system is accomplished, as compared with a conventional optical system, by defining the optical power of the second lens group.

Japanese Unexamined Patent Publication No. 2004-102211 (counterpart U.S. patent application Publication No. US2003/0210471A1, hereinafter called as "D2") discloses a zoom optical system of a negative-positive two-unit type or of a negative-positive-positive three-unit type, wherein the layout of a lens group arrangement is simplified by defining the configuration of the second lens group to reduce the thickness of the optical system when a lens barrel is collapsed.

It is preferable to use an aspherical lens element to obtain a superfine image. For instance, Japanese Unexamined Patent Publication No. 2002-365543 (counterpart U.S. Pat. No. 6,888,683B2, hereinafter called as "D3") discloses a zoom optical system of a negative-positive-positive-negative four-unit type, wherein productivity of an aspherical negative lens element in the first lens group is enhanced by appropriately selecting a glass material.

The zoom optical system disclosed in D1 uses four lens elements in the second lens group, which is moved with a largest moving distance in zooming. Accordingly, a load to a driving section is large, and it is difficult to miniaturize the driving section. Further miniaturization is necessary in order to load the zoom optical system in a personal digital assistant (PDA). However, the first lens group of the optical system disclosed in D1 has a large error sensitivity due to decentering, which makes it difficult to produce a compact optical system.

The second lens group of the zoom optical system disclosed in D2 has a weak optical power with a large moving distance, in addition to use of such a large number of lens elements as seven. Accordingly, it is difficult to miniaturize the optical system, and to load the optical system in a PDA. Furthermore, a large impact resistance is required for the PDA, which makes it difficult to make the lens barrel collapsible.

The zoom optical system disclosed in D3 has a long entire optical length in a used state, which makes it difficult to load the optical system in a PDA. It is necessary to reduce the moving distances of the respective lens groups in zooming to produce a compact optical system loadable in a PDA without collapsing the lens barrel.

Furthermore, generally, as a demand for miniaturization is increased, it is difficult to produce lens elements each satisfying a required plane precision, curvature or the like. In addition, it becomes difficult to secure an allowable positional precision in assembling.

SUMMARY OF THE INVENTION

In view of the problems residing in the prior art, it is an object of the present invention to provide a miniaturized, superfine zoom optical system with production feasibility, wherein miniaturization is attained by suppressing a moving distance of a lens group for zooming, and error sensitivity increase is suppressed.

An aspect of the invention is directed to a zoom optical system for forming an optical image of a subject onto a light receiving plane of an image sensor for converting the optical image into an electrical signal, and performing zooming by varying distances between lens groups in an optical axis direction. The zoom optical system comprises in the order from an object side: a first lens group having a negative optical power; and a second lens group having a positive optical power. The distance between the first lens group and the second lens group is reduced in zooming from a wide-angle limit to a telephoto limit. The first lens group and the second lens group each are composed of three or less lens elements. The second lens group includes a positive lens element having a refractive index of 1.7 or more. The positive lens element has at least one aspherical surface. The second lens group satisfies the following conditional formulae (1) and (2):

$$0.7 < f_2/f_W < 1.78 \quad (1)$$

$$0.1 < t_2/TL < 0.6 \quad (2)$$

where $f_2$ represents a composite focal length of the second lens group, $f_W$ represents a composite focal length of an entirety of the optical system at the wide-angle limit, $t_2$ represents a moving distance of the second lens group in zooming from the wide-angle limit to the telephoto limit, and TL represents a maximal value of an optical axis distance from an apex of a lens surface of the lens element closest to the object to the light receiving plane of the image sensor.

Another aspect of the present invention is directed to an imaging lens device comprising the above zoom optical system, wherein the zoom optical system is constructed in such a manner that the optical image of the subject is formable on a predetermined imaging plane of the zoom optical system.

Yet another aspect of the invention is directed to a digital apparatus comprising the above imaging lens device, an image sensor, and a functioning section which causes the imaging lens device and the image sensor to execute at least one of a still image shooting operation of shooting a still image of the subject, and a moving image shooting operation of shooting a moving image of the subject.

These and other objects, features and advantages of the present invention will become more apparent upon reading of the following detailed description along with the accompanying drawings.

BRIEF DESCRIPTION OF THE DRAWINGS

FIGS. 15A through 15I are aberration diagrams regarding spherical aberration, astigmatism, and distortion aberration of the lens groups in the zoom optical system in the fifth embodiment.

FIGS. 16A through 16I are aberration diagrams regarding spherical aberration, astigmatism, and distortion aberration of the lens groups in the zoom optical system in the sixth embodiment.

FIGS. 17A through 17I are aberration diagrams regarding spherical aberration, astigmatism, and distortion aberration of the lens groups in the zoom optical system in the seventh embodiment.

FIGS. 20A through 20I are aberration diagrams regarding spherical aberration, astigmatism, and distortion aberration of the lens groups in the zoom optical system in the tenth embodiment.

DETAILED DESCRIPTION OF THE PREFERRED EMBODIMENTS

Figure 22A:
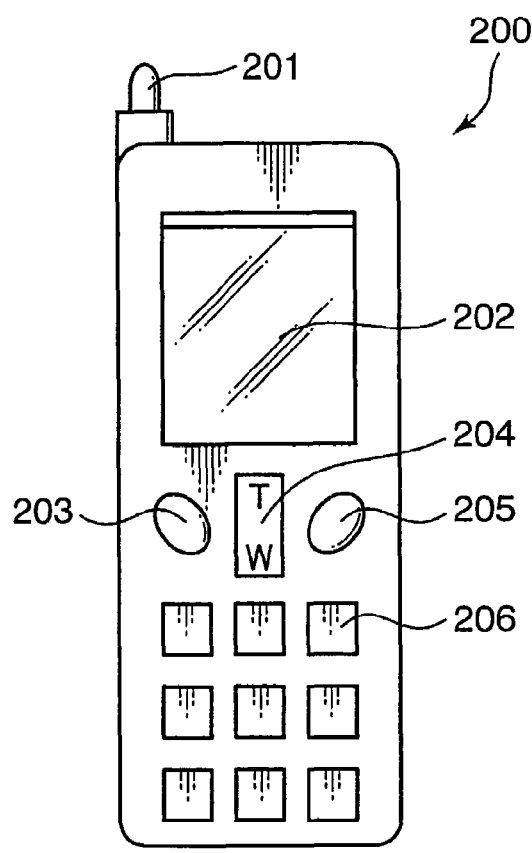
FIG. 22A is an illustration exemplifying a camera phone loaded with the zoom optical system embodying the present invention, specifically showing an operating face of the camera phone.
Figure 22B:
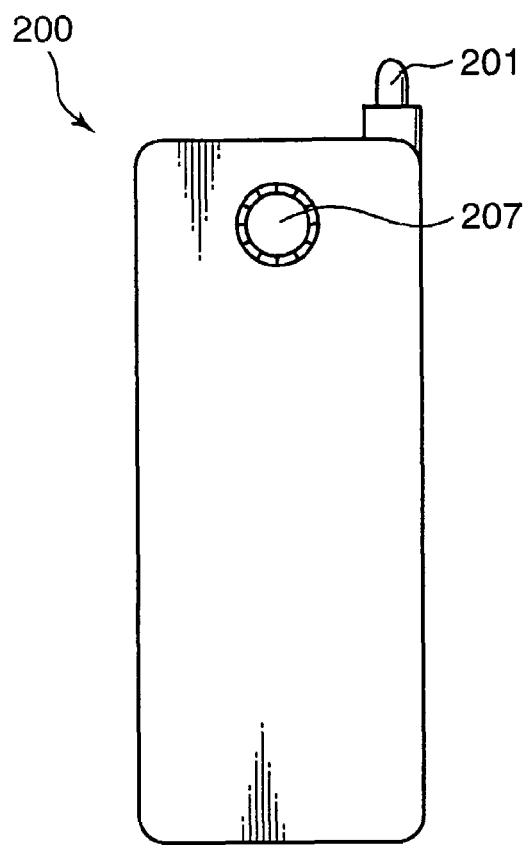
FIG. 22B is an illustration exemplifying the camera phone loaded with the zoom optical system embodying the present invention, specifically showing a back face of the camera phone.

FIGS. 22A and 22B are illustrations each showing an external appearance of a mobile phone equipped with a camera (hereinafter, simply called as "camera phone"), as an embodiment of a digital apparatus in accordance with the present invention. The digital apparatus in accordance with the present invention includes, in addition to the camera phone, a digital still camera, a digital video camera, a personal digital assistant (PDA), a personal computer, a mobile computer, and peripheral devices thereof. The digital still camera and the digital video camera are examples of an imaging lens device for optically reading video of a subject, converting the video into an electrical signal with use of a semiconductor device, and storing the electrical signal as digital data into a storage medium such as a flash memory. The present invention also embraces a mobile phone, a PDA, a personal computer, a mobile computer, and peripheral devices thereof, in each of which the compact imaging lens device for optically reading a still image or a moving image of a subject is incorporated.

FIG. 22A shows the front face or the operating face of the camera phone, and FIG. 22B shows the back face of the camera phone, which is opposite to the operating face. Referring to FIG. 22A, a phone body 200 has an antenna 201 at an upper part thereof, and includes on the operating face, a display 202, a mode switching button 203 for activating image shooting mode and switching over the imaging shooting mode between still image shooting and moving image shooting, a zoom button 204 for controlling zooming, which is a feature of the present invention, a shutter button 205, and a dial button 206. The symbol "T" indicating the telephoto limit of the camera is marked on an upper end portion of the zoom button 204, and the symbol "W" indicating the wide-angle limit of the camera is marked on a lower end portion of the zoom button 204. The zoom button 204 is constituted of a two-contact switch constructed such that telephoto shooting or wide-angle shooting is allowed when a photographer or a user selectively depresses the upper end portion or the lower end portion of the zoom button 204. Further, an imaging lens device (camera) 207 equipped with a zoom optical system, which is a feature of the present invention, is built in the phone body 200, with a taking lens being exposed out of the back face of the phone body 200.

When the photographer depresses the mode switching button 203, the image shooting mode is activated. In the embodiment of the present invention, depressing the mode switching button 203 one time activates the still image shooting mode, and depressing the mode switching button 203 one more time while the camera is in the still image shooting mode switches over the mode to the moving image shooting mode. When the still image shooting mode is activated, a subject image is captured by an image sensor such as a CCD sensor through the imaging lens device 207. Then, after the acquired subject image data is transferred to a memory for display, the image is displayed on the display 202. The photographer can move the subject image to an intended position within the display screen while viewing the image through the display 202. When the photographer depresses the shutter button 205 with the subject image being located at the intended position, a still image of the subject is obtained. Thus, image data representing the subject still image is stored in a memory for storing still image data.

When zoom shooting is performed in the case where a subject is located away from the photographer, or the photographer wishes to photograph a subject nearby enlargedly, the photographer depresses the upper end portion of the zoom button 204 where the symbol "T" is marked. Then, the state that the zoom button 204 is being depressed toward the telephoto limit is detected, and a lens driving for zooming is executed for a time duration while the zoom button 204 is depressed to carry out continuous zooming. If the photographer wishes to reduce the magnification of the subject image, for example, in an excessive zooming, the photographer depresses the lower end portion of the zoom button 204 where the symbol "W" is marked. Then, the state that the zoom button 204 is being depressed toward the wide-angle limit is detected, and a continuous zooming for magnification reduction is carried out for a time duration while the zoom button 204 is depressed. In this way, the photographer can vary the zoom ratio with use of the zoom button 204, even if the subject is located away from the photographer. Similarly to ordinary life-size shooting, the photographer can capture an enlarged still image by moving the subject image within the display screen to an intended position, and by depressing the shutter button 205 with the subject image being located at the intended position.

In case of conducting moving image shooting, after the still image shooting mode is activated by depressing the mode switching button 203 one time, the mode switching button 203 is depressed once again to change the image shooting mode to the moving image shooting. Thereafter, similarly to the still image shooting, the photographer views the image through the display 202 to move the subject image captured through the imaging lens device 207 to an intended position within the display screen. While viewing the image through the display 202, the photographer can adjust the zoom ratio of the subject image with use of the zoom button 204. After adjusting the zoom ratio of the subject image, the photographer can start moving image shooting by depressing the shutter button 205. During the moving image shooting, the photographer can vary the zoom ratio of the subject image desirably by manipulating the zoom button 204. When the photographer depresses the shutter button 205 again in this state, the moving image shooting ends. The captured moving image data is sent to a memory for displaying the moving image on the display 202, and is also sent to a memory for storing the moving image data for storage.

The construction of the zoom button 204, which is a feature of the present invention, is not limited to the foregoing. The dial button 206 may be used as a zoom button. Alternatively, usable is a member having two-directional zooming function, namely, enlargement and reduction, such as a rotary dial member which is rotatably supported about an axis of rotation on the operating face where the dial button is installed.

The present invention is not limited to the camera phone, and is applicable to other digital apparatuses such as a digital still camera, a digital video camera, a PDA, a personal computer, a mobile computer, and peripheral devices thereof There is a strong demand for a high-performance and compact zoom optical system, as a lens assembly to be incorporated in the imaging lens device 207 as shown in FIG. 22B, so that a photographer can photograph a subject sufficiently away therefrom. The zoom optical system is such that plural lens groups constitute the lens assembly, and zooming and focusing are conducted by varying the distances between the respective lens groups in the optical axis direction. The present invention relates to the zoom optical system, the imaging lens device incorporated with the zoom optical system to form an optical image of a subject on a light receiving plane (hereinafter, also called as "an imaging plane") of an image sensor for converting the optical image into an electrical signal, and the digital apparatus which is incorporated with the imaging lens device and the image sensor, and which has a function of performing still image shooting or moving image shooting.

In the following, the zoom optical system constituting the imaging lens device 207 of the camera phone shown in FIG. 22B is described referring to the drawings.

Throughout the specification and the claims, the optical power of a single lens element, and the optical power of each single lens element constituting a cemented lens element represent a power of the single lens element itself assuming that the both lens surfaces of the single lens element have a boundary with the air.

First Embodiment

Figure 1:
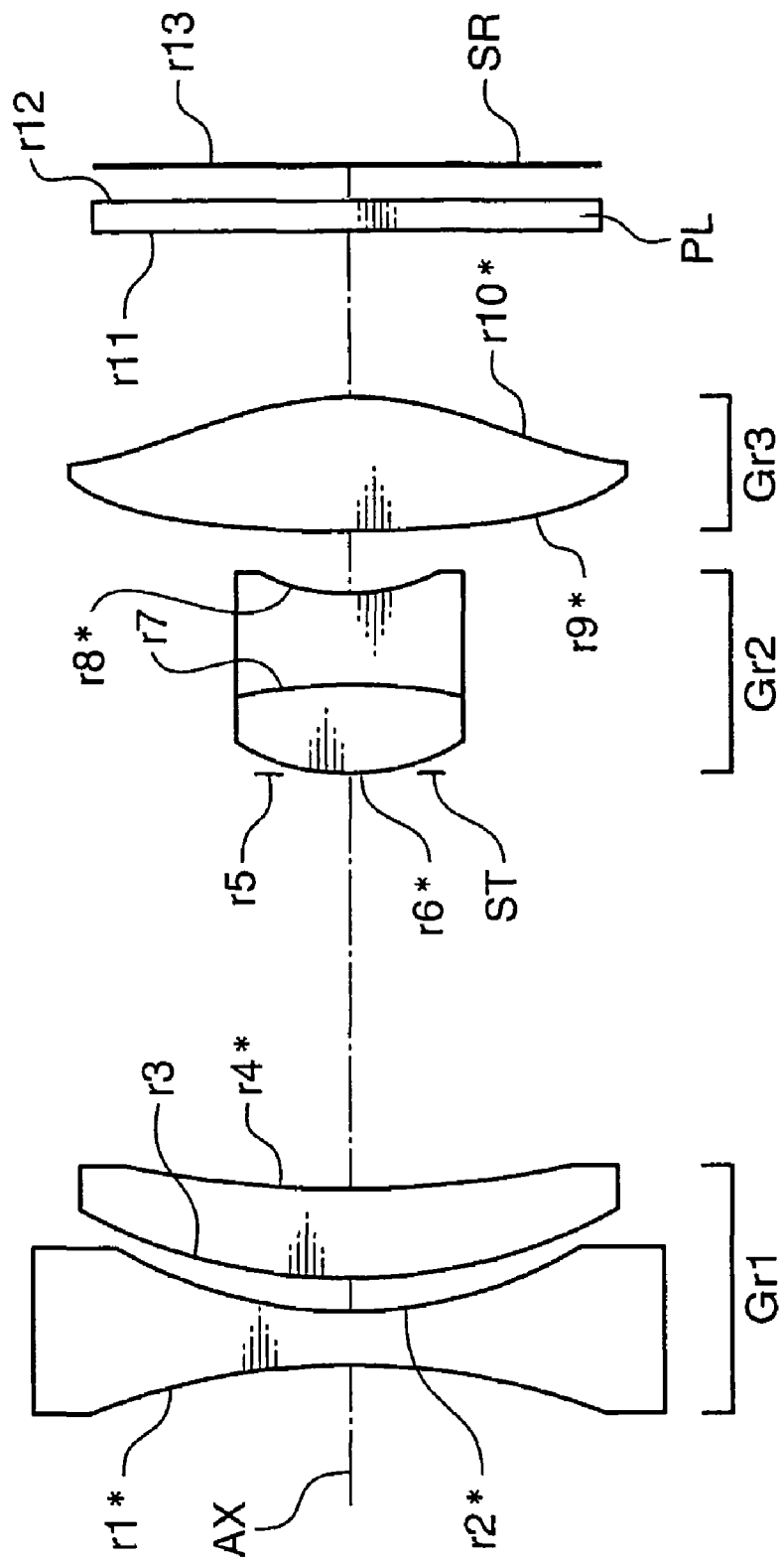
FIG. 1 is a cross-sectional view taken along an optical axis, showing a zoom optical system in a first embodiment of the present invention.

FIG. 1 is a cross-sectional view taken along an optical axis (AX), showing an arrangement of lens groups in a zoom optical system in a first embodiment of the present invention. FIGS. 2 through 10 each show a lens group arrangement at a wide-angle limit (W), as well as FIG. 1. The lens groups in each of the first through the tenth embodiments of the present invention except for the following are constituted of a first lens group (Gr1) having a negative optical power as a whole, a second lens group (Gr2) having a positive optical power as a whole, and a third lens group (Gr3) having a positive optical power as a whole in this order from the object side (the left side in FIGS. 1 through 10) to the imaging side (the right side in FIGS. 1 through 10). The seventh embodiment does not include a third lens group (Gr3), and the ninth embodiment additionally includes a fourth lens group (Gr4). Further, in each of the embodiments, an aperture stop (ST) for adjusting the light amount is included in the second lens group (Gr2) on the side of the first lens group (Gr1), and a plane-parallel plate (PL) and an image sensor (SR) are arranged on the side opposite to the object side of the lens group farthest away from the object.

Hereinafter, the terms "concave", "convex", and "meniscus" are used regarding lens elements. It should be noted that these terms represent the respective configurations of a lens element in the vicinity of the optical axis, namely, near the central part of the lens element, and do not indicate the respective configurations of the entirety of the lens element or a periphery of the lens element. As far as the lens element is a spherical lens element, the configuration of the lens element does not matter. However, since the configuration of an aspherical lens element is generally different in the vicinity of the central part thereof and in a periphery thereof, the above definitions on the terms are necessary.

The zoom optical system in the first embodiment shown in FIG. 1 has the following lens group arrangement in the order from the object side. The first lens group (Gr1) having a negative optical power as a whole is composed of a negative biconcave lens element, and a positive meniscus lens element convex to the object side. The second lens group (Gr2) having a positive optical power as a whole has a cemented lens element constituted of a positive biconvex lens element, and a negative biconcave lens element. The third lens group (Gr3) having a positive optical power as a whole has a positive biconvex lens element. Further, ri (i=1, 2, 3, . . . ) indicates the i-th lens surface from the object side, and a surface ri marked with an asterisk (*) is an aspherical surface. It should be noted that a cemented surface of lens elements is counted as one.

The number of the lens elements constituting the cemented lens element is not the number of the cemented lens element itself but is the number of single lens elements constituting the cemented lens element. For instance, if the cemented lens element is constituted of three single lens elements, the number of the lens elements constituting the cemented lens element is three.

In the above arrangement, an incident ray from the object side is propagated through the first, the second, and the third lens groups (Gr1, Gr2, Gr3) in this order, and forms an optical image of an object or a subject. The optical image formed through the lens groups is propagated through the plane-parallel plate (PL) arranged adjacent the third lens group (Gr3). While the optical image reaches the plane-parallel plate (PL), the optical image is corrected to minimize a so-called aliasing noise, which may appear during conversion of the optical image into an electrical signal by the image sensor (SR). The plane-parallel plate (PL) corresponds to an optical low-pass filter, an infrared ray cutting filter, a cover glass for an image sensor, or the like. After the correction by the plane-parallel plate (PL), the optical image is converted into an electrical signal by the image sensor (SR). The electrical signal is subjected to a predetermined digital image processing, image compression, or a like processing, according to needs, and is recorded in a memory of a mobile phone, a PDA, or a like apparatus, as a digital video signal, or transmitted to another digital apparatus by way of a cable or through radio.

Figure 21A:
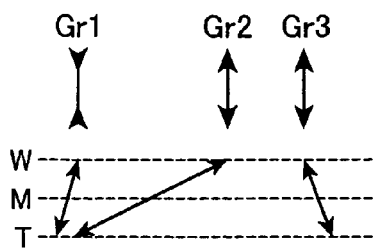
FIG. 21A through 21H are diagrams showing how the lens groups in the respective optical systems in the first through the tenth embodiments are moved.
Figure 21B:
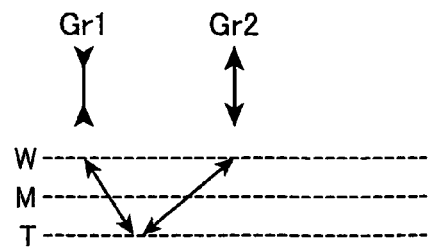
Figure 21C:
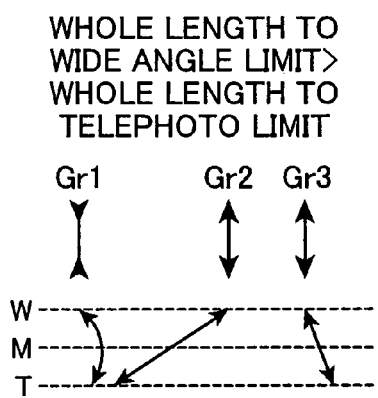
Figure 21D:
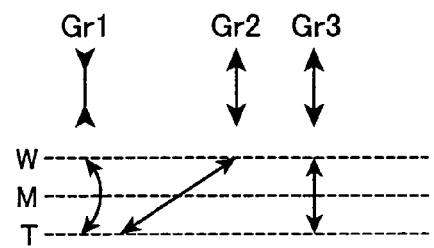
Figure 21E:
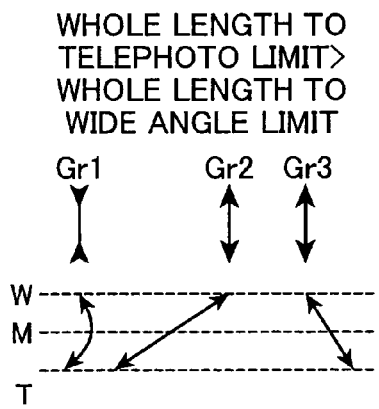
Figure 21F:
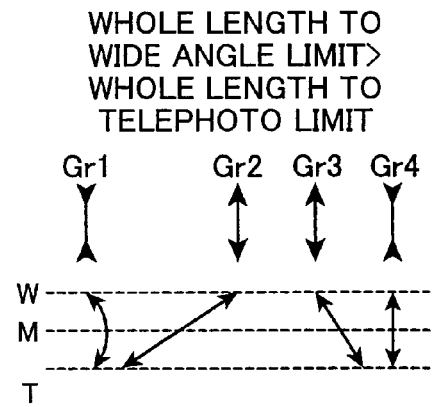
Figure 21G:
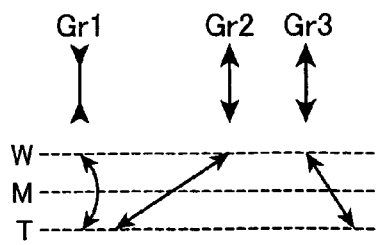
Figure 21H:
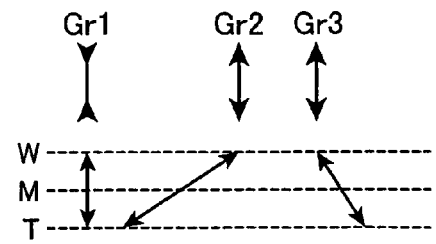

FIG. 21A through 21H are illustrations each showing how the lens groups are moved in zooming. FIG. 21A shows a movement in the first embodiment, FIG. 21B shows a movement in the seventh embodiment, FIG. 21C shows a movement in the second embodiment, FIG. 21D shows a movement in the eighth embodiment, FIG. 21E shows a movement in the third embodiment, FIG. 21F shows a movement in the ninth embodiment, FIG. 21G shows a movement in the fourth, the fifth, and the sixth embodiments, and FIG. 21H shows a movement in the tenth embodiment.

Similarly to FIGS. 1 through 10, in FIGS. 21A through 21H, the left side corresponds to the object side, and the first lens group (Gr1), the second lens group (Gr2), and the third lens group (Gr3) are arrayed in this order from the object side. In the seventh embodiment, the third lens group (Gr3) is not included, and in the ninth embodiment, the fourth lens group (Gr4) is additionally included. Referring to FIGS. 21A through 21H, the symbol W represents a state of the lens group at a wide-angle limit where the focal length is the shortest, namely, the angle of view is the largest, and the symbol T represents a state of the lens group at a telephoto limit where the focal length is the longest, namely, the angle of view is the smallest. The symbol M represents a state of the lens group where the focal length is in the middle between the wide-angle limit (W) and the telephoto limit (T). Hereinafter, this state is called as "mid point (M)". Although an actual lens group is moved linearly along the optical axis, in the drawings of FIGS. 21A through 21H, the positions of the respective lens groups at the wide-angle limit (W), the mid point (M), and the telephoto limit (T) are expressed at the uppermost position, the middle position, and the lowermost position respectively in each of the drawings.

In the zoom optical system of a three-unit type comprising the first lens group having a negative optical power, the second lens group having a positive optical power, and the third lens group having a positive optical power, as in the embodiments of the present invention, the second lens group (Gr2) is primarily adapted for zooming. Accordingly, the second lens group (Gr2) has a significantly large optical power. In the compact zoom optical system as in the embodiments of the invention, it is difficult to secure a zoom ratio of about two to three times merely by moving the second lens group (Gr2). In view of this, in the embodiments, a lens group other than the second lens group (Gr2) is also driven for zooming.

For instance, in the lens group arrangement of the first embodiment shown in FIG. 1, the first lens group (Gr1) and the second lens group (Gr2) are moved toward the object, and the third lens group (Gr3) is substantially linearly moved toward the object or makes a U-turn in zooming from the wide-angle limit (W) to the telephoto limit (T). The second lens group (Gr2) and the third lens group (Gr3) are primarily moved for zooming.

In the following, the lens group arrangements in the second through the tenth embodiments are described one by one in a similar manner as in the first embodiment. Elements in the second through the tenth embodiments which are equivalent to those in the first embodiment are denoted by the same reference numerals.

Second Embodiment

Figure 2:
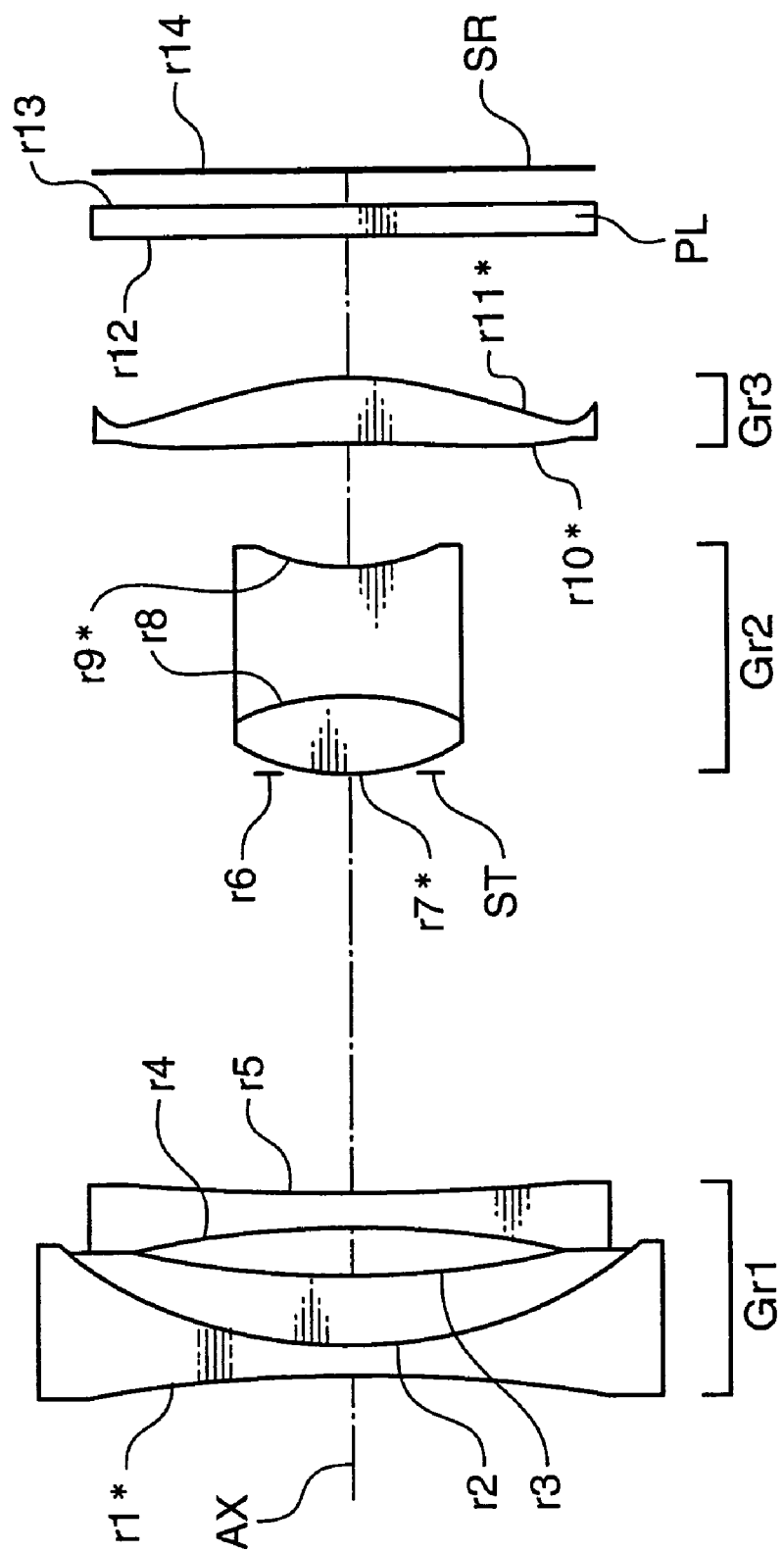
FIG. 2 is a cross-sectional view taken along an optical axis, showing a zoom optical system in a second embodiment of the present invention.

FIG. 2 is a cross-sectional view taken along an optical axis (AX), showing an arrangement of lens groups in a zoom optical system as the second embodiment of the present invention. The zoom optical system in the second embodiment of the present invention is constituted of first through third lens groups (Gr1, Gr2, Gr3) in this order from the object side. Specifically, the first lens group (Gr1) having a negative optical power as a whole is composed of a cemented lens element constituted of a negative biconcave lens element and a positive meniscus lens element convex to the object side, and a negative biconcave lens element. The second lens group (Gr2) having a positive optical power as a whole is composed of a cemented lens element constituted of a positive biconvex lens element and a negative biconcave lens element. The third lens group (Gr3) having a positive optical power as a whole is composed of a single meniscus lens element convex to the imaging side.

In the second embodiment having the above lens group arrangement, in case of zooming from the wide-angle limit (W) to the telephoto limit (T), as shown in FIG. 21C, the first lens group (Gr1) makes a U-turn while approaching toward the image sensor in the course of zooming. Specifically, the first lens group (Gr1) is moved toward the image sensor side in zooming from the wide-angle limit (W) to the mid point (M), and then is moved toward the object. The second lens group (Gr2) is moved toward the object, and the third lens group (Gr3) is substantially linearly moved or makes a U-turn.

Third Embodiment

Figure 3:
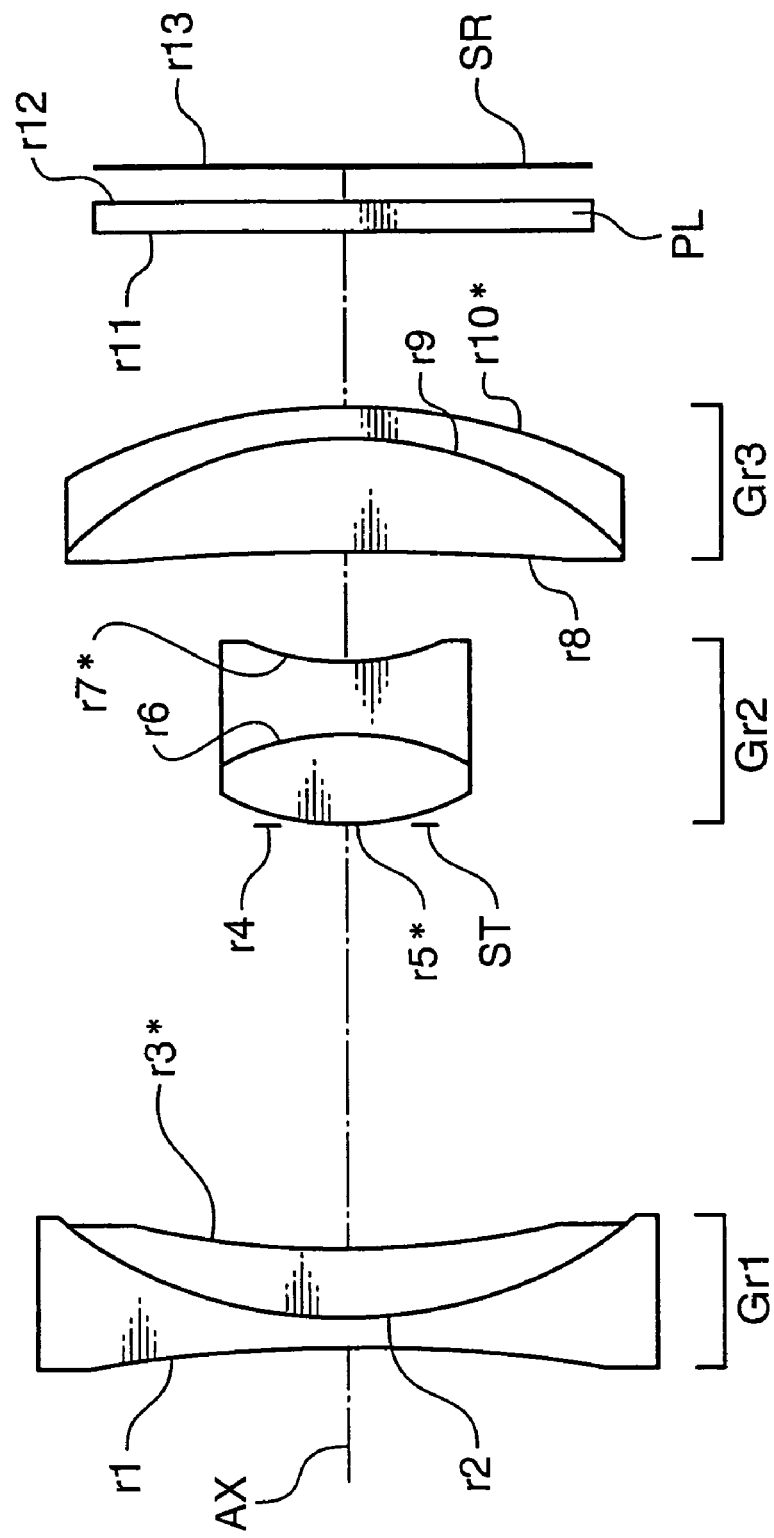
FIG. 3 is a cross-sectional view taken along an optical axis, showing a zoom optical system in a third embodiment of the present invention.

FIG. 3 is a cross-sectional view taken along an optical axis (AX), showing an arrangement of lens groups in a zoom optical system as the third embodiment of the present invention. The third embodiment is constituted of first through third lens groups (Gr1, Gr2, Gr3) in this order from the object side. Specifically, the first lens group (Gr1) having a negative optical power as a whole is composed of a cemented lens element constituted of a negative biconcave lens element, and a positive meniscus lens element convex to the object side. The second lens group (Gr2) having a positive optical power as a whole is composed of a cemented lens element constituted of a positive biconvex lens element and a negative biconcave lens element. The third lens group (Gr3) having a positive optical power as a whole is composed of a cemented lens element constituted of a positive meniscus lens element convex to the imaging side and a negative meniscus lens element convex to the imaging side.

In the third embodiment having the above lens group arrangement, in case of zooming from the wide-angle limit (W) to the telephoto limit (T), as shown in FIG. 21E, the first lens group (Gr1) makes a U-turn while approaching toward the image sensor in the course of zooming. Specifically, the first lens group (Gr1) is moved toward the image sensor in zooming from the wide-angle limit (W) to the mid point (M), and then is moved toward the object. The second lens group (Gr2) is moved toward the object, and the third lens group (Gr3) is substantially linearly moved or makes a U-turn.

Fourth Embodiment

Figure 4:
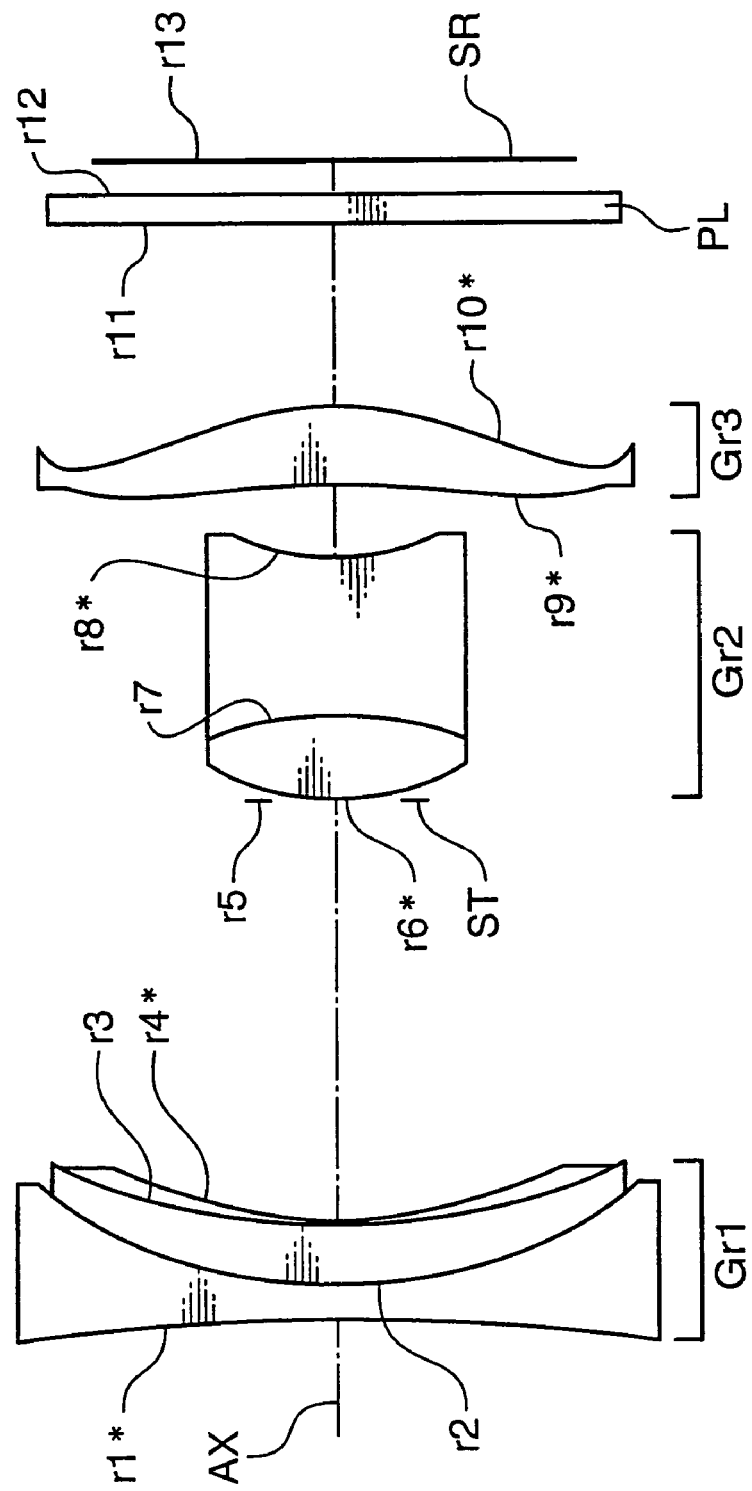
FIG. 4 is a cross-sectional view taken along an optical axis, showing a zoom optical system in a fourth embodiment of the present invention.

FIG. 4 is a cross-sectional view taken along an optical axis (AX), showing an arrangement of lens groups in a zoom optical system as the fourth embodiment of the present invention. The second lens element in the fourth embodiment is a composite aspherical lens element produced by forming a thin layer of a resin material on a spherical base member made of a glass material. Since the resin material to be used in the composite aspherical lens element merely exhibits an additive function to the glass base member, the resin coat is not treated as an independent optical element. The composite aspherical lens element is treated as an element equivalent to an aspherical glass base member. Accordingly, the number of the lens elements of the composite aspherical lens element is counted as one, and the refractive index of the glass material composing the base member of the composite aspherical lens element is defined as the refractive index of the composite aspherical lens element.

The zoom optical system in the fourth embodiment as shown in FIG. 4 is constituted of first through third lens groups (Gr1, Gr2, Gr3) in this order from the object side. Specifically, the first lens group (Gr1) having a negative optical power as a whole is composed of a cemented lens element constituted of a negative meniscus lens element convex to the object side, and a positive meniscus lens element convex to the object side. The second lens group (Gr2) having a positive optical power as a whole is composed of a cemented lens element constituted of a positive biconvex lens element and a negative biconcave lens element. The third lens group (Gr3) having a positive optical power as a whole is composed of a positive meniscus lens element convex to the imaging side.

In the fourth embodiment having the above lens group arrangement, in case of zooming from the wide-angle limit (W) to the telephoto limit (T), as shown in FIG. 21G, the first lens group (Gr1) makes a U-turn while approaching toward the image sensor in the course of zooming. Specifically, the first lens group (Gr1) is moved closest to the image sensor around the mid point (M), and thereafter, is moved toward the object. The second lens group (Gr2) is moved toward the object, and the third lens group (Gr3) is substantially linearly moved or makes a U-turn.

Fifth Embodiment

Figure 5:
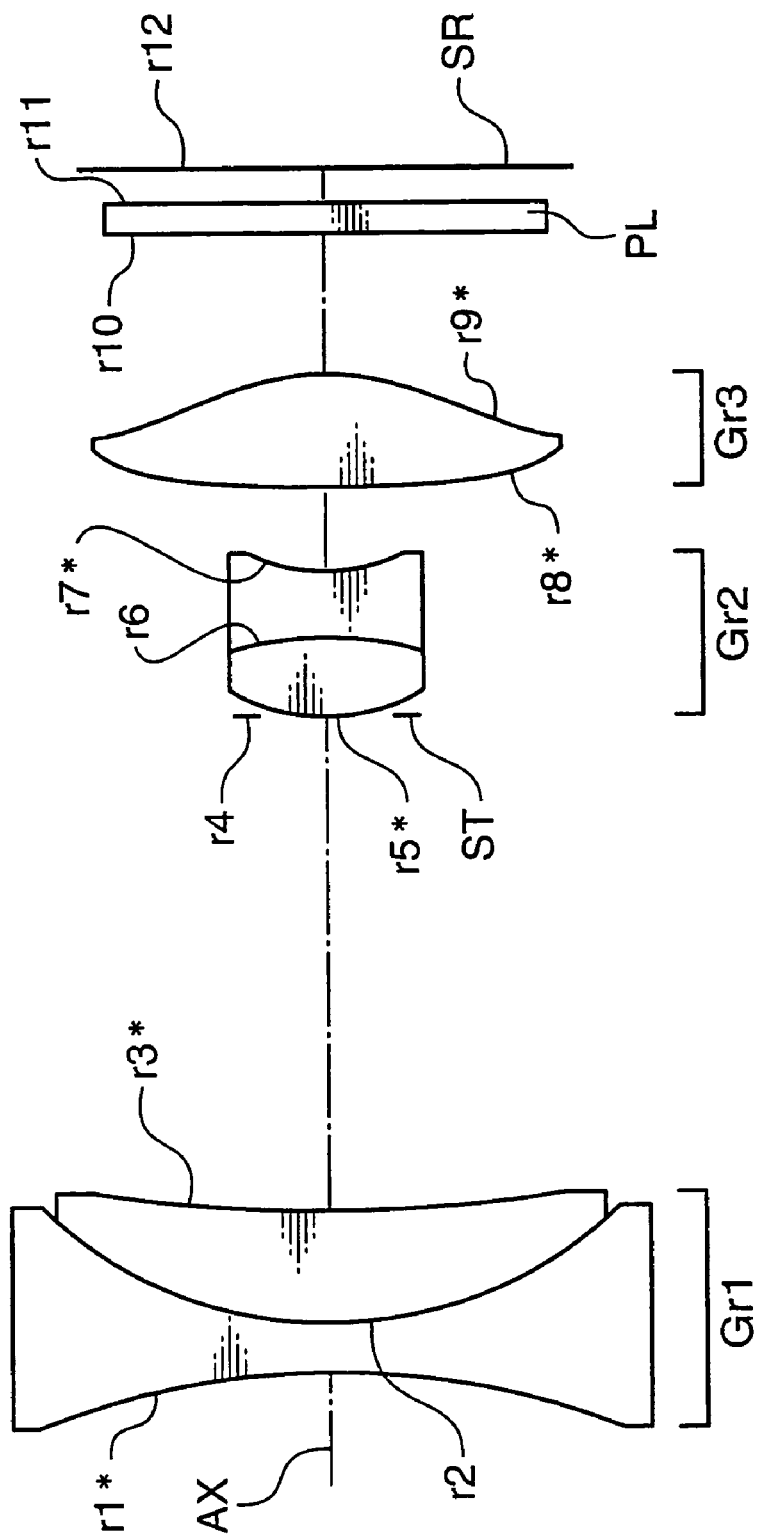
FIG. 5 is a cross-sectional view taken along an optical axis, showing a zoom optical system in a fifth embodiment of the present invention.

FIG. 5 is a cross-sectional view taken along an optical axis (AX), showing an arrangement of lens groups in a zoom optical system as the fifth embodiment of the present invention. The zoom optical system in the fifth embodiment is constituted of first through third lens groups (Gr1, Gr2, Gr3) in this order from the object side. Specifically, the first lens group (Gr1) having a negative optical power as a whole is composed of a cemented lens element constituted of a negative biconcave lens element and a positive meniscus lens element convex to the object side. The second lens group (Gr2) having a positive optical power as a whole is composed of a positive biconvex lens element and a negative biconcave lens element. The third lens group (Gr3) having a positive optical power as a whole is composed of a positive biconvex lens element.

In the fifth embodiment having the above lens group arrangement, in case of zooming from the wide-angle limit (W) to the telephoto limit (T), as shown in FIG. 21G, the first lens group (Gr1), the second lens group (Gr2), and the third lens group (Gr3) are moved in the same manner as in the fourth embodiment.

Sixth Embodiment

Figure 6:
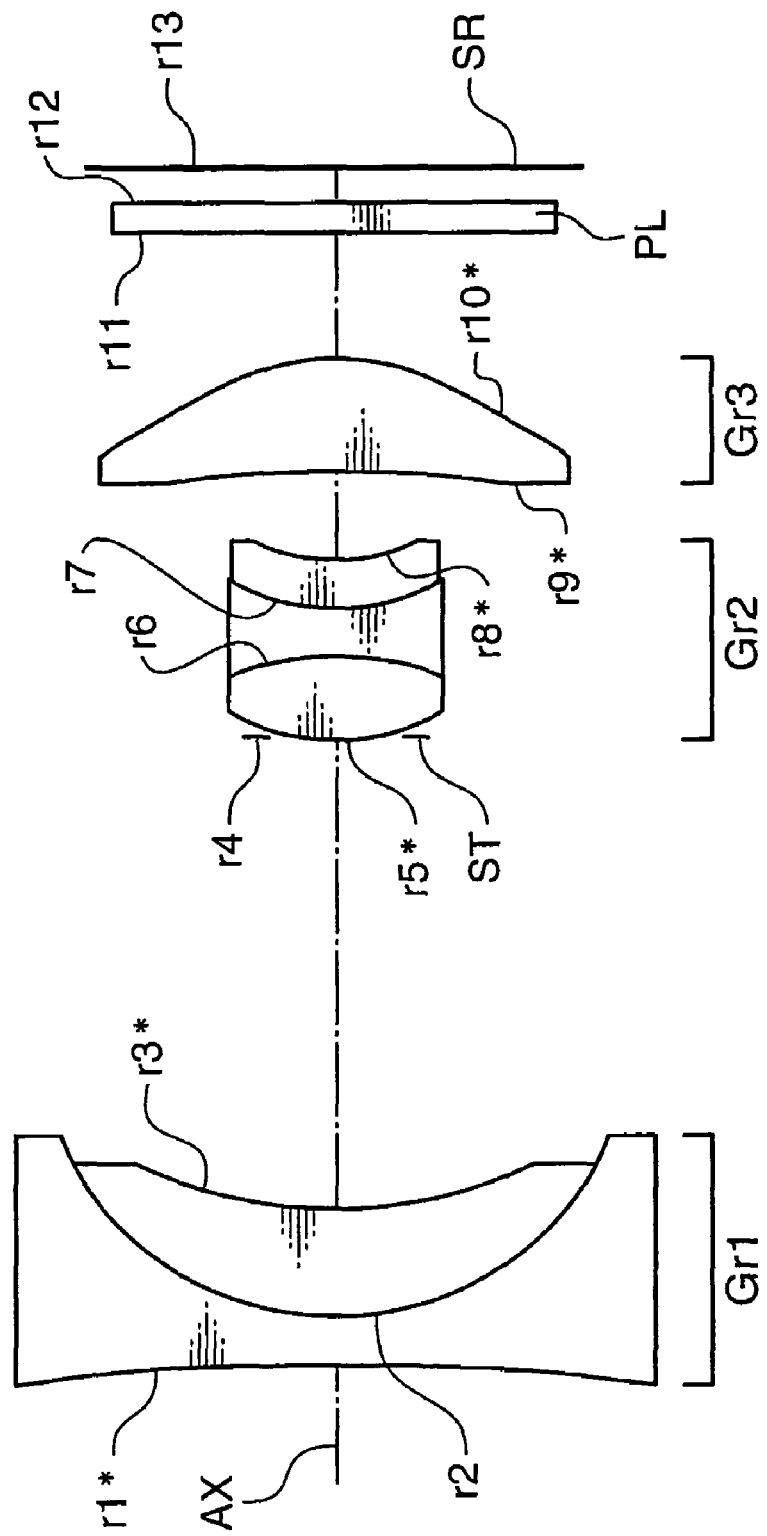
FIG. 6 is a cross-sectional view taken along an optical axis, showing a zoom optical system in a sixth embodiment of the present invention.

FIG. 6 is a cross-sectional view taken along an optical axis (AX), showing an arrangement of lens groups in a zoom optical system as the sixth embodiment of the present invention. The zoom optical system in the sixth embodiment is constituted of first through third lens groups (Gr1, Gr2, Gr3) in this order from the object side. Specifically, the first lens group (Gr1) having a negative optical power as a whole is composed of a cemented lens element constituted of a negative meniscus lens element convex to the object side and a positive meniscus lens element convex to the object side. The second lens group (Gr2) having a positive optical power as a whole is composed of a cemented lens element constituted of a positive biconvex lens element, a negative biconcave lens element, and a positive meniscus lens element convex to the object side. The third lens group (Gr3) having a positive optical power as a whole is composed of a positive meniscus lens element convex to the imaging side.

In the sixth embodiment having the above lens group arrangement, in case of zooming from the wide-angle limit (W) to the telephoto limit (T), as shown in FIG. 21G, the first lens group (Gr1), the second lens group (Gr2), and the third lens group (Gr3) are moved in the similar manner as in the fourth and the fifth embodiments.

Seventh Embodiment

Figure 7:
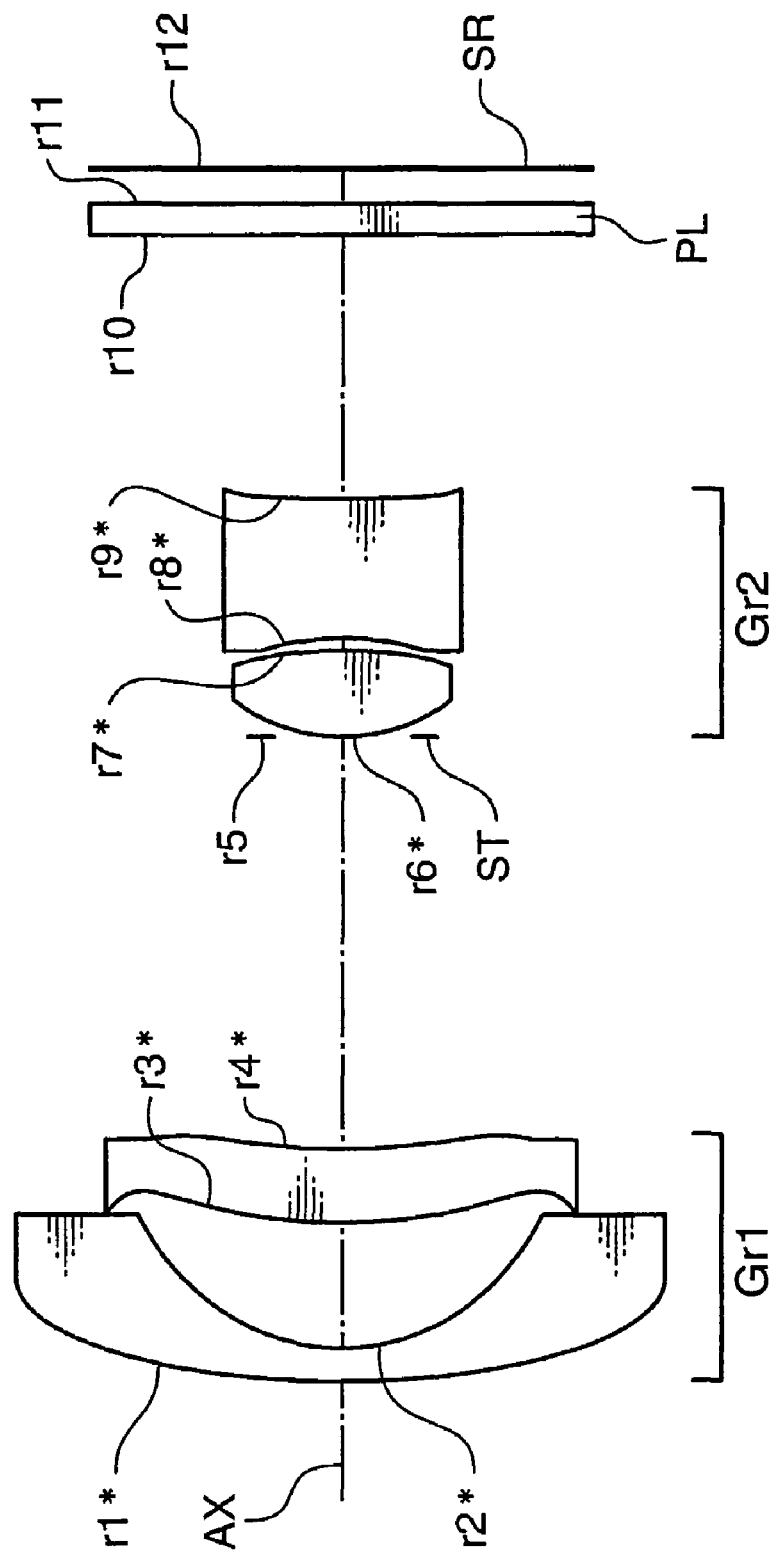
FIG. 7 is a cross-sectional view taken along an optical axis, showing a zoom optical system in a seventh embodiment of the present invention.

FIG. 7 is a cross-sectional view taken along an optical axis (AX), showing an arrangement of lens groups in a zoom optical system as the seventh embodiment of the present invention. The seventh embodiment as shown in FIG. 7 is different from the foregoing embodiments in that the zoom optical system in the seventh embodiment is constituted of a first lens group (Gr1) having a negative optical power, and a second lens group (Gr2) having a positive optical power. The zoom optical system in the seventh embodiment is constituted of the first and the second lens groups (Gr1, Gr2) in this order from the object side. Specifically, the first lens group (Gr1) having a negative optical power as a whole is composed of a negative meniscus lens element convex to the object side, and a positive meniscus lens element convex to the object side. The second lens group (Gr2) having a positive optical power as a whole is composed of a positive biconvex lens element, and a negative meniscus lens element convex to the imaging side.

In the seventh embodiment having the above lens group arrangement, in case of zooming from the wide-angle limit (W) to the telephoto limit (T), as shown in FIG. 21B, the first lens group (Gr1) is moved in a direction away from the object, and the second lens group (Gr2) is linearly moved toward the object.

Eight Embodiment

Figure 8:
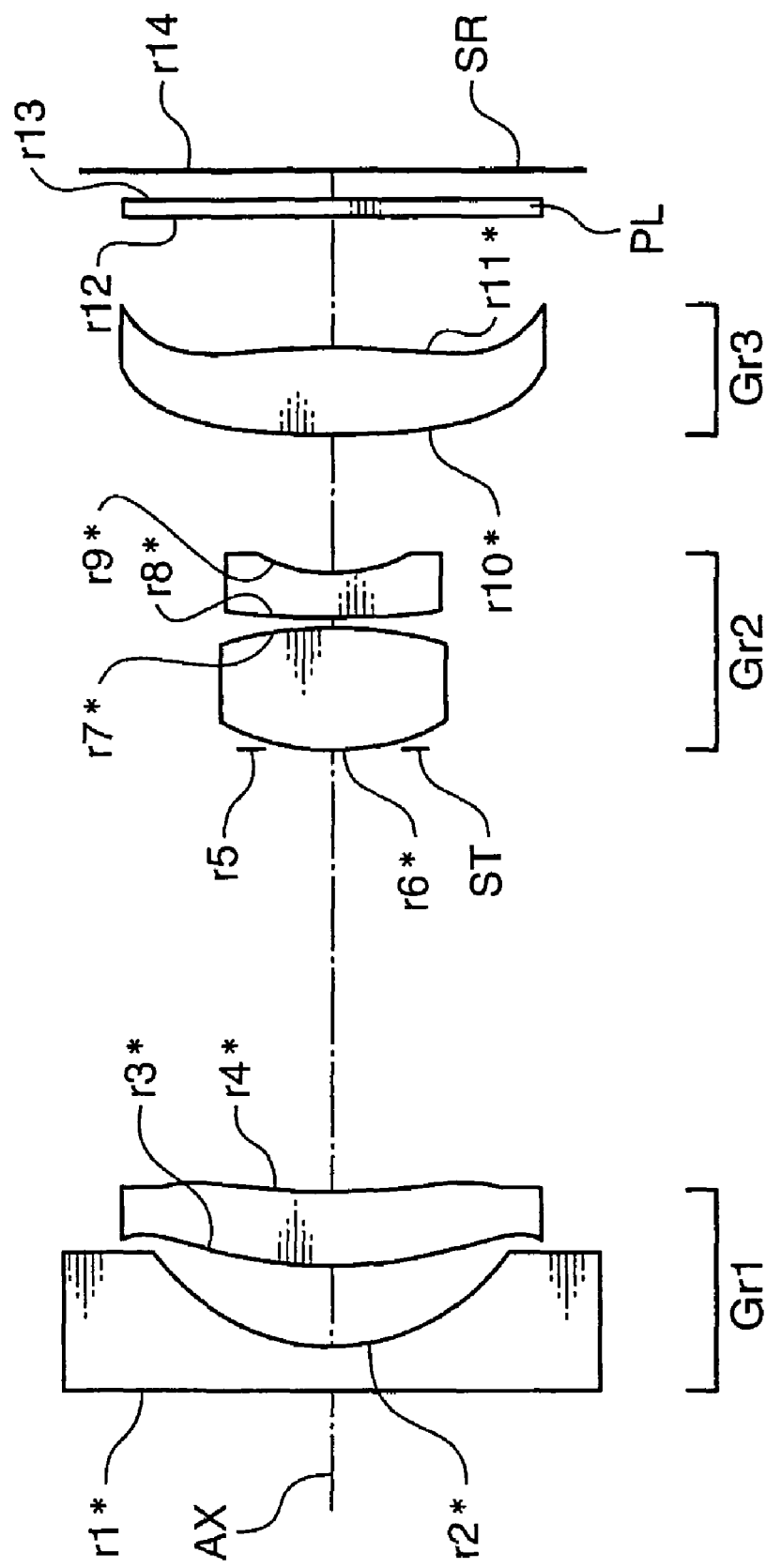
FIG. 8 is a cross-sectional view taken along an optical axis, showing a zoom optical system in an eighth embodiment of the present invention.

FIG. 8 is a cross-sectional view taken along an optical axis (AX), showing an arrangement of lens groups in a zoom optical system as the eighth embodiment of the present invention. The zoom optical system in the eighth embodiment is constituted of first through third lens groups (Gr1, Gr2, Gr3) in this order from the object side. Specifically, the first lens group (Gr1) having a negative optical power as a whole is composed of a negative biconcave lens element, and a positive meniscus lens element convex to the object side. The second lens group (Gr2) having a positive optical power as a whole is composed of a positive biconvex lens element, and a negative lens element convex to the object side. The third lens group (Gr3) having a positive optical power as a whole is composed of a positive biconvex lens element.

In the eighth embodiment having the above lens group arrangement, in case of zooming from the wide-angle limit (W) to the telephoto limit (T), as shown in FIG. 21D, the first lens group (Gr1) makes a U-turn, while approaching the image sensor side in the course of zooming. Specifically, the first lens group (Gr1) is moved closest to the object around the mid point (M), and then is moved toward the object. The second lens group (Gr2) is linearly moved toward the object, and the third lens group (Gr3) is fixed or immovable.

Ninth Embodiment

Figure 9:
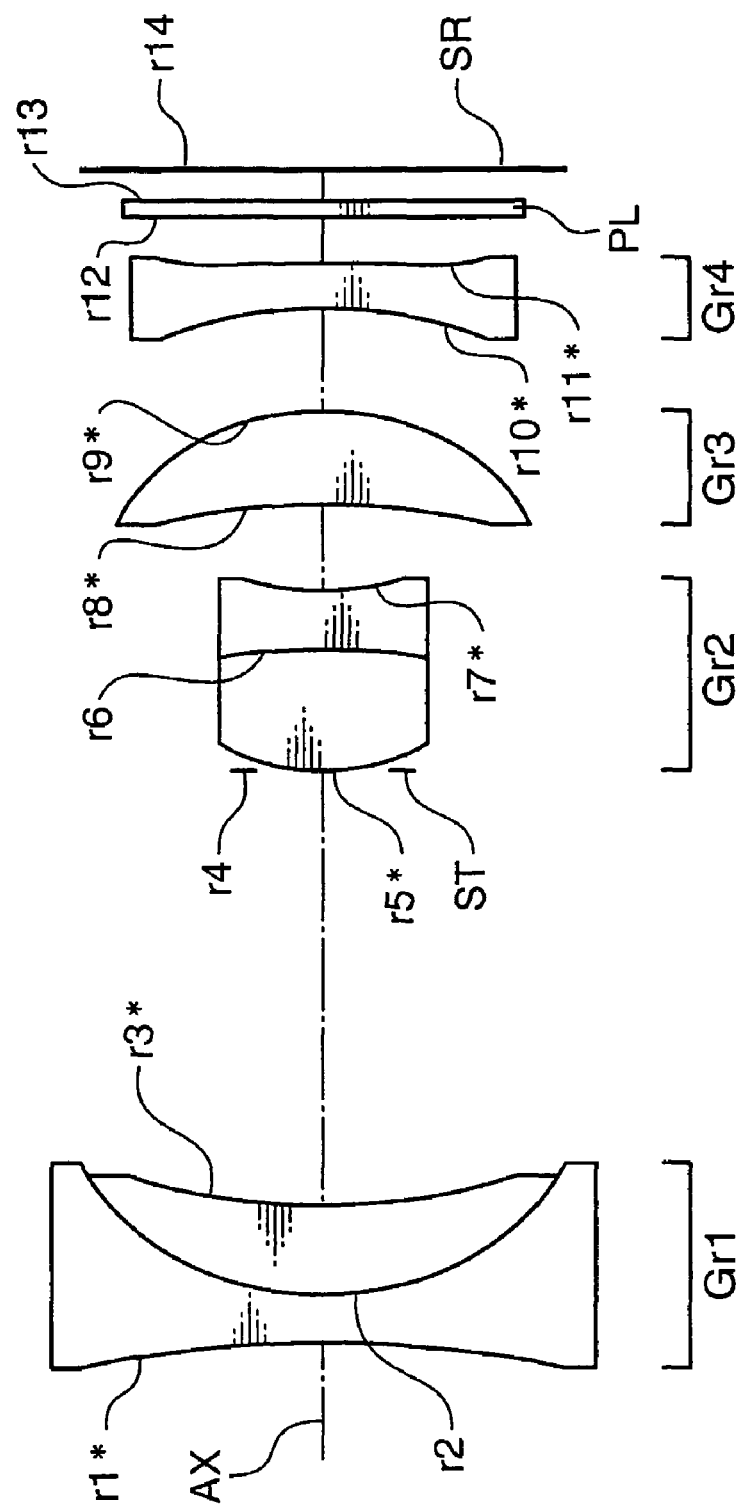
FIG. 9 is a cross-sectional view taken along an optical axis, showing a zoom optical system in a ninth embodiment of the present invention.

FIG. 9 is a cross-sectional view taken along an optical axis (AX), showing an arrangement of lens groups in a zoom optical system as the ninth embodiment of the present invention. The ninth embodiment as shown in FIG. 9 is different from the foregoing embodiments in that the zoom optical system in the ninth embodiment is additionally provided with a fourth lens group (Gr4) having a negative optical power. The zoom optical system in the ninth embodiment is constituted of first through fourth lens groups (Gr1, Gr2, Gr3, Gr4) in this order from the object side. Specifically, the first lens group (Gr1) having a negative optical power as a whole is composed of a cemented lens element constituted of a negative biconcave lens element and a positive meniscus lens element convex to the object side. The second lens group (Gr2) having a positive optical power as a whole is composed of a cemented lens element constituted of a positive biconvex lens element and a negative biconcave lens element. The third lens group (Gr3) having a positive optical power as a whole is composed of a positive meniscus lens element convex to the imaging side. The fourth lens group (Gr4) having a negative optical power as a whole is composed of a negative biconcave lens element.

In the ninth embodiment having the above lens group arrangement, in case of zooming from the wide-angle limit (W) to the telephoto limit (T), as shown in FIG. 21F, the first lens group (Gr1), the second lens group (Gr2), and the third lens group (Gr3) are moved in the similar manner as in the second embodiment. The fourth lens group (Gr4) is fixed or immovable.

Tenth Embodiment

Figure 10:
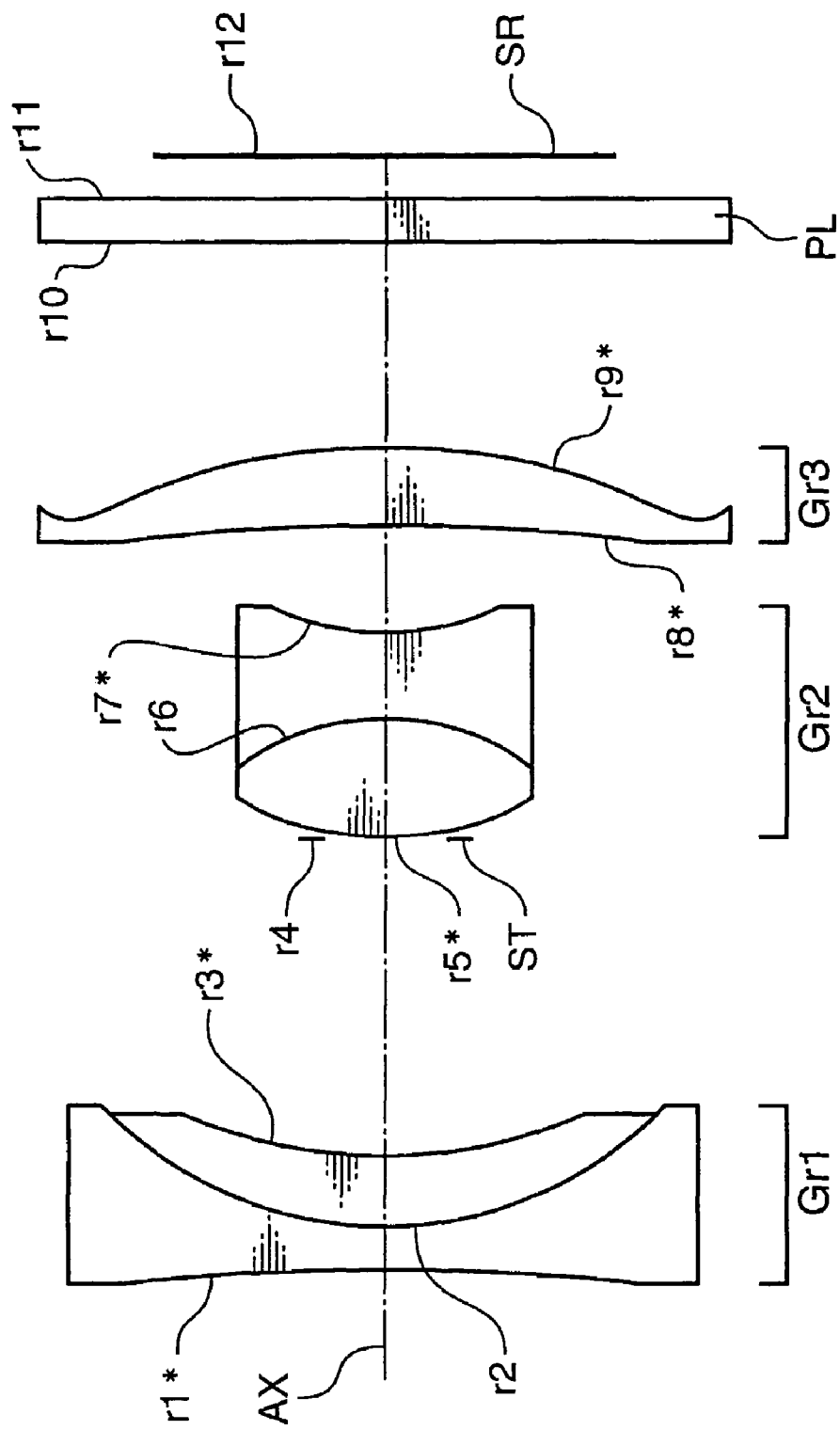
FIG. 10 is a cross-sectional view taken along an optical axis, showing a zoom optical system in a tenth embodiment of the present invention.
Figure 11A:
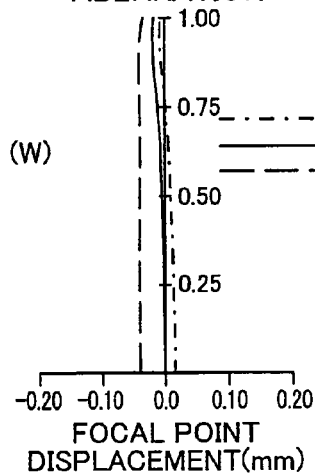
FIGS. 11A through 11I are aberration diagrams regarding spherical aberration, astigmatism, and distortion aberration of the lens groups in the zoom optical system in the first embodiment.
Figure 11B:
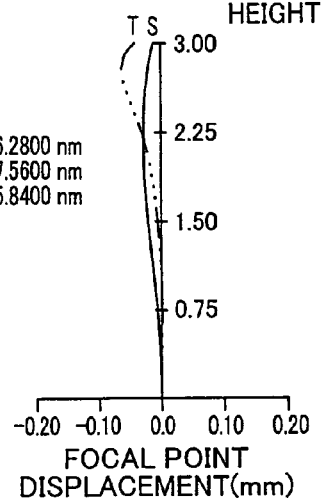
Figure 11C:
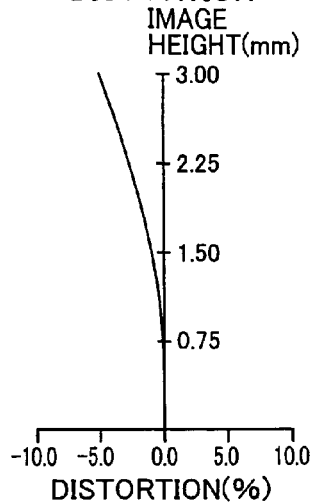
Figure 11D:
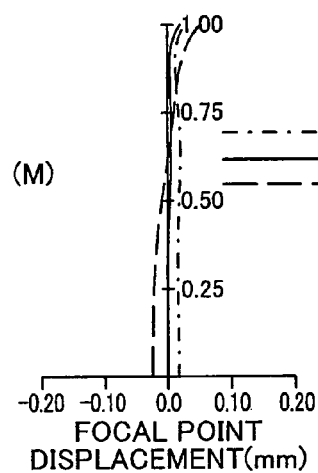
Figure 11E:
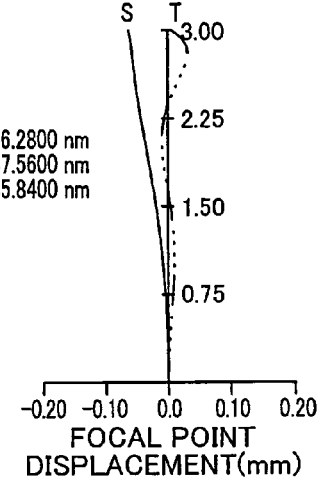
Figure 11F:
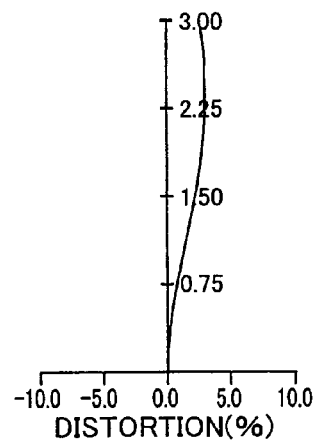
Figure 11G:
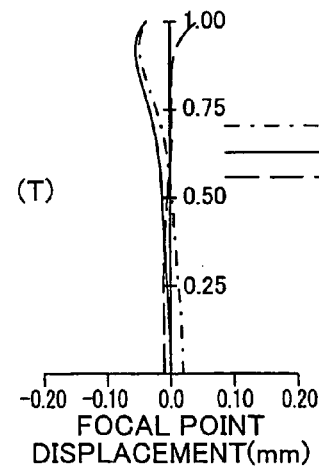
Figure 11H:
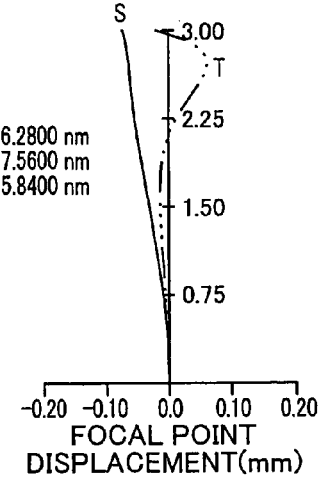
Figure 11I:
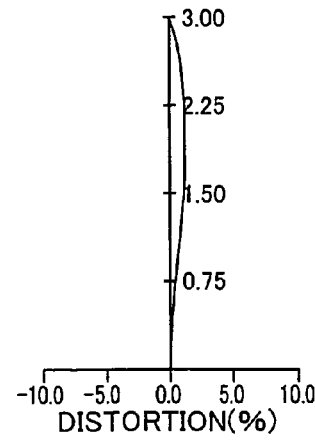
Figure 12A:
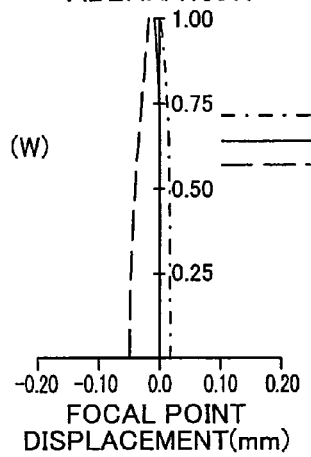
FIGS. 12A through 12I are aberration diagrams regarding spherical aberration, astigmatism, and distortion aberration of the lens groups in the zoom optical system in the second embodiment.
Figure 12B:
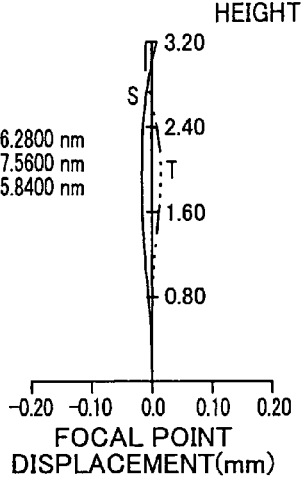
Figure 12C:
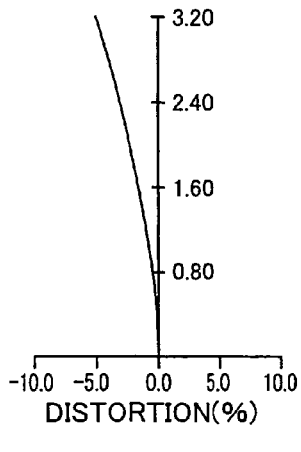
Figure 12D:
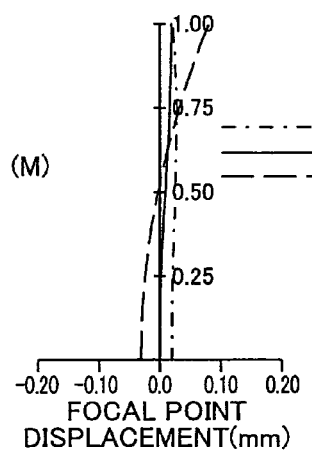
Figure 12E:
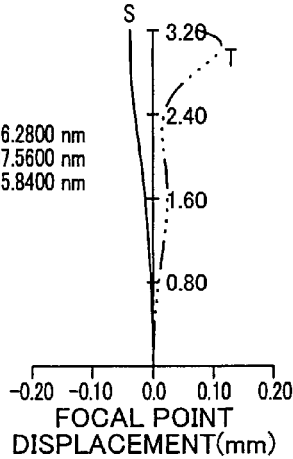
Figure 12F:
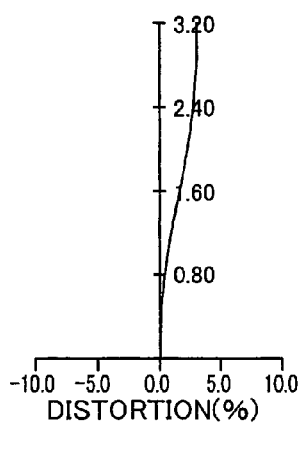
Figure 12G:
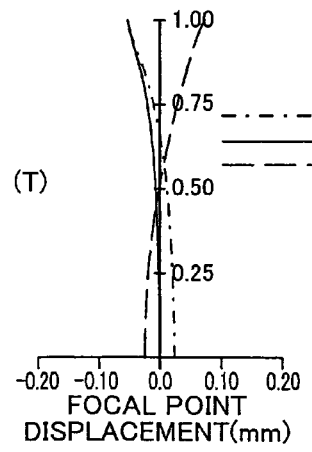
Figure 12H:
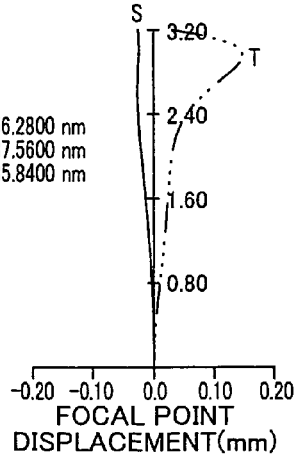
Figure 12I:
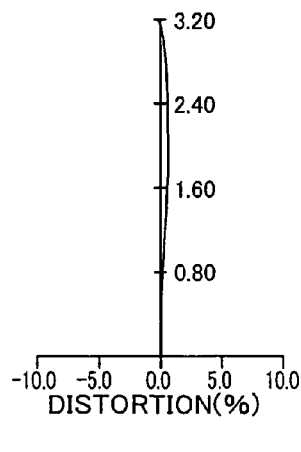
Figure 13A:
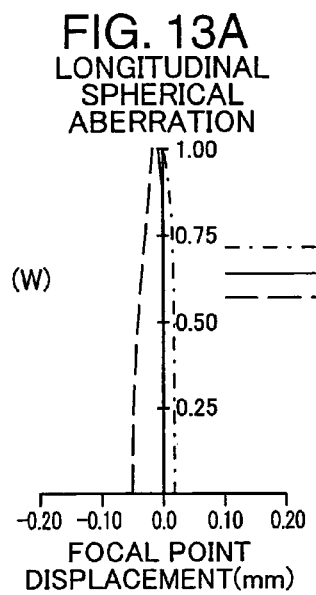
FIGS. 13A through 13I are aberration diagrams regarding spherical aberration, astigmatism, and distortion aberration of the lens groups in the zoom optical system in the third embodiment.
Figure 13B:
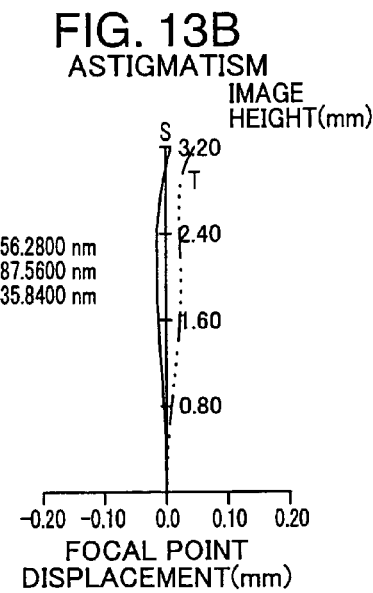
Figure 13C:
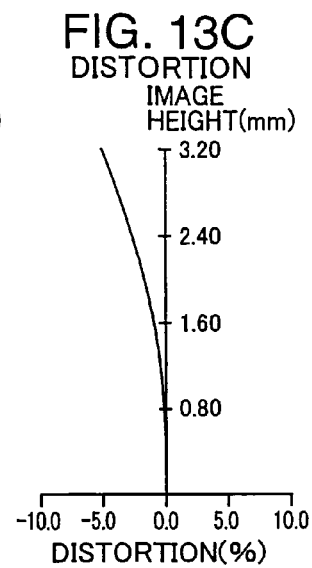
Figure 13D:
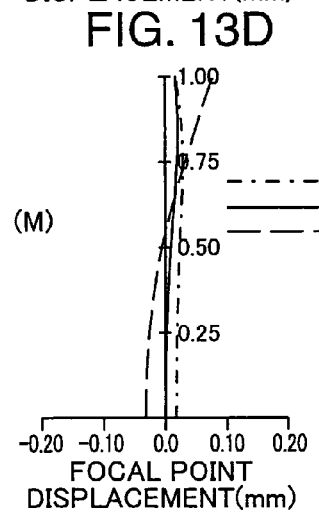
Figure 13E:
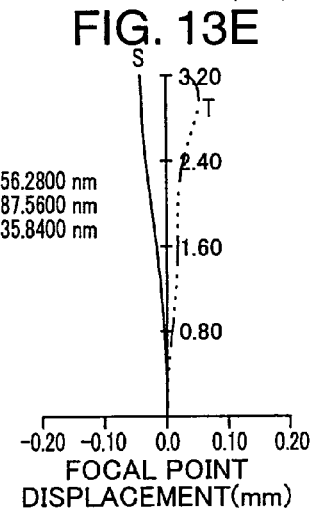
Figure 13F:
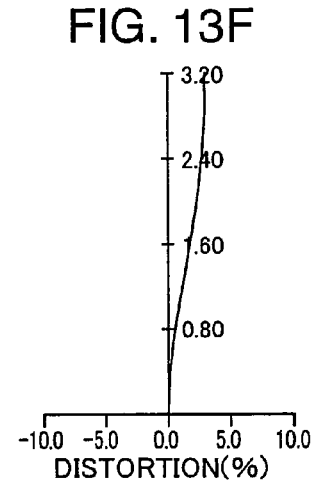
Figure 13G:
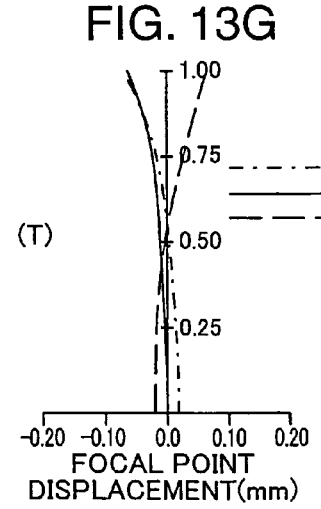
Figure 13H:
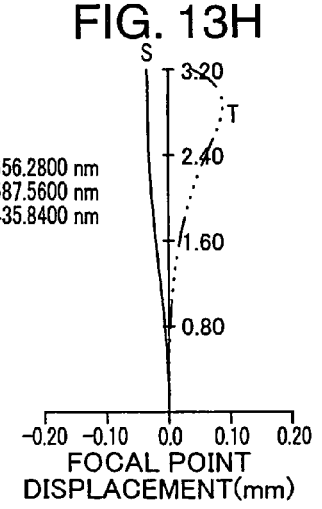
Figure 13I:
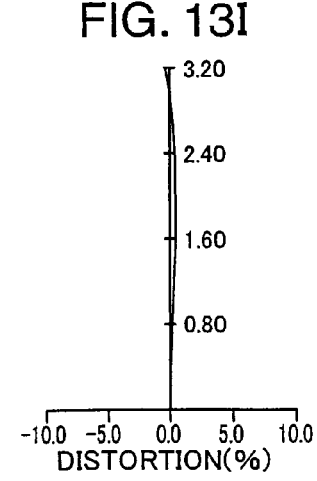
Figure 14A:
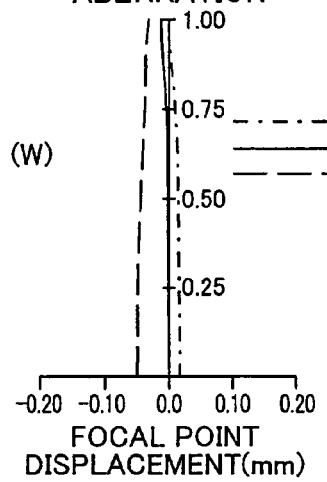
FIGS. 14A through 14I are aberration diagrams regarding spherical aberration, astigmatism, and distortion aberration of the lens groups in the zoom optical system in the fourth embodiment.
Figure 14B:
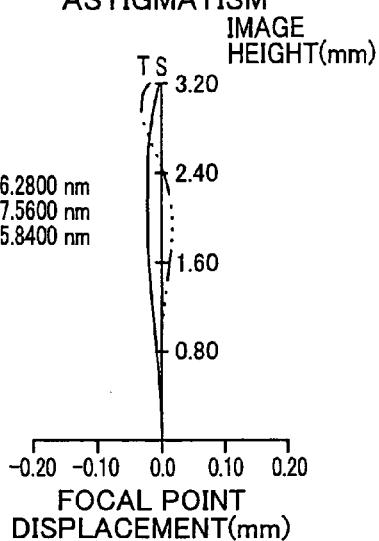
Figure 14C:
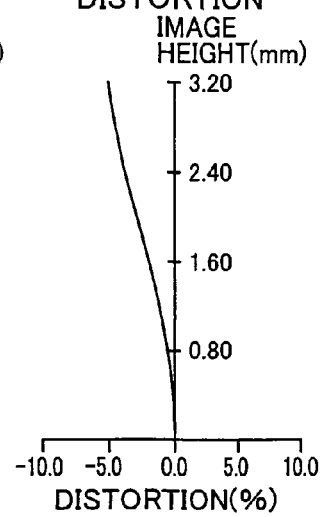
Figure 14D:
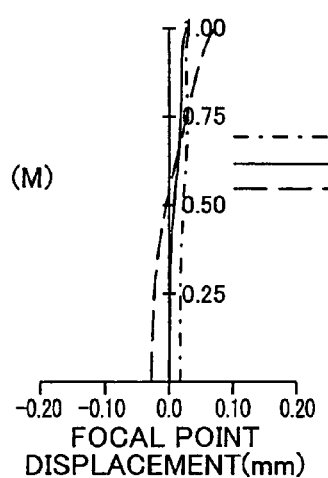
Figure 14E:
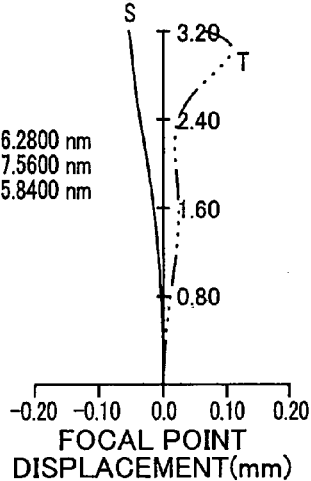
Figure 14F:
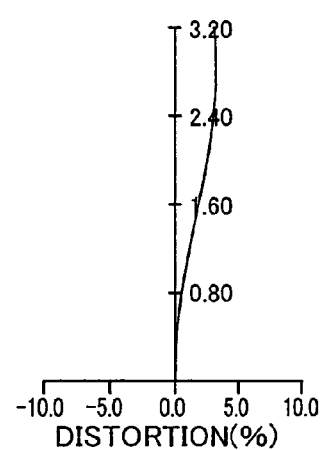
Figure 14G:
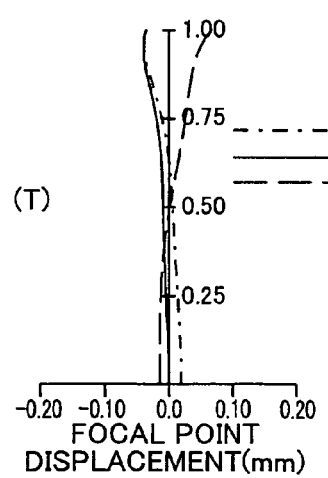
Figure 14H:
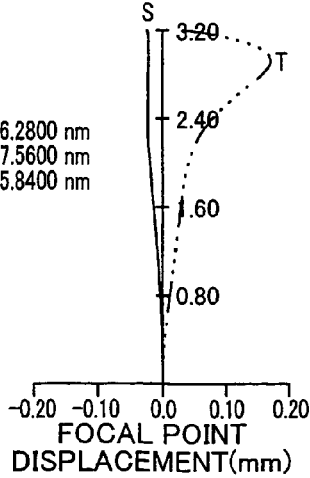
Figure 14I:
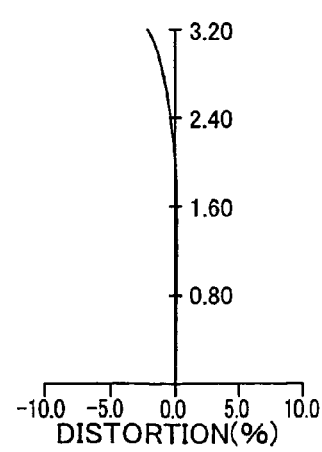
Figure 18A:
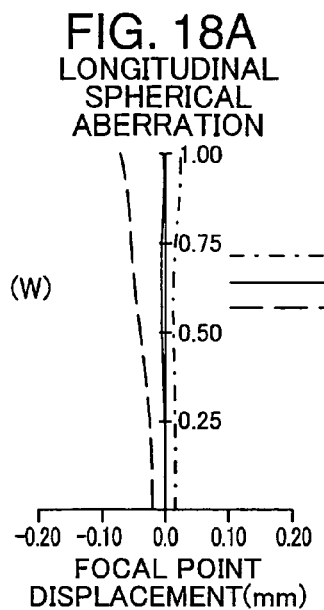
FIGS. 18A through 18I are aberration diagrams regarding spherical aberration, astigmatism, and distortion aberration of the lens groups in the zoom optical system in the eighth embodiment.
Figure 18B:
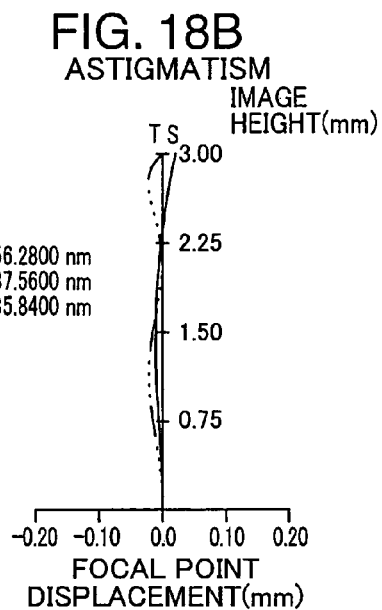
Figure 18C:
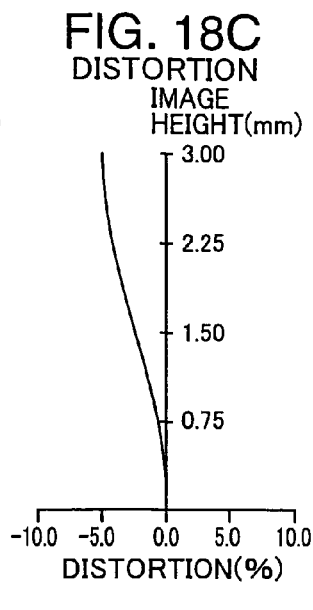
Figure 18D:
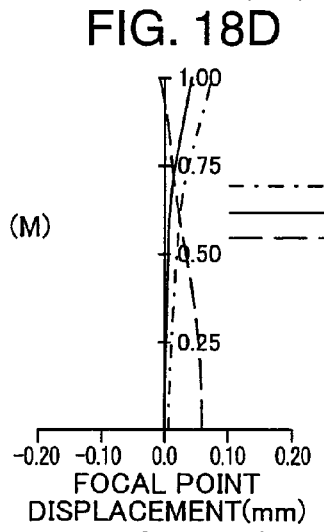
Figure 18E:
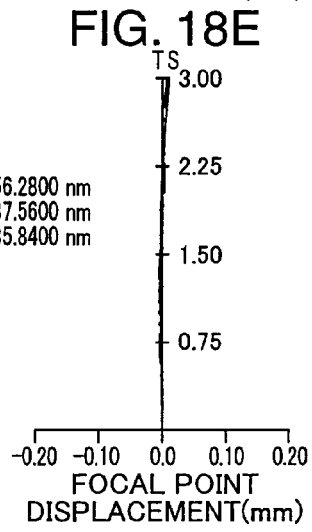
Figure 18F:
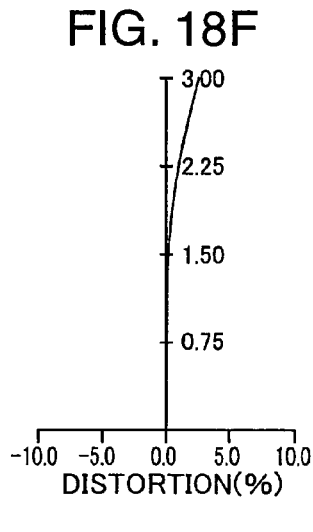
Figure 18G:
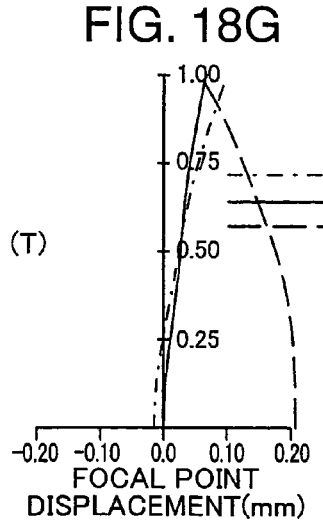
Figure 18H:
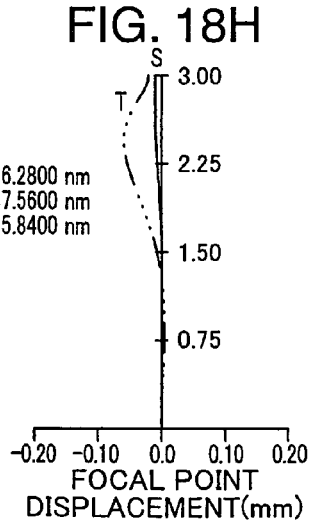
Figure 18I:
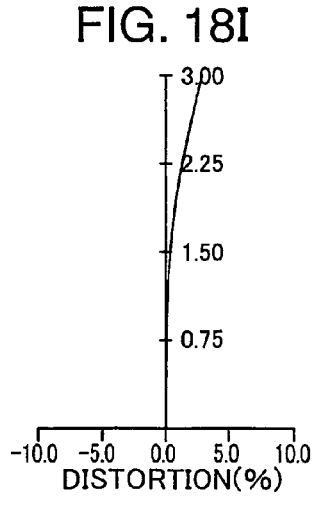
Figure 19A:
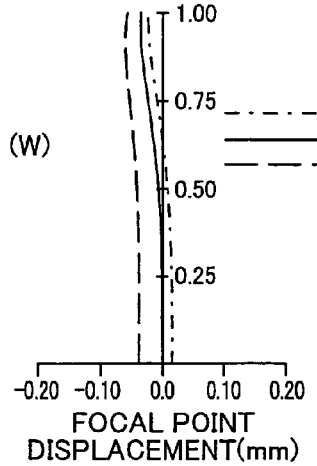
FIGS. 19A through 19I are aberration diagrams regarding spherical aberration, astigmatism, and distortion aberration of the lens groups in the zoom optical system in the ninth embodiment.
Figure 19B:
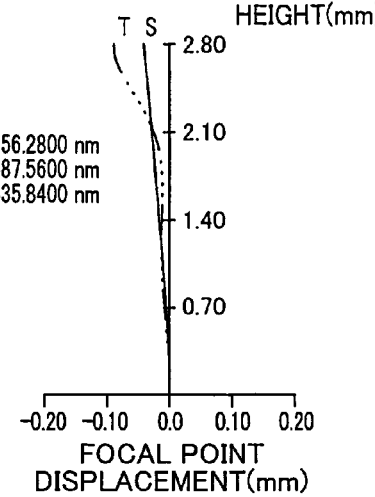
Figure 19C:
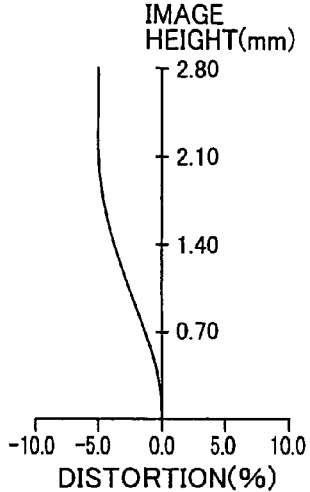
Figure 19D:
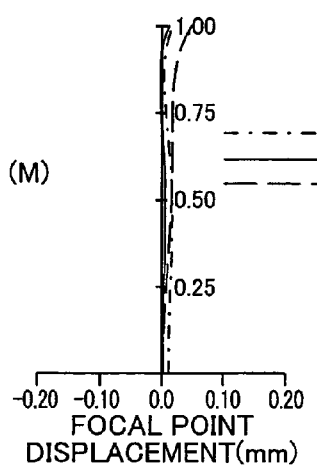
Figure 19E:
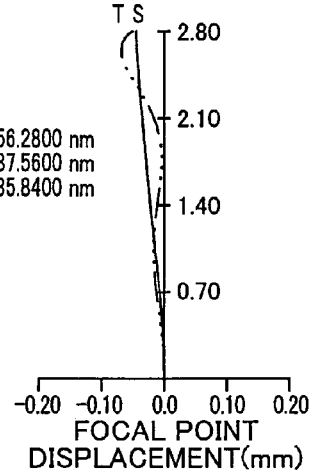
Figure 19F:
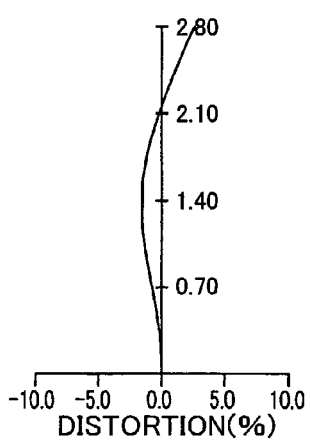
Figure 19G:
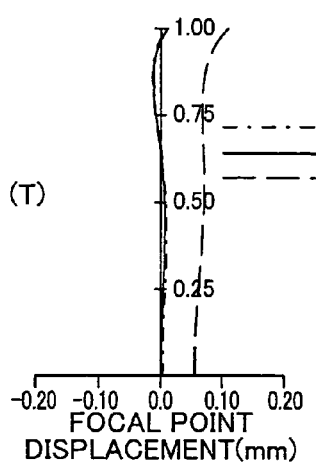
Figure 19H:
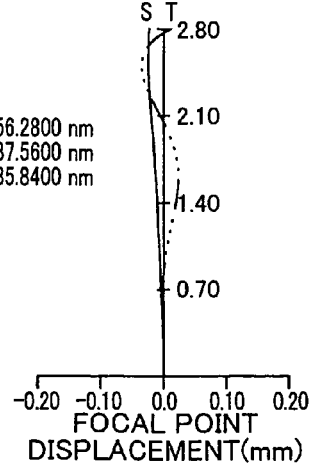
Figure 19I:
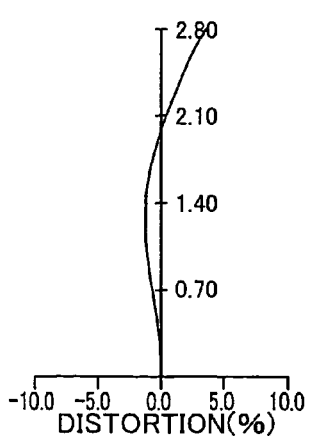

FIG. 10 is a cross-sectional view taken along an optical axis (AX), showing an arrangement of lens groups in a zoom optical system as the tenth embodiment of the present invention. The zoom optical system in the tenth embodiment is constituted of first through third lens groups (Gr1, Gr2, Gr3) in this order from the object side. Specifically, the first lens group (Gr1) having a negative optical power as a whole is composed of a cemented lens element constituted of a negative biconcave lens element and a positive meniscus lens element convex to the object side. The second lens group (Gr2) having a positive optical power as a whole is composed of a cemented lens element constituted of a positive biconvex lens element and a negative biconcave lens element. The third lens group (Gr3) having a positive optical power as a whole is composed of a positive meniscus lens element convex to the imaging side.

In the tenth embodiment having the above lens group arrangement, in case of zooming from the wide-angle limit (W) to the telephoto limit (T), as shown in FIG. 21H, the first lens group (Gr1) is fixed or immovable. The second lens group (Gr2) is moved toward the object, and the third lens group (Gr3) is substantially linearly moved or makes a U-turn.

In the first through the tenth embodiments, the aperture stop (ST) is moved along with the second lens group (Gr2) having a largest moving distance. This arrangement enables to suppress increase in effective outer diameter of the second lens group (Gr2). Further, since this arrangement eliminates providing a driver dedicatedly used for the aperture stop, the arrangement of the lens driver can be simplified, and the entirety of the imaging lens device can be miniaturized.

Alternatively, it is possible to move the aperture stop (ST) independently of the lens groups. In such an altered arrangement, in zooming from the wide-angle limit (W) to the telephoto limit (T), the incident angle of an off-axis ray onto the image sensor (SR) can be properly controlled by the aperture stop (ST).

In the following, requirements or conditional formulae regarding optical characteristics of the lens assembly constituting the zoom optical system embodying the present invention are described, along with grounds for determining the requirements or grounds for determining the numerical ranges.

Preferably, the refractive index of the positive lens element in the second lens group (Gr2) is 1.75 or more. If the refractive index is smaller than 1.75, it is necessary to reduce the radius of curvature of the positive lens element in the second lens group (Gr2) in order to acquire an optical power required for zooming, which may resultantly make it difficult to produce the zoom optical system.

In the zoom optical systems of the embodiments, it is desirable to satisfy the following conditional formula (1)' regarding the composite focal length $f_2$ of the second lens group (Gr2) and the composite focal length $f_W$ of the entirety of the optical system at the wide-angle limit (W) for the following reasons.

$$1.0 < f_2/f_W < 1.65 \tag{1}'$$

If the upper limit of the conditional formula (1)' is transgressed, the moving distance of the second lens group (Gr2) in zooming is duly increased because of a weak optical power of the second lens group (Gr2), with the result that the entire length of the optical system is increased. On the other hand, if the lower limit of the conditional formula (1)' is transgressed, error sensitivity due to decentering of the second lens group (Gr2) is increased, and adjustment regarding the lens elements in the second lens group (Gr2) or adjustment regarding the lens groups is required, which may lead to production cost increase.

It is desirable to satisfy the following conditional formula (2)' regarding the moving distance $t_2$ of the second lens group (Gr2) in zooming from the wide-angle limit (W) to the telephoto limit (T), and the maximal value TL of the optical axis distance from an apex of a lens surface of the lens element closest to the object to the light receiving plane of the image sensor (SR) in the entirety of the zooming range for the following reasons.

$$0.2 < t_2/TL < 0.4 \tag{2}'$$

If the upper limit of the conditional formula (2)' is transgressed, it is impossible to secure a space for a mechanical shutter which is effective in preventing smear. Furthermore, the arrangement of a lens barrel is complicated in order to avoid contact between the lens groups to be driven, which may lead to production cost increase. On the other hand, if the lower limit of the conditional formula (2)' is transgressed, error sensitivity due to decentering of the second lens group (Gr2) is increased, which makes it difficult to produce the zoom optical system.

Further, it is desirable to satisfy the following conditional formula (4) regarding the composite focal length $f_2$ of the second lens group (Gr2), and a composite focal length $f_T$ of the entirety of the optical system for the following reasons.

$$0.3 < f_2/f_T < 0.9 \tag{4}$$

If the upper limit of the conditional formula (4) is transgressed, the optical power of the second lens group (Gr2) is too weak to obtain a zoom ratio of about two to three times. On the other hand, if the lower limit of the conditional formula (4) is transgressed, error sensitivity of the second lens group (Gr2) is increased, which makes it difficult to produce the zoom optical system.

Furthermore, it is desirable to satisfy the following conditional formula (4)' regarding the composite focal length $f_2$ of the second lens group (Gr2), and the composite focal length $f_T$ of the entirety of the optical system for the following reasons.

$$0.4 < f_2/f_T < 0.8 \tag{4}'$$

If the upper limit of the conditional formula (4)' is transgressed, the moving distance of the second lens group (Gr2) in zooming is unduly increased due to a weak optical power of the second lens group (Gr2), with the result that the entire length of the optical system is increased. On the other hand, if the lower limit of the conditional formula (4)' is transgressed, error sensitivity due to decentering of the second lens group (Gr2) is increased, and adjustment regarding the lens elements in the second lens group (Gr2) or adjustment regarding the lens groups is necessary, which may lead to production cost increase.

Furthermore, it is desirable to satisfy the following conditional formula (5) regarding the second lens group (Gr2) for the following reasons.

$$\Delta v_2 \text{max} > 10 \tag{5}$$

where $\Delta v_2 \text{max}$ represents a maximal value of an absolute value of an Abbe number difference between the positive lens element and the negative lens element in the second lens group (Gr2). If the lower limit of the conditional formula (5) is transgressed, on-axis color aberration correction in the second lens group (Gr2) is insufficient, which may lower the on-axis contrast.

Preferably, in the zoom optical system, the first lens group (Gr1) is composed of at least one negative lens element and at least one positive lens element, and satisfies the following conditional formulae (6) and (7) for the following reasons.

$$\Delta N_1 \text{max} \geq 0.2 \tag{6}$$

$$\Delta v_1 \text{max} > 25 \tag{7}$$

where $\Delta N_1 \text{max}$ represents a maximal value of an absolute value of a refractive index difference between the lens elements in the first lens group (Gr1), and $\Delta v_1 \text{max}$ represents a maximal value of an absolute value of an Abbe number difference between the positive lens element and the negative lens element in the first lens group (Gr1).

Magnification color aberration can be desirably corrected by constituting the first lens group (Gr1) of at least one positive lens element and at least one negative lens element. If the lower limit of the conditional formula (6) is transgressed, it is impossible to reduce the Petzval sum in miniaturizing the optical system, and correction of field curvature and astigmatism is insufficient. On the other hand, if the lower limit of the conditional formula (7) is transgressed, correction in magnification color aberration is insufficient, which may lower the contrast in a peripheral area of a captured image.

Preferably, in the first lens group (Gr1), the negative lens element constituting the cemented lens element is biconcave, and the maximal value of the absolute value of the Abbe number difference between the positive lens element and the negative lens element satisfies the following conditional formula (7)' for the following reasons.

$$\Delta v_1 \text{max} > 30 \tag{7}'$$

If the first lens group (Gr1) is constituted of the cemented lens element, the effective optical power of each of the lens elements is decreased. In view of this, the negative lens element in the first lens group (Gr1) is preferably biconcave to obtain an intended negative power. If the lower limit of the conditional formula (7)' is transgressed in the case that the first lens group (Gr1) is constituted of the cemented lens element, correction in magnification color aberration is insufficient.

Preferably, the first lens group (Gr1) is constituted of a negative lens element, and a positive meniscus lens element convex to the object side in this order from the object side. Arranging the lens elements in this order enables to facilitate back focus adjustment at the wide-angle limit (W), and desirably corrects astigmatism of an off-axis ray incident with a wide angle of view, and magnification color aberration. The positive meniscus lens element is advantageous in desirably correcting astigmatism. Also, it is desirable to satisfy the following conditional formulae (8), (9), and (10) for the following reasons.

$$N_{1p}max \geq 1.7 \quad (8)$$

$$1 < |f_{1p}/f_1| < 3 \quad (9)$$

$$0.2 < |f_{1n}/f_{1p}| < 0.7 \quad (10)$$

where $N_{1p}$max represents a refractive index of the positive meniscus lens element in the first lens group (Gr1), $f_1$ represents a composite focal length of the first lens group (Gr1), $f_{1p}$ represents a focal length of the positive meniscus lens element in the first lens group (Gr1), and $f_{1n}$ represents a focal length of the negative lens element in the first lens group (Gr1).

If the lower limit of the conditional formula (8) is transgressed, it is difficult to correct field curvature and astigmatism in miniaturizing the zoom optical system. Specifically, if the optical power of the optical system in a state that the lower limit of the conditional formula (8) is transgressed substantially equal to that in a zoom optical system is intended to acquire, the radius of curvature of the lens element is decreased. As a result, a large aberration may occur, and it is difficult to produce the zoom optical system. If an optical system is designed to overcome these drawbacks, the size of the optical system is increased. Further, if the upper limit of the conditional formula (9) is transgressed, the Petzval value is increased, and correction in field curvature and astigmatism is insufficient. On the other hand, if the lower limit of the conditional formula (9) is transgressed, the negative power of the first lens group (Gr1) as a whole is weakened, which makes it difficult to perform back focus adjustment. Further, if the upper limit of the conditional formula (10) is transgressed, correction, particularly, in astigmatism and distortion aberration at the wide-angle limit (W) is insufficient. On the other hand, if the lower limit of the conditional formula (10) is transgressed, the optical power of each of the lens elements constituting the first lens group (Gr1) is unduly strong, which makes it difficult to produce the zoom optical system.

Furthermore, it is desirable to satisfy the following conditional formulae (11), (12) regarding the composite focal length $f_1$ of the first lens group (Gr1), the composite focal length $f_W$ of the entirety of the optical system at the wide-angle limit (W), and the composite focal length $f_T$ of the entirety of the optical system at the telephoto limit (T) for the following reasons.

$$1 < |f_1/f_W| < 4 \quad (11)$$

$$0.3 < |f_1/f_T| < 2 \quad (12)$$

If the respective upper limits of the conditional formulae (11), (12) are transgressed, correction in astigmatism and distortion aberration, particularly, at the wide-angle limit (W) is insufficient. On the other hand, if the respective lower limits of the conditional formulae (11), (12) are transgressed, the optical power of each of the lens elements constituting the first lens group (Gr1) is unduly strong, and influence of magnification color aberration is intolerable. As a result, correction of such an excessively large magnification color aberration is difficult.

Furthermore, it is desirable to satisfy the following conditional formulae (11)', (12)' for the following reasons.

$$1.5 < |f_1/f_W| < 3.5 \quad (11)'$$

$$0.5 < |f_1/f_T| < 1.5 \quad (12)'$$

If the respective upper limits of the conditional formulae (11)', (12)' are transgressed, the negative optical power of the first lens group (Gr1) is weakened, which resultantly increases the diameter of a forwardmost lens element. On the other hand, if the respective lower limits of the conditional formulae (11)', (12)' are transgressed, the optical power of the first lens group (Gr1) is unduly increased, and error sensitivity of the first lens group (Gr1), particularly, at the telephoto limit (T) is increased, which necessitates adjustment regarding the lens elements.

Preferably, the second lens group (Gr2) and the third lens group (Gr3) satisfy the following conditional formula (13) for the following reasons.

$$0.2 < f_2/f_3 < 1 \quad (13)$$

where $f_3$ represents a composite focal length of the third lens group (Gr3).

If the upper limit of the conditional formula (13) is transgressed, the moving distance of the second lens group (Gr2) is unduly increased due to a weak optical power of the second lens group (Gr2). On the other hand, if the lower limit of the conditional formula (13) is transgressed, the moving distance of the third lens group (Gr3) is unduly increased due to a weak optical power of the third lens group (Gr3). In any case, the entire length of the optical system is increased.

Preferably, the third lens group (Gr3) is composed of a single positive lens element, and the refractive index of the positive lens element is 1.65 or more. If the refractive index of the positive lens element in the third lens group (Gr3) is smaller than 1.65, the moving distance of the third lens group (Gr3) in zooming is unduly increased, which may increase the entire length of the optical system.

Furthermore, it is desirable to satisfy the following conditional formula (14) for the following reasons.

$$0.1 < Y'/TL < 0.5 \quad (14)$$

where Y' represents an effective image circle diameter.

If the upper limit of the conditional formula (14) is transgressed, the moving distance of the second lens group (Gr2) for zooming is unduly decreased. As a result, the optical power required for the second lens group (Gr2) is unduly increased, which makes it difficult to satisfy production requirements on a radius of curvature of each of the lens elements in the second lens group (Gr2). On the other hand, if the lower limit of the conditional formula (14) is transgressed, the entire length of the optical system is increased, which makes it difficult to load the optical system in a digital apparatus such as a mobile phone in the aspect of the size of the apparatus.

Furthermore, it is desirable to satisfy the following conditional formula (14)' for the following reasons.

$$0.13 < Y'/TL < 0.3 \quad (14)'$$

If the upper limit of the conditional formula (14)' is transgressed, the optical power of the second lens group (Gr2) is unduly increased, which may increase error sensitivity of the second lens group (Gr2). Further, adjustment regarding the lens elements is required, which may lead to production cost increase. On the other hand, if the lower limit of the conditional formula (14)' is transgressed, a load to a lens driver is increased accompanied by increase of the moving distance of the lens element in zooming, not to mention increase of the size of the optical system. As a result, the size of the lens driver is increased.

Furthermore, it is desirable to satisfy the following conditional formula (15) for the following reasons.

$$Lb/f_W<1 \quad (15)$$

where Lb represents an optical axis distance from the apex of a lens surface of a lens element which has an optical power and which is located closest to the image sensor to the light receiving plane of the image sensor, wherein the distance is calculated in terms of the air.

If the upper limit of the conditional formula (14) is transgressed, it is necessary to strengthen the negative optical power of the first lens group (Gr1) to secure a long back focus. As a result, the curvature of the negative lens element in the first lens group (Gr1) is unduly increased, which makes it difficult to produce the zoom optical system. The distance calculated in terms of the air is a distance in the case where the air having a refractive index of 1 exists as a medium between the lens element closest to the image sensor, and the image sensor. If the space between the lens element and the image sensor is filled with a medium of a refractive index of n, the distance is as long as n times of the distance obtained in the case where the medium is the air.

It is desirable to satisfy the following conditional formula (16) regarding an incident angle of a principal ray on the effective image circle within incident rays incident onto the light receiving plane of the image sensor (SR).

$$\alpha_W>0° \quad (16)$$

where $\alpha_W$ represents an incident angle (unit: degree) of a principal ray with respect to a normal line of the light receiving plane of the image sensor (SR) at the wide-angle limit (W).

Figure 23:
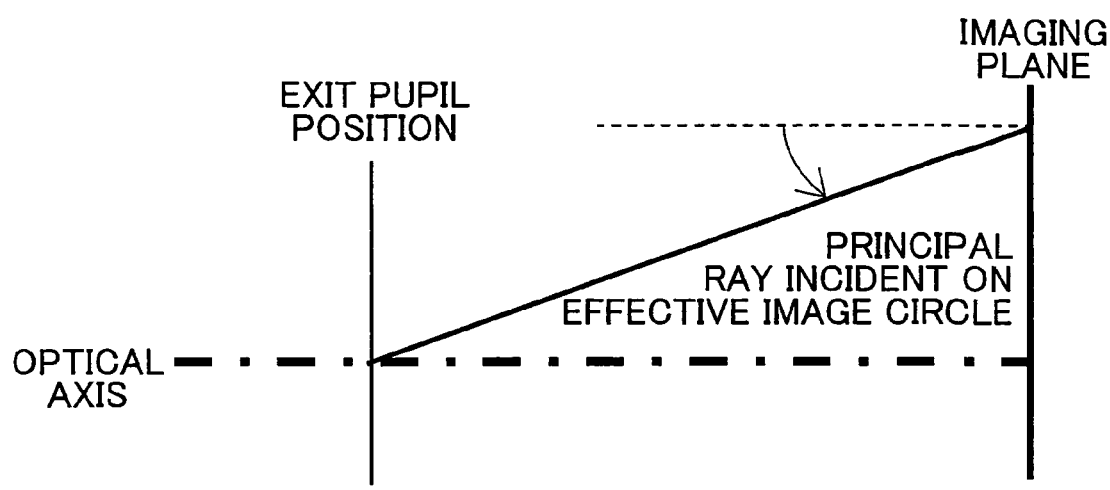
FIG. 23 is an illustration for explaining how an incident angle of a principal ray is defined with respect to an imaging plane.

The direction shown by the arrow in FIG. 23 is defined as a positive direction of the incident angle with respect to the light receiving plane of the image sensor (SR). Specifically, on the plane of FIG. 23, assuming that the left side corresponds to the object side, and the right side corresponds to the imaging side, the counterclockwise direction of the incident angle of the principal ray in the case where the exit pupil position lies on the object side with respect to the light receiving plane of the image sensor (SR) is defined as the positive direction. Satisfying the conditional formula (16) enables to miniaturize the optical system while securing a wide angle of view.

Further, it is desirable to satisfy the following conditional formula (17) regarding the incident angle of a principal ray on the effective image circle within the incident rays incident onto the light receiving plane of the image sensor (SR).

$$|\alpha_W-\alpha_T|<30° \quad (17)$$

where $\alpha_T$ represents an incident angle (unit: degree) of a principal ray with respect to a normal line of the light receiving plane of the image sensor (SR) at the telephoto limit (T).

As shown in FIG. 23, as well as the angle $\alpha_W$, the counterclockwise direction of the incident angle $\alpha_T$ is defined as a positive direction with respect to the normal line of the light receiving plane of the image sensor (SR). Satisfying the conditional formula (17) enables to suppress lowering of illuminance on a peripheral area on the light receiving plane of the image sensor (SR) even if a lens array is disposed in front of the light receiving plane of the image sensor (SR).

It is desirable to move the second lens group (Gr2) or the lens group(s) closer to the image sensor with respect to the second lens group (Gr2) alone or in combination for focusing. Particularly, it is desirable to move the third lens group (Gr3) toward the object for focusing from an indefinite object to a closest object. Since the inventive zoom optical system is a compact optical system to be loadable in a mobile phone or the like, it is disadvantageous to perform focusing by moving the first lens group (Gr1) forward in light of the entire length of the optical system. If focusing is attempted by moving the first lens group (Gr1), the diameter of the forwardmost lens element may be increased to secure a sufficient light amount on the peripheral area of the light receiving plane of the image sensor (SR), which is not desirable in the aspect of miniaturization of the optical system.

In the case where the inventive zoom optical system has the lens group arrangement comprised of the lens groups of a negative optical power, a positive optical power, and a positive optical power in this order from the object side, as in the embodiments, the optical power of the third lens group (Gr3) is weaker than that of the other lens groups, and an effective aberration correction cannot be expected from the third lens group (Gr3). In view of this, it is desirable to constitute the third lens group (Gr3) of one or two lens elements. If the third lens group (Gr3) is composed of two lens elements, the lens elements may be disposed at such a position that opposing lens surfaces of the lens elements are away from each other with a gap for holding the air therein or in contact with each other. Further alternatively, the two lens elements may be formed into a cemented lens element by integrally cementing the lens elements to each other.

In any of the lens groups, it is possible to cement the lens surfaces of the lens elements to each other by an adhesive such as a UV curing resin. Further, preferably, the first lens group (Gr1) is composed of two or more lens elements. If the first lens group (Gr1) is constituted of a single lens element, the optical power of the first lens group (Gr1) cannot be increased to such an extent as to suppress occurrence of astigmatism or magnification color aberration of the first lens group (Gr1). As a result, the diameter of the forwardmost lens element in the first lens group (Gr1) may be unduly increased. In the embodiments of the invention, since the first lens group (Gr1) is composed of three or less lens elements, this arrangement enables to strengthen the optical power of the first lens group (Gr1) while suppressing color aberration, and enables to keep the diameter of the forwardmost lens element from unduly increasing.

In the foregoing embodiments, all the lens groups have an aspherical shape. The configuration of the lens group is not limited to the above. For instance, forming the first lens group (Gr1) into an aspherical shape enables to effectively correct off-axis aberration, particularly astigmatism and distortion aberration. Further, for instance, forming the second lens group (Gr2) into an aspherical shape enables to effectively correct coma aberration and on-axis aberration, particularly, spherical aberration.

Further, it is preferable to form all the lens surfaces having a boundary with the air into an aspherical shape in order to effectively obtain the advantages of the aspherical shape. Such an arrangement enables to miniaturize the optical system while securing high image quality.

Further, it is desirable to make the negative lens element in the first lens group (Gr1) and the positive lens element in the third lens group (Gr3) of a resin material if the optical system has the third lens group (Gr3). Such an arrangement enables to minimize a displacement in back focus adjustment accompanied by an ambient temperature change.

It is possible to produce a lens element with an aspherical surface by molding or by combined use of a glass material and a resin material. A molded aspherical lens element is mass-producible, but the use of a glass material is limited. On the other hand, a composite aspherical lens element made of a glass material and a resin material has merits that a variety of glass materials are usable as a base member, and that a high latitude in designing is secured. Particularly, the merits of the composite aspherical lens element can be fully utilized in view of the fact that it is generally impossible to produce an aspherical lens element made of a material having a high refractive index by molding.

It is desirable to dispose the exit pupil position at the wide-angle limit (W) on the object side with respect to the light receiving plane of the image sensor (SR) in order to miniaturize the optical system while securing a wide angle of view.

The embodiments recite a continuous zoom optical system. Alternatively, an optical system of 2-focal-point switching type may be available with use of the same optical arrangement as used in the continuous zoom optical system to further miniaturize the optical system.

As an altered form, a mechanical shutter having a function of blocking light from being incident onto the image sensor (SR) may be disposed in place of the aperture stop (ST) in the foregoing embodiments. A mechanical shutter is advantageous in preventing smear in a case that a CCD image sensor is used as the image sensor (SR).

In the zoom optical systems in the respective embodiments, used is a refractive lens element of deflecting an incident ray due to refraction, namely, a lens element of deflecting an incident ray on a boundary between media having different refractive indices from each other. The lens element usable in the embodiments is not limited to the above. Examples of the usable lens element are a diffractive lens element of deflecting an incident ray by diffraction, a hybrid lens element of deflecting an incident ray by combination of diffraction and refraction, and a lens element of deflecting an incident ray based on a refractive index distribution in a medium. Further alternatively, it is possible to arrange a light ray regulating plate, in addition to the aperture stop (ST), according to needs.

As mentioned above, the embodiments of the invention are directed to a miniaturized, inexpensive, and superfine zoom optical system. The optical system as a whole is constituted of lens groups having two or more components, and zooming is performed by varying distances between the respective lens groups in the optical axis direction.

As described in the embodiments, it is desirable that all the lens groups are each composed of a single lens element or a cemented lens element. In such an arrangement, there is no need of providing a plurality of support members for supporting the lens elements or lens drivers in the lens groups. As a result, the mechanical arrangement of the optical system can be simplified, and the imaging lens device as a whole can be further miniaturized.

Further, in the case that a cemented lens element is used, it is possible to secure not only the mechanical precision of the support member for supporting the lens element but also the precision in cementing the lens elements to each other. This arrangement eliminates aged deterioration that an optical axis misalignment occurs in the lens group due to a long-term use, and facilitates optical adjustment. Further, it is possible to reduce error sensitivity due to decentering. In addition, since there is no gap between the lens surfaces by cementing of the lens elements, unnecessary inter-surface reflection of light be suppressed, and an intended optical image can be obtained.

In the case that the first lens group (Gr1) is composed of a cemented lens element, it is desirable to constitute the first lens group (Gr1) of at least one negative lens element and at least one positive lens element in this order from the object side. This arrangement is preferred to facilitate back focus adjustment at the wide-angle limit (W) and to effectively perform off-axis aberration correction with respect to an incident ray with a wide angle of view by adopting a so-called retro focus lens element. Furthermore, it is preferable to make the object-side lens surface of the positive lens element convex to the object side. This is advantageous in desirably correcting astigmatism and to improve imaging performance.

It is desirable to constitute the second lens group (Gr2) of at least one positive lens element and at least one negative lens element arrayed in this order from the object side. Such an arrangement is preferred because the optical power of the second lens group (Gr2) can be substantially alleviated, and error sensitivity can be reduced, with the zooming effect being retained by making the principal point position of the second lens group (Gr2) closer to the first lens group (Gr1). More preferably, the positive lens element of the second lens group (Gr2) is biconvex to strengthen the optical power of the second lens group (Gr2) and to reduce the moving distance of the second lens group (Gr2) in zooming.

Further, it is preferable to arrange the third lens group (Gr3) having a positive optical power on the imaging side with respect to the second lens group (Gr2). Such an arrangement is preferred to secure telecentricity regarding the incident angle of an off-axis ray onto the light receiving plane of the image sensor (SR).

Now, an embodiment of an imaging lens device incorporated with the inventive zoom optical system is described referring to the drawings.

Figure 24:
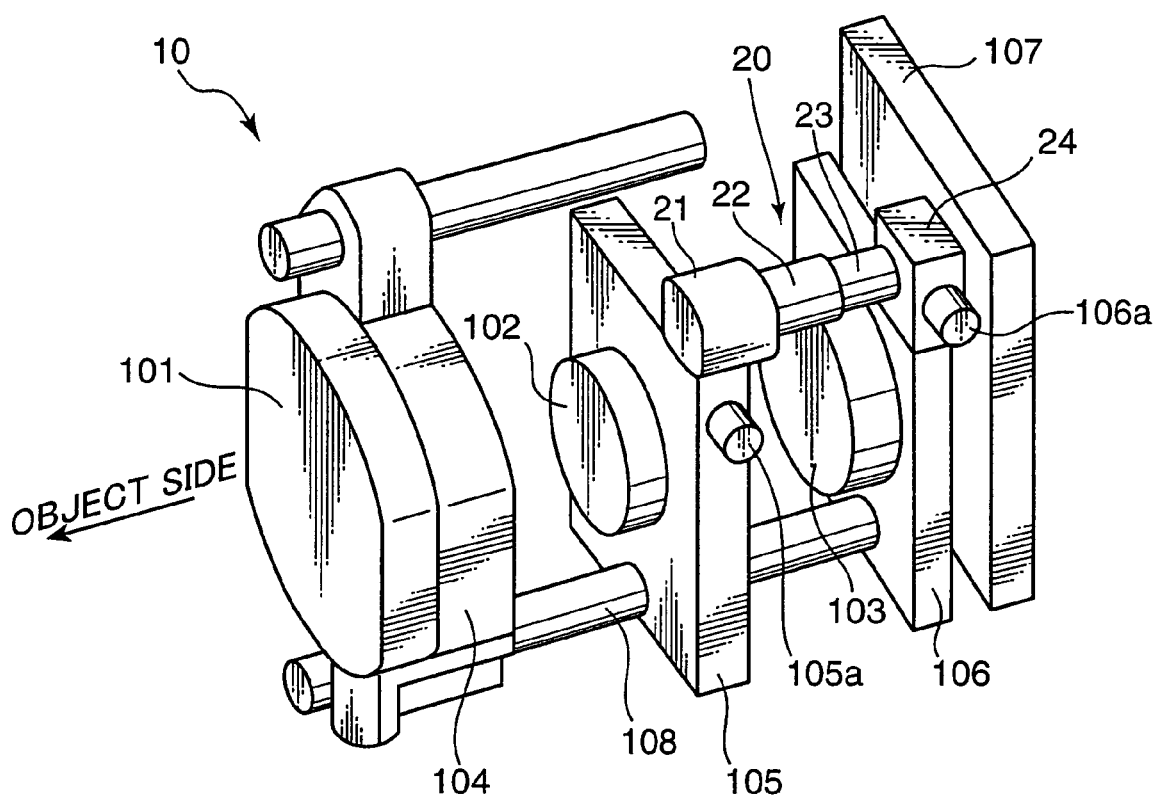
FIG. 24 is a perspective view showing an exemplified internal arrangement of an imaging lens device incorporated with the inventive zoom optical system and an image sensor.

FIG. 24 is a perspective view showing an exemplified internal arrangement of the imaging lens device 10. The imaging lens device 10 comprising lens groups constituting a zoom optical system, and a driver for driving the lens groups is described along with an unillustrated image sensor. In this embodiment, the zoom optical system is constituted of three lens groups, namely, first, second, and third lens groups. Description is made based on a premise that in zooming, the second lens group 102 and the third lens group 103 are moved for zooming and focusing, and the first lens group 101 is fixed or immovable. This movement corresponds to the movement in the tenth embodiment as shown in FIG. 21H.

As shown in FIG. 24, the imaging lens device 10 comprises the first lens group 101, the second lens group 102, and the third lens group 103 arrayed in this order from the subject (object) side with their respective optical axes aligned to each other. The first lens group 101, the second lens group 102, and the third lens group 103 are respectively supported on support members 104, 105, and 106. A plane-parallel plate (not shown) and the image sensor (not shown) are fixedly supported on a fixing member 107 at a central part thereof The fixing member 107 is fixed to an unillustrated camera phone body. A rod-like guide member 108 is passed through the support members 104, 105, and 106 for supporting the first lens group 101, the second lens group 102, and the third lens group 103.

A driving unit 20 constituted of, e.g., an impact type piezoelectric actuator is mounted on the support member 106 for supporting the third lens group 103. The third lens group 103 is driven in the optical axis direction by way of the support member 106 by a driving section including the driving unit 20. Specifically, the driving unit 20 is constituted of a support member 21, a piezoelectric device 22, a driving rod 23, and an engaging member 24. The support member 21 is fixed to the unillustrated camera phone body to hold the piezoelectric device 22 and the driving rod 23 thereon. The piezoelectric device 22 is mounted on the support member 21 in such a manner that polarizing directions thereof, namely, expanding/contracting directions thereof coincide with an axial direction of the support member 21. An end of the driving rod 23 is fixed to the piezoelectric device 22, and the other end thereof is fixed to a side wall of the engaging member 24. Engaging portions 105a, 106a are arranged at appropriate positions on the support member 105 and the engaging member 24.

In the above construction, in response to application of an electric voltage to the piezoelectric device 22 by an unillustrated driving section, the piezoelectric device 22 is expanded or contracted in the optical axis direction depending on the direction of the voltage. The expansion or the contraction is transmitted to the engaging member 24 via the driving rod 23. Since the engaging member 24 is connected to the support member 106 for supporting the third lens group 103, the third lens group 103 is movable accordingly. At this time, by engaging the engaging portions 105a, 106a with unillustrated cam members or the like, respectively, the second lens group 102 and the third lens group 103 are movable in respective intended directions for zooming and focusing. Further, by providing engaging portions equivalent to the engaging portions 105a, 106a on the support member 104 for supporting the first lens group 101, it is possible to drive the three lens groups 101, 102, 103 simultaneously for zooming and focusing. Furthermore, it is possible to provide two lens groups or four or more lens groups having the same arrangement as mentioned above and to drive the respective lens groups independently or in correlation to each other for zooming and focusing.

In the imaging lens device having the above arrangement, an incident ray from the object side is passed through the first lens group 101, the second lens group 102, and the third lens group 103 in this order, and then is passed through the unillustrated plane-parallel plate adjacent the third lens group 103. At this time, the optical image is corrected to minimize a so-called aliasing noise, which may appear during conversion of the optical image into an electrical signal by the unillustrated image sensor. The plane-parallel plate (PL) corresponds to an optical low-pass filter, an infrared ray cutting filter, a cover glass for an image sensor, or the like. After the formation of the optical image of the object onto the light receiving plane of the unillustrated image sensor, the optical image is converted into an electrical signal. The electrical signal is subjected to a predetermined digital image processing, image compression, or a like processing, according to needs, and is recorded in a memory of a mobile phone, a PDA, or a like apparatus, as a digital video signal, or transmitted to another digital apparatus by way of a cable or through radio.

It is possible to use a stepping motor or a like device to drive the respective lens groups or the aperture stop. Alternatively, in the case where a moving distance of the lens group is small, or the weight of the lens group is light, a micro piezoelectric actuator may be used independently for each of the lens groups. Such an arrangement not only enables to drive the lens groups independently of each other but also attains further miniaturization of the imaging lens device as a whole, while suppressing increase of the volume and power consumption of the driving section.

In the following, the zoom optical systems in the embodiments of the invention are described in detail referring to construction data, aberration diagrams, and the like.

PRACTICAL EXAMPLES

Example 1

Construction data on the respective lens elements in the first embodiment (Example 1) are described in Tables 1 and 2. It should be noted that the first lens element and the fifth lens element, namely, the object-side lens element in the first lens group (Gr1), and the third lens group (Gr3) in Example 1 are plastic lens elements made of a resin material.

TABLE 1

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | −9.401 | | | | | |
| | | 0.800 | | | 1.53048 | 55.72 |
| r2* | 5.531 | | | | | |
| | | 0.487 | | | | |
| r3 | 7.640 | | | | | |
| | | 1.313 | | | 1.91373 | 25.81 |
| r4* | 15.743 | | | | | |
| | | 6.063 | 2.059 | 0.700 | | |
| r5 | ∞ | | | | | |
| | | 0.100 | | | | |
| r6* | 3.036 | | | | | |
| | | 1.326 | | | 1.80932 | 43.94 |
| r7 | −6.593 | | | | | |
| | | 1.327 | | | 1.70908 | 26.10 |
| r8* | 3.230 | | | | | |
| | | 0.950 | 6.267 | 9.498 | | |
| r9* | 28.513 | | | | | |
| | | 1.949 | | | 1.53048 | 55.72 |
| r10* | −4.711 | | | | | |
| | | 2.445 | 1.585 | 1.000 | | |
| r11 | ∞ | | | | | |
| | | 0.500 | | | 1.51680 | 64.20 |
| r12 | ∞ | | | | | |
| | | 0.500 | | | | |
| r13 | ∞ | | | | | |

TABLE 2

| LENS SURFACE NO. | CONICAL COEFFICIENT | ASPHERIC COEFFICIENT | | | |
|---|---|---|---|---|---|
| | | A | B | C | D |
| r1* | 0 | 6.58E−04 | 1.28E−05 | 2.23E−07 | −3.73E−08 |
| r2* | 0 | −1.68E−03 | 5.43E−05 | −2.97E−06 | −4.74E−08 |
| r4* | 0 | 3.89E−04 | −1.84E−05 | 8.27E−06 | −4.93E−07 |
| r6* | 0 | −9.82E−04 | −4.34E−04 | 3.11E−04 | −1.10E−04 |
| r8* | 0 | 1.27E−02 | 1.22E−03 | 6.51E−04 | −8.57E−05 |
| r9* | 0 | 1.24E−03 | 2.56E−06 | 1.78E−06 | 5.63E−08 |
| r10* | 0 | 6.09E−03 | −3.51E−04 | 2.71E−05 | −5.97E−07 |

Table 1 indicates, from the left-side column thereof, the respective lens surface numbers, radii of curvature (unit: mm) of the respective lens surfaces, distances (unit: mm) between the respective lens surfaces in the optical axis direction, namely, axial distances between the respective lens surfaces, at the wide-angle limit (W), the mid point (M), and the telephoto limit (T), reflective indices of the respective lens elements, and the Abbe numbers of the respective lens elements. The blank columns regarding the axial distance between the lens surfaces at the mid point (M) and the telephoto limit (T) represent that the value within the blank column is the same as that in the left-side column at the wide-angle limit (W). As shown in FIG. 1, ri (i=1, 2, 3, . . . ) indicates the i-th lens surface from the object side, and a surface ri marked with an asterisk (*) is an aspherical surface.

In Example 1, the both lens surfaces of the first lens element closest to the object in the first lens group (Gr1), the imaging-side lens surface of the second lens element in the first lens group (Gr1), the outer lens surfaces of the cemented lens element constituting the second lens group (Gr2), which are exposed to the air, and the both lens surfaces of the fifth lens element in the third lens group (Gr3) are aspherical. Further, since the aperture stop (ST), the both surfaces of the plane-parallel plate (PL) and the light receiving plane of the image sensor (SR) are flat, respective radii of curvature thereof are infinite (∞).

The aspherical configuration of the lens element is defined by the following conditional formula (18), wherein the apex of the lens surface is represented as the point of origin, and a local orthogonal coordinate system (x, y, z), with the direction from the object toward the image sensor being the positive z-axis direction is used.

$$z = \frac{c \cdot h^2}{1 + SQRT\{1 - (1+k)c^2 \cdot h^2\}} + A \cdot h^4 + B \cdot h^6 + C \cdot h^8 + D \cdot h^{10} \quad (18)$$

where z represents z-axis displacement at the height position h (relative to the apex of the lens surface), h represents the height in a direction perpendicular to the z-axis ($h^2 = x^2 + y^2$), c represents a curvature near the apex of the lens surface (=1/radius of curvature), A, B, C, and D respectively represent aspheric coefficients of 4th, 6th, 8th, and 10th orders, and k represents a conical coefficient.

Table 2 shows the conical coefficient k, and the aspheric coefficients A, B, C, and D. The radii of curvature of the respective aspheric lens elements shown in Table 1 each show a value approximate to the center of the corresponding lens element.

The spherical aberration (LONGITUDINAL SPHERICAL ABERRATION in FIGS. 11A, 11D, and 11G), the astigmatism (ASTIGMATISM in FIGS. 11B, 11E, and 11H), and the distortion aberration (DISTORTION in FIGS. 11C; 11F, and 11I) of all the lens groups constituted of the first, the second, and the third lens groups in Example 1 having the above lens group arrangement and the construction are shown in FIGS. 11A through 11I. Specifically, the respective aberrations at the wide-angle limit (W), the mid point (M), and the telephoto limit (T) are shown in the uppermost row, the intermediate row, and the lowermost row in FIGS. 11A through 11I. Each of the horizontal axes in the spherical aberration diagrams and the astigmatism diagrams shows a focal point displacement in the unit of mm. Each of the horizontal axes in the distortion aberration diagrams shows a distortion in terms of percentage. Each of the vertical axes in the spherical aberration diagrams shows a value standardized by the incident height, each of the vertical axes in the astigmatism diagrams and the distortion aberration diagrams shows the height of an optical image (image height) in the unit of mm. In the spherical aberration diagrams, aberrations in case of using light of three different wavelengths are shown, wherein the one-dotted-chain lines represent aberrations in a red ray (wavelength: 656.27 nm), the solid lines represent aberrations in a yellow ray (so-called "d-ray" having a wavelength of 587.56 nm), and the broken lines represent aberrations in a blue ray (wavelength: 435.83 nm). In the astigmatism diagrams, the symbols "S" and "T" respectively represent results on sagittal (radial) plane and tangential (meridional) plane. Further, the astigmatism diagrams and the distortion aberration diagrams show results of using the yellow ray (d-ray). As is obvious from FIGS. 11A through 11I, the lens groups in Example 1 exhibit superior optical characteristics, wherein the color aberration and the astigmatism each fall within 0.1 mm, and the distortion aberration is not larger than 5% at all the positions, namely, at the wide-angle limit (W), the mid point (W), and the telephoto limit (T).

The focal lengths (unit: mm) and the F-numbers at the wide-angle limit (W), the mid point (M), and the telephoto limit (T) in Example 1 are shown in Table 21 and Table 22, respectively. Tables 21 and 22 show that Example 1 provides a fast optical system of a short focal length.

Example 2

Construction data on the respective lens elements in the second embodiment (Example 2) are described in Tables 3 and 4. As is obvious from Tables 3 and 4, in Example 2, the object-side lens surface of the first lens element in the first lens group (Gr1), the outer lens surfaces of the cemented lens element constituting the second lens group (Gr2) which are exposed to the air, and the both lens surfaces of the sixth lens element in the third lens group (Gr3) are aspherical. In this Example, each of the lens elements is made of a glass material.

TABLE 3

| LENS SURFACE NO. | RADIUS OF CURVATURE (mm) | AXIAL DISTANCE BETWEEN SURFACES(mm) W | M | T | REFRACTIVE INDEX | ABBE NUMBER |
|---|---|---|---|---|---|---|
| r1* | −20.497 | | | | | |
| | | 0.500 | | | 1.48749 | 70.44 |
| r2 | 7.534 | | | | | |
| | | 1.161 | | | 1.84826 | 29.57 |
| r3 | 16.284 | | | | | |
| | | 0.827 | | | | |
| r4 | −17.410 | | | | | |
| | | 0.500 | | | 1.51963 | 66.21 |
| r5 | 35.502 | | | | | |
| | | 6.977 | 2.115 | 0.500 | | |
| r6 | ∞ | | | | | |
| | | 0.100 | | | | |
| r7* | 3.823 | | | | | |
| | | 1.259 | | | 1.84525 | 40.44 |
| r8 | −4.578 | | | | | |
| | | 2.233 | | | 1.73420 | 25.58 |
| r9* | 4.070 | | | | | |
| | | 1.987 | 6.759 | 9.702 | | |
| r10* | −40.781 | | | | | |
| | | 1.121 | | | 1.84936 | 35.44 |
| r11* | −5.920 | | | | | |
| | | 2.335 | 1.396 | 0.748 | | |
| r12 | ∞ | | | | | |
| | | 0.500 | | | 1.51680 | 64.20 |
| r13 | ∞ | | | | | |
| | | 0.500 | | | | |
| r14 | ∞ | | | | | |

TABLE 4

| LENS SURFACE NO. | CONICAL COEFFICIENT | ASPHERIC COEFFICIENT A | B | C | D |
|---|---|---|---|---|---|
| r1* | 0 | 3.45E−04 | −2.06E−06 | 3.97E−08 | −6.50E−10 |
| r7* | 0 | −1.05E−03 | −1.11E−04 | 1.63E−05 | −4.92E−06 |
| r9* | 0 | 7.73E−03 | 3.71E−04 | 1.87E−04 | −1.02E−05 |
| r10* | 0 | −1.41E−03 | 3.80E−04 | −3.05E−05 | 1.30E−06 |
| r11* | 0 | 4.78E−04 | 3.16E−04 | −3.03E−05 | 1.42E−06 |

Example 3

Construction data on the respective lens elements in the third embodiment (Example 3) are described in Tables 5 and 6. In Example 3, the object-side lens surface of the second lens element in the first lens group (Gr1), the outer surfaces of the cemented lens element constituting the second lens group (Gr2), which are exposed to the air, and the imaging-side lens surface of the sixth lens element in the third lens group (Gr3) are aspherical. In other words, all the lens surfaces exposed to the air are aspherical. In this Example, each of the lens elements is made of a glass material.

TABLE 5

| LENS SURFACE NO. | RADIUS OF CURVATURE (mm) | AXIAL DISTANCE BETWEEN SURFACES(mm) W | M | T | REFRACTIVE INDEX | ABBE NUMBER |
|---|---|---|---|---|---|---|
| r1 | −24.091 | | | | | |
| | | 0.500 | | | 1.68680 | 54.18 |
| r2 | 6.728 | | | | | |
| | | 1.002 | | | 1.84666 | 23.82 |
| r3* | 11.983 | | | | | |
| | | 6.199 | 1.861 | 0.500 | | |
| r4 | ∞ | | | | | |
| | | 0.100 | | | | |
| r5* | 3.277 | | | | | |
| | | 1.356 | | | 1.83069 | 41.75 |
| r6 | −3.644 | | | | | |
| | | 1.045 | | | 1.67700 | 27.94 |

TABLE 5-continued

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r7* | 3.082 | | | | | |
| | | 1.678 | 6.732 | 9.771 | | |
| r8 | −38.505 | | | | | |
| | | 1.687 | | | 1.84014 | 40.89 |
| r9 | −5.768 | | | | | |
| | | 0.500 | | | 1.54934 | 43.70 |
| r10* | −6.171 | | | | | |
| | | 2.512 | 1.424 | 0.540 | | |
| r11 | ∞ | | | | | |
| | | 0.500 | | | 1.51680 | 64.20 |
| r12 | ∞ | | | | | |
| | | 0.500 | | | | |
| r13 | ∞ | | | | | |

TABLE 6

| LENS SURFACE NO | CONICAL COEFFICIENT | ASPHERIC COEFFICIENT | | | |
|---|---|---|---|---|---|
| | | A | B | C | D |
| r3* | 0 | −4.67E−04 | 2.43E−05 | −2.99E−06 | 1.28E−07 |
| r5* | 0 | −1.73E−03 | −3.44E−04 | 3.02E−05 | −1.23E−05 |
| r7* | 0 | 9.70E−03 | 3.16E−04 | 3.63E−04 | −5.96E−05 |
| r10* | 0 | 3.37E−03 | −2.16E−04 | 1.30E−05 | −3.62E−07 |

Example 4

Construction data on the respective lens elements in the fourth embodiment (Example 4) are described in Tables 7 and 8. As is obvious from Tables 7 and 8, the outer lens surfaces of the cemented lens element constituting the first lens group (Gr1) and the second lens group (Gr2), which are exposed to the air, and the both lens surfaces of the fifth lens element in the third lens group (Gr3) are aspherical. In other words, all the lens surfaces exposed to the air are aspherical. Particularly, the imaging-side lens surface of the second lens element is a lens surface of a composite aspherical lens element. In this Example, each of the lens elements is made of a glass material.

TABLE 7

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | 50.100 | | | | | |
| | | 0.500 | | | 1.49208 | 67.04 |
| r2 | 6.578 | | | | | |
| | | 0.800 | | | 1.92286 | 20.88 |
| r3 | 8.776 | | | | | |
| | | 0.050 | | | 1.51790 | 52.31 |
| r4* | 4.409 | | | | | |
| | | 5.679 | 1.742 | 0.500 | | |
| r5 | ∞ | | | | | |
| | | 0.100 | | | | |
| r6* | 3.395 | | | | | |
| | | 1.163 | | | 1.85000 | 40.04 |
| r7 | −5.113 | | | | | |
| | | 2.158 | | | 1.76175 | 23.82 |
| r8* | 4.316 | | | | | |
| | | 0.961 | 5.371 | 8.063 | | |
| r9* | −13.113 | | | | | |
| | | 1.006 | | | 1.84941 | 35.75 |
| r10* | −4.815 | | | | | |
| | | 2.423 | 1.348 | 0.500 | | |
| r11 | ∞ | | | | | |
| | | 0.500 | | | 1.51680 | 64.20 |
| r12 | ∞ | | | | | |
| | | 0.500 | | | | |
| r13 | ∞ | | | | | |

TABLE 8

| LENS SURFACE NO. | CONICAL COEFFICIENT | ASPHERIC COEFFICIENT | | | |
|---|---|---|---|---|---|
| | | A | B | C | D |
| r1* | 0 | −5.16E−03 | 4.04E−04 | −1.55E−05 | 2.30E−07 |
| r4* | 0 | −8.39E−03 | 5.76E−04 | −1.86E−05 | −4.43E−07 |
| r6* | 0 | −1.16E−03 | −3.66E−04 | 2.27E−04 | −6.70E−05 |
| r8* | 0 | 1.15E−02 | 4.02E−04 | 5.60E−04 | −4.44E−05 |
| r9* | 0 | −9.17E−04 | 5.42E−04 | −3.89E−05 | 1.69E−06 |
| r10* | 0 | 1.64E−03 | 3.29E−04 | −2.30E−05 | 1.43E−06 |

Example 5

Construction data on the respective lens elements in the fifth embodiment (Example 5) are described in Tables 9 and 10. As is obvious from Tables 9 and 10, the outer lens surfaces of the respective cemented lens elements constituting the first lens group (Gr1) and the second lens group (Gr2), which are exposed to the air, and the both lens surfaces of the fifth lens element in the third lens group (Gr3) are aspherical. In other words, all the lens surfaces exposed to the air are aspherical. In this Example, the first lens element, the second lens element, and the fifth lens element, namely, the first lens group (Gr1) and the third lens group (Gr3) are each made of a plastic material.

Example 6

Construction data on the respective lens elements in the sixth embodiment (Example 6) are described in Tables 11 and 12. As is obvious from Tables 11 and 12, the outer lens surfaces of the respective cemented lens elements constituting the first lens group (Gr1) and the second lens group (Gr2), which are exposed to the air, and the both lens surfaces of the sixth lens element in the third lens group (Gr3) are aspherical. In other words, all the lens surfaces exposed to the air are aspherical. In this Example, each of the lens elements is made of a glass material.

TABLE 9

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | −9.056 | | | | | |
| | | 0.800 | | | 1.53048 | 55.72 |
| r2 | 6.929 | | | | | |
| | | 1.910 | | | 1.58340 | 30.23 |
| r3* | 28.038 | | | | | |
| | | 8.314 | 3.200 | 1.400 | | |
| r4 | ∞ | | | | | |
| | | 0.100 | | | | |
| r5* | 3.171 | | | | | |
| | | 1.342 | | | 1.85335 | 39.62 |
| r6 | −6.828 | | | | | |
| | | 1.183 | | | 1.72284 | 25.43 |
| r7* | 2.898 | | | | | |
| | | 1.400 | 6.705 | 9.840 | | |
| r8* | 45.880 | | | | | |
| | | 1.926 | | | 1.53048 | 55.72 |
| r9* | −4.449 | | | | | |
| | | 2.525 | 1.596 | 1.000 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

TABLE 10

| LENS SURFACE NO. | CONICAL COEFFICIENT | ASPHERIC COEFFICIENT | | | |
|---|---|---|---|---|---|
| | | A | B | C | D |
| r1* | 0 | 1.23E−03 | −4.90E−05 | 2.20E−06 | −4.13E−08 |
| r3* | 0 | 2.00E−04 | −4.12E−05 | 4.99E−06 | −1.92E−07 |
| r5* | 0 | −8.17E−04 | −3.70E−04 | 2.12E−04 | −6.70E−05 |
| r7* | 0 | 1.04E−02 | 9.21E−04 | 5.27E−04 | −1.10E−04 |
| r8* | 0 | 1.06E−03 | −1.34E−04 | 1.23E−05 | −9.04E−08 |
| r9* | 0 | 6.05E−03 | −3.84E−04 | 2.29E−05 | −2.40E−08 |

Example 7

Construction data on the respective lens elements in the seventh embodiment (Example 7) are described in Tables 13 and 14. As is obvious from Tables 13 and 14, in Example 7, the lens surfaces of all the lens elements constituting the first lens group (Gr1) and the second lens group (Gr2) are aspherical. In other words, all the lens surfaces exposed to the air are aspherical. In this Example, each of the lens elements is made of a glass material.

TABLE 13

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | 15.467 | | | | | |
| | | 0.500 | | | 1.75450 | 51.57 |
| r2* | 3.092 | | | | | |
| | | 1.821 | | | | |
| r3* | 6.893 | | | | | |
| | | 1.125 | | | 1.92286 | 20.88 |
| r4* | 10.535 | | | | | |
| | | 5.988 | 2.330 | 0.500 | | |
| r5 | ∞ | | | | | |
| | | 0.100 | | | | |
| r6* | 2.679 | | | | | |
| | | 1.303 | | | 1.72000 | 50.31 |
| r7* | −5.611 | | | | | |
| | | 0.170 | | | | |
| r8* | −3.303 | | | | | |
| | | 2.059 | | | 1.79850 | 22.60 |
| r9* | −48.882 | | | | | |
| | | 3.936 | 5.050 | 6.182 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

TABLE 14

| LENS SURFACE NO. | CONICAL COEFFICIENT | ASPHERIC COEFFICIENT | | | |
|---|---|---|---|---|---|
| | | A | B | C | D |
| r1* | 0 | 1.21E−03 | 6.49E−05 | −1.21E−05 | 4.02E−07 |
| r2* | 0 | 4.17E−04 | −3.05E−05 | 8.49E−05 | −1.28E−05 |
| r3* | 0 | −1.16E−03 | 1.17E−04 | −2.18E−05 | −1.80E−06 |
| r4* | 0 | −1.71E−03 | −7.83E−07 | −5.02E−05 | 2.04E−06 |
| r6* | 0 | 1.94E−03 | 1.73E−03 | 1.32E−04 | 4.20E−05 |
| r7* | 0 | 2.36E−02 | 3.05E−03 | 8.23E−04 | −2.63E−03 |
| r8* | 0 | 3.19E−02 | −3.74E−03 | 1.39E−03 | −3.12E−03 |
| r9* | 0 | 2.10E−02 | 9.23E−04 | 1.31E−04 | 1.43E−06 |

Example 8

Construction data on the respective lens elements in the eighth embodiment (Example 8) are described in Tables 15 and 16. As is obvious from Tables 15 and 16, in Example 8, the both lens surfaces of all the lens elements constituting the first lens group (Gr1), the second lens group (Gr2), and the third lens group (Gr3) are aspherical. In other words, all the lens surfaces exposed to the air are aspherical. In this Example, the first, the second, and the fifth lens elements, namely, the first lens group (Gr1) and the third lens group (Gr3) are made of a plastic material.

TABLE 15

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | −62.489 | | | | | |
| | | 0.800 | | | 1.53048 | 55.72 |
| r2* | 3.684 | | | | | |
| | | 1.397 | | | | |

TABLE 15-continued

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r3* | 7.042 | | | | | |
| | | 1.342 | | | 1.58340 | 30.23 |
| r4* | 13.921 | | | | | |
| | | 7.967 | 2.668 | 0.700 | | |
| r5 | ∞ | | | | | |
| | | 0.000 | | | | |
| r6* | 3.810 | | | | | |
| | | 2.204 | | | 1.75450 | 51.57 |
| r7* | −5.901 | | | | | |
| | | 0.196 | | | | |
| r8* | 37.279 | | | | | |
| | | 0.800 | | | 1.80518 | 25.43 |
| r9* | 2.831 | | | | | |
| | | 2.495 | 6.051 | 9.760 | | |
| r10* | 21.401 | | | | | |
| | | 1.544 | | | 1.53048 | 55.72 |
| r11* | −17.415 | | | | | |
| | | 2.415 | | | | |
| r12 | ∞ | | | | | |
| | | 0.300 | | | 1.51680 | 64.20 |
| r13 | ∞ | | | | | |
| | | 0.540 | | | | |
| r14 | ∞ | | | | | |

TABLE 16

| LENS SURFACE NO. | CONICAL COEFFICIENT | ASPHERIC COEFFICIENT | | | |
|---|---|---|---|---|---|
| | | A | B | C | D |
| r1* | 0 | 7.36E−04 | −1.83E−05 | −1.39E−08 | 0.00E+00 |
| r2* | 0 | 6.17E−05 | 6.45E−05 | −2.13E−06 | −1.57E−06 |
| r3* | 0 | −6.89E−04 | −7.71E−05 | −2.38E−06 | −3.58E−07 |
| r4* | 0 | −1.35E−03 | −2.23E−04 | 1.73E−05 | −9.33E−07 |
| r6* | 0 | −1.76E−03 | −7.39E−05 | −1.40E−04 | 2.17E−05 |
| r7* | 0 | 9.69E−03 | −3.04E−03 | 3.33E−04 | 3.86E−05 |
| r8* | 0 | 4.28E−04 | −6.68E−04 | −3.39E−04 | 2.12E−04 |
| r9* | 0 | −6.70E−03 | 3.63E−03 | −1.16E−03 | 3.39E−04 |
| r10* | 0 | −1.97E−04 | 6.75E−04 | −4.69E−05 | 1.54E−06 |
| r11* | 0 | −2.33E−04 | 7.43E−04 | −3.64E−05 | 1.25E−06 |

Example 9

Construction data on the respective lens elements in the ninth embodiment (Example 9) are described in Tables 17 and 18. As is obvious from Tables 17 and 18, in Example 9, the outer lens surfaces of the respective lens elements constituting the first lens group (Gr1), the second lens group (Gr2), the third lens group (Gr3), and the fourth lens group (Gr4), which are exposed to the air are aspherical. In other words, all the lens surfaces exposed to the air are aspherical. In this Example, the first, the second, and the sixth lens elements, namely, the first lens group (Gr1) and the fourth lens group (Gr4) are made of a plastic material.

TABLE 17

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | −17.710 | | | | | |
| | | 0.800 | | | 1.53048 | 55.72 |
| r2 | 4.768 | | | | | |
| | | 1.460 | | | 1.58340 | 30.23 |
| r3* | 9.213 | | | | | |
| | | 6.959 | 3.342 | 1.400 | | |
| r4 | ∞ | | | | | |
| | | 0.200 | | | | |

TABLE 17-continued

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r5* | 3.165 | | | | | |
| | | 2.035 | | | 1.77250 | 49.77 |
| r6 | −10.220 | | | | | |
| | | 0.982 | | | 1.80542 | 26.12 |
| r7* | 5.171 | | | | | |
| | | 1.407 | 4.987 | 7.347 | | |
| r8* | −18.493 | | | | | |
| | | 1.529 | | | 1.65699 | 54.16 |
| r9* | −4.000 | | | | | |
| | | 1.662 | 1.076 | 1.000 | | |
| r10* | −6.082 | | | | | |
| | | 0.800 | | | 1.53048 | 55.72 |
| r11* | 186.118 | | | | | |
| | | 0.724 | | | | |
| r12 | ∞ | | | | | |
| | | 0.300 | | | 1.51680 | 64.20 |
| r13 | ∞ | | | | | |
| | | 0.540 | | | | |
| r14 | ∞ | | | | | |

TABLE 18

| LENS SURFACE NO. | CONICAL COEFFICIENT | ASPHERIC COEFFICIENT | | | |
|---|---|---|---|---|---|
| | | A | B | C | D |
| r1* | 0 | −3.73E−04 | 6.76E−05 | −2.56E−06 | 1.01E−08 |
| r3* | 0 | −7.96E−04 | 7.45E−05 | 3.54E−06 | −6.48E−07 |
| r5* | 0 | −2.06E−04 | 1.94E−04 | −4.75E−05 | −1.30E−05 |
| r7* | 0 | 1.13E−02 | 1.38E−03 | 5.02E−04 | −5.74E−05 |
| r8* | 0 | −7.67E−04 | −8.97E−04 | 1.65E−04 | −1.17E−05 |
| r9* | 0 | 4.64E−03 | −1.50E−03 | 2.22E−04 | −1.17E−05 |
| r10* | 0 | 1.31E−03 | 1.27E−04 | 2.90E−05 | −4.03E−06 |
| r11* | 0 | −1.44E−02 | 5.02E−03 | −5.65E−04 | 2.37E−05 |

Example 10

Construction data on the respective lens elements in the tenth embodiment (Example 10) are described in Tables 19 and 20. As is obvious from Tables 19 and 20, in Example 10, the outer lens surfaces of the respective lens elements constituting the first lens group (Gr1), the second lens group (Gr2), and the third lens group (Gr3), which are exposed to the air, are aspherical. In other words, all the lens surfaces exposed to the air are aspherical. In this Example, each of the lens elements is made of a glass material.

TABLE 19

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r1* | −53.091 | | | | | |
| | | 0.500 | | | 1.48740 | 70.44 |
| r2 | 4.282 | | | | | |
| | | 0.776 | | | 2.00330 | 28.30 |
| r3* | 4.967 | | | | | |
| | | 3.472 | 1.629 | 0.500 | | |
| r4 | ∞ | | | | | |
| | | 0.100 | | | | |
| r5* | 3.011 | | | | | |
| | | 1.341 | | | 1.84003 | 40.90 |
| r6 | −2.614 | | | | | |
| | | 0.957 | | | 1.69718 | 26.74 |
| r7* | 3.261 | | | | | |
| | | 1.216 | 4.065 | 5.964 | | |
| r8* | −19.420 | | | | | |
| | | 0.862 | | | 2.00330 | 28.30 |

TABLE 19-continued

| LENS SURFACE NO. | RADIUS OF CURVATURE (mm) | AXIAL DISTANCE BETWEEN SURFACES(mm) | | | REFRACTIVE INDEX | ABBE NUMBER |
|---|---|---|---|---|---|---|
| | | W | M | T | | |
| r9* | −6.076 | | | | | |
| | | 2.275 | 1.270 | 0.500 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

TABLE 20

| LENS SURFACE NO: | CONICAL COEFFICIENT | ASPHERIC COEFFICIENT | | | |
|---|---|---|---|---|---|
| | | A | B | C | D |
| r1* | 0 | −2.85E−03 | 2.67E−04 | −6.27E−06 | −2.23E−07 |
| r3* | 0 | −2.69E−03 | 3.03E−04 | −1.34E−08 | −1.94E−06 |
| r5* | 0 | −2.84E−03 | −8.34E−04 | 2.27E−04 | −8.24E−05 |
| r7* | 0 | 1.47E−02 | 2.08E−04 | 8.80E−04 | −1.40E−04 |
| r8* | 0 | 3.14E−03 | −5.37E−04 | 1.46E−05 | 1.28E−06 |
| r9* | 0 | 4.11E−03 | −1.76E−04 | −4.59E−05 | 3.77E−06 |

The spherical aberration (LONGITUDINAL SPHERICAL ABERRATION in FIGS. 12A, 12D, 12G, 13A, 13D, 13G, 14A, 14D, 14G, 15A, 15D, 15G, 16A, 16D, 16G, 17A, 17D, 17G, 18A, 18D, 18G, 19A, 19D, 19G, 20A, 20D, and 20G), the astigmatism (ASTIGMATISM in FIGS. 12B, 12E, 12H, 13B, 13E, 13H, 14B, 14E, 14H, 15B, 15E, 15H, 16B, 16E, 16H, 17B, 17E, 17H, 18B, 18E, 18H, 19B, 19E, 19H, 20B, 20E, and 20H), and the distortion aberration (DISTORTION in FIGS. 12C, 12F, 12I, 13C, 13F, 13I, 14C, 14F, 14I, 15C, 15F, 15I, 16C, 16F, 16I, 17C, 17F, 17I, 18C, 18F, 18I, 19C, 19F, 19I, 20C, 20F, and 20I) of all the lens groups constituted of the first, the second, and the third lens groups in Examples 2 through 10 having the above lens group arrangement and the construction are shown in FIGS. 12A through 20I. In Example 7, the third lens group (Gr3) is not included, and in Example 9, the fourth lens group (Gr4) is additionally included.

The lens groups in Examples 2 through 10 exhibit superior optical characteristics, wherein the spherical aberration and the astigmatism each falls within about 0.1 mm, and the distortion aberration is not larger than 5% at the wide-angle limit (W), the mid point (W), and the telephoto limit (T).

The focal lengths (unit: mm) and the F-numbers at the wide-angle limit (W), the mid point (M), and the telephoto limit (T) in Examples 2 through 10 are shown in Table 21 and Table 22, respectively. Tables 21 and 22 show that Examples 2 through 10 each provides a fast optical system of a short focal length, as well as Example 1.

Respective values of the conditional formulae (1) through (17) obtained in Examples 1 through 10 are shown in Table 23. Table 23 clarifies that the aforementioned examples provide the aforementioned desirable values in all the formulae (1) through (17).

TABLE 21

| | FOCAL LENGTH(mm) | | |
|---|---|---|---|
| | W | M | T |
| EXAMPLE 1 | 4.2 | 8.3 | 11.8 |
| EXAMPLE 2 | 4.9 | 9.7 | 13.8 |
| EXAMPLE 3 | 4.9 | 9.7 | 13.8 |
| EXAMPLE 4 | 4.6 | 9.2 | 13.0 |
| EXAMPLE 5 | 4.3 | 8.5 | 12.2 |
| EXAMPLE 6 | 4.5 | 9.0 | 12.8 |
| EXAMPLE 7 | 3.4 | 5.2 | 6.9 |
| EXAMPLE 8 | 4.5 | 8.5 | 12.8 |
| EXAMPLE 9 | 4.9 | 8.4 | 11.5 |
| EXAMPLE 10 | 4.7 | 7.1 | 9.4 |

TABLE 22

| | F NUMBER | | |
|---|---|---|---|
| | W | M | T |
| EXAMPLE 1 | 3.0 | 4.7 | 6.1 |
| EXAMPLE 2 | 2.8 | 4.3 | 5.5 |
| EXAMPLE 3 | 2.8 | 4.4 | 5.7 |
| EXAMPLE 4 | 2.8 | 4.3 | 5.6 |
| EXAMPLE 5 | 3.0 | 4.7 | 6.0 |
| EXAMPLE 6 | 3.0 | 4.7 | 5.9 |
| EXAMPLE 7 | 3.5 | 4.1 | 4.7 |
| EXAMPLE 8 | 3.2 | 4.5 | 5.9 |
| EXAMPLE 9 | 3.5 | 4.9 | 5.9 |
| EXAMPLE 10 | 2.8 | 3.7 | 4.5 |

TABLE 23

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| (1) | 1.61 | 1.42 | 1.38 | 1.26 | 1.77 | 1.41 | 1.44 | 1.48 | 1.35 | 1.11 |
| (2) | 0.36 | 0.31 | 0.34 | 0.33 | 0.34 | 0.31 | 0.13 | 0.33 | 0.27 | 0.24 |
| (3) | 1.06 | 1.00 | 1.02 | 1.09 | 0.99 | — | 1.68 | 1.13 | 1.24 | 1.04 |
| (4) | 0.56 | 0.50 | 0.49 | 0.44 | 0.62 | 0.50 | 0.72 | 0.52 | 0.58 | 0.56 |
| (5) | 17.8 | 14.9 | 13.8 | 16.2 | 14.2 | 12.5 | 27.7 | 26.1 | 23.7 | 14.2 |
| (6) | 0.383 | 0.361 | 0.160 | 0.431 | 0.053 | 0.053 | 0.168 | 0.053 | 0.053 | 0.516 |
| (7) | 29.9 | 40.9 | 30.4 | 46.2 | 25.5 | 25.5 | 30.7 | 25.5 | 25.5 | 42.1 |
| (8) | 1.914 | 1.848 | 1.847 | 1.923 | 1.583 | 1.583 | 1.923 | 1.583 | 1.583 | 2.003 |
| (9) | 1.33 | — | 1.27 | 2.00 | 1.12 | 2.17 | 2.46 | 2.39 | 1.27 | 1.62 |
| (10) | 0.43 | — | 0.46 | 0.64 | 0.48 | 0.35 | 0.28 | 0.29 | 0.46 | 0.41 |
| (11) | 2.73 | 2.83 | 2.71 | 2.64 | 3.18 | 2.70 | 2.22 | 2.12 | 2.41 | 2.57 |
| (12) | 0.96 | 1.00 | 0.95 | 0.93 | 1.12 | 0.95 | 1.11 | 0.75 | 1.03 | 1.29 |
| (13) | 0.86 | 0.86 | 0.80 | 0.68 | 0.98 | 0.83 | — | 0.36 | 0.89 | 0.61 |
| (14) | 0.15 | 0.16 | 0.18 | 0.20 | 0.15 | 0.15 | 0.18 | 0.14 | 0.14 | 0.26 |
| (15) | 0.44 | 0.32 | 0.28 | 0.29 | 0.43 | 0.41 | 2.03 | 0.70 | 0.30 | 0.28 |
| (16) | 18.9 | 16.3 | 16.4 | 22.4 | 16.8 | 16.6 | 25.0 | 17.5 | 22.0 | 23.5 |
| (17) | 22.8 | 19.0 | 18.8 | 21.8 | 20.1 | 16.2 | 4.7 | 9.9 | 7.9 | 17.8 |

As described above, in the examples, primarily, glass lens elements are used. In Examples 1, 5, 8, and 9, plastic lens elements are used in combination with the glass lens elements. The embodiments of the invention are not limited to the above. It is possible to use at least one plastic lens element. Particularly, since the first lens group (Gr1) has a large lens diameter, as compared with the other lens groups, use of a plastic lens element in the first group (Gr1) most advantageously contributes to production of a lightweight optical system. In the zoom optical systems in the embodiments, the second lens group (Gr2) has a largest moving distance. Use of the plastic lens element in the second lens group (Gr2) enables to reduce a load to the lens driver.

Since the optical power of the third lens group (Gr3) or the fourth lens group (Gr4) is weak, as compared with the other lens groups, it is possible to use a plastic lens element for the third lens group (Gr3) or the fourth lens group (Gr4) while securing an intended aberration correction. In any of the examples, use of the plastic lens element realizes miniaturization of the lens driver, which enables to further miniaturize the entirety of the imaging lens device comprised of the lens groups and the lens driver. Furthermore, a plastic lens element is superior to a glass lens element in production cost reduction and in productivity.

As mentioned above, since the inventive imaging lens device incorporated with the inventive zoom optical system is compact and lightweight, it is possible to load the imaging lens device in a digital apparatus such as a mobile phone. Thereby, still image shooting or moving image shooting can be performed with a desired magnification ratio. Further, since the imaging lens device has such a high optical performance as to be compatible with an image sensor with 2 million pixels or more, the imaging lens device is superior to an electronic zoom system in which interpolation is required.

The following is a brief description of the embodiments of the invention.

(I) An aspect of the invention is directed to a zoom optical system for forming an optical image of a subject onto a light receiving plane of an image sensor for converting the optical image into an electrical signal, and performing zooming by varying distances between lens groups in an optical axis direction. The zoom optical system comprises in the order from an object side: a first lens group having a negative optical power; and a second lens group having a positive optical power. The distance between the first lens group and the second lens group is reduced in zooming from a wide-angle limit to a telephoto limit. The first lens group and the second lens group each are composed of three or less lens elements. The second lens group includes a positive lens element having a refractive index of 1.7 or more. The positive lens element has at least one aspherical surface. The second lens group satisfies the following conditional formulae (1) and (2):

$$0.7 < f_2/f_W < 1.78 \quad (1)$$

$$0.1 < t_2/TL < 0.6 \quad (2)$$

where $f_2$ represents a composite focal length of the second lens group, $f_W$ represents a composite focal length of an entirety of the optical system at the wide-angle limit, $t_2$ represents a moving distance of the second lens group in zooming from the wide-angle limit to the telephoto limit, and TL represents a maximal value of an optical axis distance from an apex of a lens surface of the lens element closest to the object to the light receiving plane of the image sensor.

In the arrangement (I), the first lens group closest to the object has a negative optical power. Hereinafter, such a lens group arrangement is sometimes called as an arrangement of a "negative dominant type". This arrangement enables to readily and controllably propagate an incident ray which is incident from the object side with a great incident angle onto the first lens group due to the negative optical power of the first lens group. Further, this arrangement enables to suppress error sensitivity increase despite miniaturization of the optical system.

Further, the first lens group having a lens element of a large outer diameter, and the second lens group with a large moving distance in zooming each are composed of three or less lens elements. This arrangement enables to reduce a load to a driver for driving the lens elements, and contributes to production cost reduction due to a reduced number of lens elements.

Furthermore, since the refractive index of the positive lens element in the second lens group is as large as 1.7 or more, increase of the moving distance of the second lens group can be suppressed. In addition, production of the optical system can be made easy by reducing the lens surface curvature. The value of the refractive index used in the specification is a value obtained by using a so-called d-ray (wavelength: 587.56 nm).

In view of the fact that the moving distance of the second lens group is limited in reducing the size of the optical system in the optical axis direction, a significantly large optical power is required for the second lens group to secure an intended zoom ratio. In the arrangement (I), the positive lens element in the second lens group has at least one aspherical surface to correct spherical aberration and coma aberration that may occur due to increase of the optical power of the second lens group.

If the upper limit of the conditional formula (1) is transgressed, the optical power of the second lens group is weakened, with the result that it is difficult to obtain a zoom ratio of about two to three times while securing miniaturization of the optical system. On the other hand, if the lower limit of the conditional formula (1) is transgressed, error sensitivity due to decentering of the second lens group is unduly increased, which makes it difficult to produce the optical system. In view of the above, satisfying the conditional formula (1) enables to optimize the optical power of the second lens group, and to realize a zoom ratio of about two to three times. Further, this arrangement enables to suppress increase of a moving distance of the second lens group in zooming, and to suppress degradation of off-axis performance at the telephoto limit. Furthermore, since the error sensitivity increase of the second lens group can be suppressed, adjustment regarding the lens elements in the second lens group or adjustment regarding the lens groups can be easily performed.

If the upper limit of the conditional formula (2) is transgressed, the distance between the lens groups is unduly small, which obstructs securing a space for a lens receiving part in a lens barrel. On the other hand, if the lower limit of the conditional formula (2) is transgressed, it is difficult to obtain an intended zoom ratio.

According to the arrangement (I), the first lens group disposed closest to the object has a negative optical power, namely, the lens group arrangement is of a "negative dominant type". This arrangement enables to readily and controllably propagate an incident ray which is incident from the object side with a great incident angle onto the first lens group thanks to the negative optical power of the first lens group. In addition, since the first lens group is composed of three or less lens elements, the diameter of the forwardmost lens element can be reduced, with intended aberration correction being secured. Further, since the entire length of the optical system can be reduced in the lens group arrangement of a negative dominant type, the entire length of the optical system can be reduced, as compared with a lens group arrangement of a "positive dominant type", wherein a first lens group has a positive optical power. Further, in the arrangement of a negative dominant type, error sensitivity increase can be suppressed despite miniaturization of the optical system. Accordingly, high optical performance can be accomplished even if requirements on processing precision of a lens surface, positional precision in arranging lens elements in a lens barrel, and the like are lowered. In other words, production of the optical system is made easy.

Further, in the arrangement (I), the first lens group having a lens element of a large outer diameter, and the second lens group with a large moving distance in zooming each are composed of three or less lens elements. This arrangement enables to reduce a load to the driver for driving the lens elements. As a result, the lens driver can be miniaturized, as well as the entirety of the lens assembly, which makes it possible to miniaturize the entirety of the imaging lens device incorporated with the zoom optical system.

Furthermore, since the refractive index of the positive lens element in the second lens group is as large as 1.7 or more, increase of the moving distance of the second lens group can be suppressed, thereby enabling to miniaturize the imaging lens device as a whole. In addition, such a large refractive index can reduce the lens surface curvature, which resultantly facilitates production of the optical system. In addition to the reduction of the lens surface curvature, error sensitivity increase can be suppressed by the provision of the aspherical surface.

(II) Preferably, the zoom optical system may further comprise a third lens group having a positive optical power between the second lens group and the light receiving plane of the image sensor.

In the arrangement (II), the lens groups have a negative optical power, a positive optical power, and a positive optical power in this order from the object side. This arrangement enables to reduce the moving distance of the second lens group in zooming, as compared with a zoom optical system of a negative-positive two-unit type, and to easily control an incident angle of an off-axis ray incident onto the light receiving plane of the image sensor with use of the third lens group.

According to the arrangement (II), the entire length of the optical system in the optical axis direction can be shortened, which makes it possible to suppress a load to the lens driver. As a result, the lens driver can be miniaturized, as well as the entirety of the lens assembly, thereby enabling to miniaturize the entirety of the imaging lens device incorporated with the zoom optical system. Furthermore, an incident angle of an off-axis ray incident onto the light receiving plane of the image sensor can be controlled by the third lens group having a positive optical power, which enables to secure telecentricity regarding the incident angle of the off-axis ray incident onto the light receiving plane of the image sensor.

(III) Preferably, the zoom optical system may further comprise a fourth lens group having a negative optical power between the third lens group and the light receiving plane of the image sensor.

In the arrangement (III), since the fourth lens group has a negative optical power, optical performance concerning a closest object at the telephoto limit can be remarkably enhanced. Further, this arrangement enables to dispose the exit pupil position at the telephoto limit on the object side with respect to the light receiving plane of the image sensor, which makes it possible to reduce an incident angle difference onto the light receiving plane of the image sensor between the wide-angle limit and the telephoto limit.

According to the arrangement (III), since the fourth lens group of a negative optical power is additionally provided, optical performance, particularly, concerning a closest object at the telephoto limit such as aberration can be remarkably enhanced, which is not easily obtained in a zoom optical system of a negative-positive-positive three unit type. Further, since the incident angle difference onto the light receiving plane of the image sensor between the wide-angle limit and the telephoto limit can be minimized, an image with a small change in light amount on a peripheral area of the image sensor in zooming can be obtained.

(IV) Preferably, the second lens group may include a positive lens element and a negative lens element arrayed in this order from the object side, and satisfy the following conditional formula (3):

$$0.9 < |f_{2n}/f_{2p}| < 1.8 \tag{3}$$

where $f_{2p}$ represents a focal length of the positive lens element in the second lens group, and $f_{2n}$ represents a focal length of the negative lens element in the second lens group.

In the arrangement (IV), since the second lens group includes a positive lens element and a negative lens element, spherical aberration and on-axis color aberration can be corrected. Further, arraying the positive lens element and the negative lens element in this order from the object side enables to make the position of the principal point of the second lens group closer to the first lens group. This arrangement enables to substantially alleviate the substantial power of the second lens group while securing a zooming performance. Further, if the upper limit of the conditional formula (3) is transgressed, spherical aberration correction is insufficient, and on the other hand, if the lower limit of the conditional formula (3) is transgressed, the optical power of the respective lens elements in the second lens group is unduly strong, which may increase error sensitivity and degrade productivity.

According to the arrangement (IV), since the second lens group includes a positive lens element and a negative lens element, spherical aberration and on-axis color aberration can be desirably corrected. Further, since the optical power of the second lens group can be substantially alleviated, a large radius of curvature for the lens element can be secured to obtain substantially the same optical power as in a conventional lens group arrangement. This arrangement enables to facilitate processing of the lens element and to reduce error sensitivity. Furthermore, the arrangement (IV) secures a stronger optical power than the conventional arrangement, as far as the radius of curvature is identical to each other between the arrangement (IV) and the conventional arrangement. This arrangement contributes to miniaturization of the entirety of the optical system.

(V) Preferably, the third lens group may include one or two lens elements, and the third lens group may be moved toward the object for focusing from an indefinite object to a closest object.

In the case where the lens groups have a negative optical power, a positive optical power, and a positive optical power in this order from the object side, effective aberration correction cannot be expected, because the optical power of the third lens group is weaker than the optical power of the other lens groups. In view of this, in the arrangement (V), the third lens group is composed of one or two lens elements. In this arrangement, an incident angle of an off-axis ray incident onto the light receiving plane of the image sensor can be controlled easily, with desired aberration correction being secured.

Further, if the first lens group is moved for focusing, for instance, the entire length of the optical system may be increased, or the lens diameter of the forwardmost lens element may be increased due to the movement of the first lens group. As compared with the driving of the first lens group, moving the third lens group for focusing as in the arrangement (V) enables to execute so-called inner focusing, which is advantageous in suppressing the drawback resulting from the driving of the first lens group, as mentioned above.

According to the arrangement (V), by driving the third lens group for focusing, a clear image is obtained in zooming to a closest object without increase of the entire length of the optical system or increase of the outer diameter of the forwardmost lens element accompanied by forward movement of the first lens group.

(VI) Preferably, at least three lens groups may be moved in the optical axis direction for zooming.

In the optical system of a negative-positive two-unit type or of a negative-positive-positive three-unit type as mentioned above, the second lens group is moved for zooming. However, as the entire length of the optical system is shortened, it is difficult to secure a zoom ratio of about two to three times merely by moving the second lens group. In view of this, in the arrangement (VI), the lens groups other than the second lens group are additionally moved for zooming. Further, these three or more lens groups are moved to perform optical correction.

According to the arrangement (VI), at least the three lens groups are moved in zooming. In this way, since the other lens groups in addition to the second lens group are moved for zooming, a zoom ratio of about two to three times can be secured even in the optical system of a short entire length. Further, if one of the other lens groups, and the second lens group are primarily moved for zooming, the other one of the other lens groups is primarily moved to suppress a change in field curvature accompanied by zooming. This arrangement enables to simultaneously and efficiently execute zooming and suppressing of a change in field curvature accompanied by zooming. Furthermore, since increase of the moving distances of the respective lens groups can be suppressed, the entirety of the imaging lens device incorporated with the lens driver can be miniaturized.

(VII) Preferably, the second lens group may include a cemented lens element.

Generally, in view of the fact that the moving distance of the second lens group is limited in reducing the size of the optical system in the optical axis direction, a significantly large optical power is necessary for the second lens group to secure an intended zoom ratio. As a result, error sensitivity such as lens curvature error, center thickness error, refractive index error, distance error between lens elements, and decentering error may be increased, which may consequently require enhanced mechanical precision of the lens barrel and adjustment regarding the lens elements in the second lens group. In view of the above, in the arrangement (VII), the second lens group includes a cemented lens element. This arrangement enables to remarkably reduce error sensitivities in the respective lens surfaces of the second lens group, and to obtain desired sensitivity balance even in a case that adjustment regarding the lens elements is required. Further, this arrangement enables to simplify the structure of a support member for supporting the lens elements. As a result, the mechanical construction of the optical system can be simplified, which further contributes to miniaturization of the entirety of the imaging lens device incorporated with the zoom optical system.

According to the arrangement (VII), error sensitivity due to decentering of the second lens group can be reduced by cementing the lens elements. In addition to this, since there is no gap between the lens surfaces by cementing of the lens elements, this arrangement enables to suppress unnecessary inter-surface reflection of light, whereby an intended optical image is obtained. Furthermore, since the mechanical construction of the optical system can be simplified, the entirety of the imaging lens device incorporated with the zoom optical system can be miniaturized.

(VIII) Preferably, the second lens group may include a cemented lens element.

Generally, error sensitivity due to decentering is increased in reducing the size of the optical system in the optical axis direction, which may require enhanced mechanical precision of the lens barrel or adjustment regarding the lens elements in the first lens group. In view of the above, in the arrangement (VIII), the first lens group includes a cemented lens element. This arrangement enables to remarkably reduce error sensitivities in the respective lens surfaces of the first lens group, and to obtain desired sensitivity balance even in a case that adjustment regarding the lens elements is required. Further, this arrangement enables to simplify the structure of a support member for supporting the lens elements. As a result, the mechanical construction of the optical system can be simplified, which further contributes to miniaturization of the entirety of the imaging lens device incorporated with the zoom optical system.

According to the arrangement (VIII), error sensitivity due to decentering of the first lens group can be reduced by cementing the lens elements. In addition to this, since there is no gap between the lens surfaces by cementing of the lens elements, this arrangement enables to suppress unnecessary inter-surface reflection of light, whereby an intended optical image is obtained. Furthermore, since the mechanical construction of the optical system can be simplified, the entirety of the imaging lens device incorporated with the zoom optical system can be miniaturized.

(IX) Another aspect of the invention is directed to an imaging lens device comprising the zoom optical system, wherein the zoom optical system is constructed in such a manner that the optical image of the subject is formable on a predetermined imaging plane of the zoom optical system.

The arrangement (IX) enables to perform zooming of about two to three times in a compact and superfine imaging lens device loadable in a mobile phone, a personal digital assistant (PDA), or a like apparatus. According to the arrangement (IX), realized is a compact, superfine imaging lens device capable of performing zooming of about two to three times, and loadable in a digital apparatus such as a mobile phone or a PDA.

(X) Yet another aspect of the invention is directed to a digital apparatus comprising the imaging lens device, an image sensor, and a functioning section which causes the imaging lens device and the image sensor to execute at least one of a still image shooting operation of shooting a still image of the subject, and a moving image shooting operation of shooting a moving image of the subject.

The arrangement (X) enables to realize zooming while securing superfine performance in the digital apparatus such as a mobile phone or a PDA. According to the arrangement (X), realized is a digital apparatus such as a mobile phone or a PDA constructed such that zooming in a still image shooting mode of shooting a still image of a subject, or in a moving image shooting mode of shooting a moving image of the subject is executable, with superfine performance being secured.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom optical system for forming an optical image of a subject onto a light receiving plane of an image sensor for converting the optical image into an electrical signal, and performing zooming by varying distances between lens groups in an optical axis direction, the zoom optical system comprising in the order from an object side:
   a first lens group having a negative optical power; and
   a second lens group having a positive optical power,
   the distance between the first lens group and the second lens group being reduced in zooming from a wide-angle limit to a telephoto limit,
   the first lens group and the second lens group each being composed of three or less lens elements,
   the second lens group including a positive lens element having a refractive index of 1.7 or more, the positive lens element having at least one aspherical surface, and
   the second lens group satisfying the following conditional formulae (1) and (2):

$$0.7 < f_2/f_W < 1.78 \quad (1)$$

$$0.1 < t_2/TL < 0.6 \quad (2)$$

where $f_2$ represents a composite focal length of the second lens group, $f_W$ represents a composite focal length of an entirety of the optical system at the wide-angle limit, $t_2$ represents a moving distance of the second lens group in zooming from the wide-angle limit to the telephoto limit, and TL represents a maximal value of an optical axis distance from an apex of a lens surface of the lens element closest to the object to the light receiving plane of the image sensor.

2. The zoom optical system according to claim 1, further comprising a third lens group having a positive optical power between the second lens group and the light receiving plane of the image sensor.

3. The zoom optical system according to claim 2, further comprising a fourth lens group having a negative optical power between the third lens group and the light receiving plane of the image sensor.

4. The zoom optical system according to claim 1, wherein the second lens group includes a positive lens element and a negative lens element arrayed in this order from the object side, and satisfies the following conditional formula (3):

$$0.9 < |f_{2n}/f_{2p}| < 1.8 \quad (3)$$

where $f_{2P}$ represents a focal length of the positive lens element in the second lens group, and $f_{2n}$ represents a focal length of the negative lens element in the second lens group.

5. The zoom optical system according to claim 2, wherein the third lens group includes one or two lens elements, and the third lens group is moved toward the object side for focusing from an indefinite object to a closest object.

6. The zoom optical system according to claim 1, wherein at least three lens groups are moved in the optical axis direction for zooming.

7. The zoom optical system according to claim 1, wherein the second lens group includes a cemented lens element.

8. The zoom optical system according to claim 1, wherein the first lens group includes a cemented lens element.

9. An imaging lens device comprising a zoom optical system for forming an optical image of a subject onto a light receiving plane of an image sensor for converting the optical image into an electrical signal, and performing zooming by varying distances between lens groups in an optical axis direction, the zoom optical system including in the order from an object side:
   a first lens group having a negative optical power; and
   a second lens group having a positive optical power,
   the distance between the first lens group and the second lens group being reduced in zooming from a wide-angle limit to a telephoto limit,
   the first lens group and the second lens group each being composed of three or less lens elements,
   the second lens group including a positive lens element having a refractive index of 1.7 or more, the positive lens element having at least one aspherical surface,
   the second lens group satisfying the following conditional formulae (1) and (2):

$$0.7 < f_2/f_W < 1.78 \quad (1)$$

$$0.1 < t_2/TL < 0.6 \quad (2)$$

where $f_2$ represents a composite focal length of the second lens group, $f_W$ represents a composite focal length of an entirety of the optical system at the wide-angle limit, $t_2$ represents a moving distance of the second lens group in zooming from the wide-angle limit to the telephoto limit, and TL represents a maximal value of an optical axis distance from an apex of a lens surface of the lens element closest to the object to the light receiving plane of the image sensor, and the zoom optical system being constructed in such a manner that the optical image of the subject is formable on a predetermined imaging plane of the zoom optical system.

10. A digital apparatus comprising:
an imaging lens device;
an image sensor; and
a functioning section which causes the imaging lens device and the image sensor to execute at least one of a still image shooting operation of shooting a still image of the subject, and a moving image shooting operation of shooting a moving image of the subject,
the imaging lens device including a zoom optical system for forming an optical image of a subject onto a light receiving plane of the image sensor for converting the optical image into an electrical signal, and performing zooming by varying distances between lens groups in an optical axis direction, the zoom optical system having in the order from an object side:
a first lens group having a negative optical power; and
a second lens group having a positive optical power,
the distance between the first lens group and the second lens group being reduced in zooming from a wide-angle limit to a telephoto limit,
the first lens group and the second lens group each being composed of three or less lens elements,
the second lens group including a positive lens element having a refractive index of 1.7 or more, the positive lens element having at least one aspherical surface,
the second lens group satisfying the following conditional formulae (1) and (2):

$$0.7 < f_2/f_W < 1.78 \quad (1)$$

$$0.1 < t_2/TL < 0.6 \quad (2)$$

where $f_2$ represents a composite focal length of the second lens group, $f_W$ represents a composite focal length of an entirety of the optical system at the wide-angle limit, $t_2$ represents a moving distance of the second lens group in zooming from the wide-angle limit to the telephoto limit, and TL represents a maximal value of an optical axis distance from an apex of a lens surface of the lens element closest to the object to the light receiving plane of the image sensor, and the zoom optical system being constructed in such a manner that the optical image of the subject is formable on a predetermined imaging plane of the zoom optical system.

* * * * *

UNITED STATES PATENT AND TRADEMARK OFFICE
CERTIFICATE OF CORRECTION

PATENT NO. : 7,450,837 B2 Page 1 of 1
APPLICATION NO. : 11/244458
DATED : November 11, 2008
INVENTOR(S) : Keiji Matsusaka It is certified that error appears in the above-identified patent and that said Letters Patent is hereby corrected as shown below:

Title Page:
(73) Assignee, delete "Konica Monolta Opto, Inc." and insert -- Konica Minolta Opto, Inc. --.

Signed and Sealed this

Sixth Day of January, 2009

JON W. DUDAS
*Director of the United States Patent and Trademark Office*